(12) United States Patent
Jones et al.

(10) Patent No.: US 6,216,173 B1
(45) Date of Patent: Apr. 10, 2001

(54) METHOD AND APPARATUS FOR CONTENT PROCESSING AND ROUTING

(75) Inventors: Adrian Jones, Monaco; Alan Moore, London, both of (GB)

(73) Assignee: Redbox Technologies Limited, Datchet (GB)

( * ) Notice: Subject to any disclaimer, the term of this patent is extended or adjusted under 35 U.S.C. 154(b) by 0 days.

(21) Appl. No.: 09/018,004

(22) Filed: Feb. 3, 1998

(51) Int. Cl.[7] .................................................. G06F 15/16

(52) U.S. Cl. .......................... 709/302; 709/202; 709/238; 709/231

(58) Field of Search .................................... 709/201, 202, 709/203, 102, 103, 106, 300, 302, 230, 231, 232, 238, 240

(56) References Cited

U.S. PATENT DOCUMENTS

| | | | |
|---|---|---|---|
| 5,251,205 | * 10/1993 | Callon et al. ......................... | 370/392 |
| 5,381,527 | * 1/1995 | Inniss et al. .......................... | 709/239 |
| 5,423,002 | * 6/1995 | Hart ..................................... | 709/238 |
| 5,430,727 | * 7/1995 | Callon ................................. | 370/401 |
| 5,434,863 | * 7/1995 | Onishi et al. ......................... | 370/402 |
| 5,473,599 | * 12/1995 | Li et al. ............................... | 370/219 |
| 5,509,123 | * 4/1996 | Dobbins et al. ....................... | 709/221 |
| 5,517,620 | * 5/1996 | Hashimoto et al. .................. | 370/389 |
| 5,519,704 | * 5/1996 | Farinacci et al. ..................... | 370/402 |
| 5,544,320 | * 8/1996 | Konrad ................................ | 709/219 |
| 5,553,289 | * 9/1996 | Johnson et al. ...................... | 709/300 |
| 5,583,862 | * 12/1996 | Callon ................................. | 370/397 |
| 5,583,997 | * 12/1996 | Hart .................................... | 709/249 |
| 5,608,726 | * 3/1997 | Virgile ................................. | 370/401 |

* cited by examiner

*Primary Examiner*—Dung C. Dinh
(74) *Attorney, Agent, or Firm*—The Hecker Law Group

(57) ABSTRACT

A method and apparatus for incorporating content processing and content routing intelligence into networks. In one embodiment, the content processing and routing (CPR) system is aware of the content and requirements of data and service requests, as well as the capabilities of all services accessible via the system. Efficient network routing is accomplished by considering the capabilities of the available transmission channels, and the transmission needs of all current transmission service requests. Service requests are routed to the most suitable service or combination of services to fulfill the request. A mechanism is also provided for transparently converting data to accommodate data format differences between clients and services. In one embodiment, the CPR system comprises a system kernel consisting of the core software modules that are required to load, initialize and start CPR services, and allow the services to communicate securely. The CPR services conform to several general service types. These types include application services which act as the interface between a specific external application or device and the CPR system; kernel services which provide services on behalf of the kernel; content services which act on information in transit through the CPR system; routing services which contain the routing logic specific to a particular application; and link services which provide for the joining of two CPR instances over a network or other transmission channel. Data exchange is supported for bounded data in the form of media objects and unbounded data in the form of media streams.

89 Claims, 18 Drawing Sheets

METHOD AND APPARATUS FOR CONTENT PROCESSING AND ROUTING

BACKGROUND OF THE INVENTION

1. Field of the Invention

This invention relates to the field of computer-related systems, and more particularly to a software platform for incorporating content-processing and content-routing intelligence into networks.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Computers and computer networks are used to exchange information in many fields such as media, entertainment, commerce, and telecommunications, for example. Media and entertainment information may include the digitized content of movies, video, audio CD's, radio, newspapers, books, magazines, and computer games. Commerce information includes electronic banking and bill payment, as well as electronic purchases. Voice telephone transmissions and video conferencing are examples of telecommunication information. The exchange of information between computers typically occurs between a "server application" that provides information or services, and a "client application" or device that makes requests of the server application and receives the provided information and services. Multiple server applications are sometimes available on a "service system". A problem with current systems is the difficulty and complexity of delivering the information in the format required by the different client applications or devices, and the difficulty and complexity of determining the best route the information should take to move from a server application to a client application or device. This problem can be understood by reviewing current systems.

Software service systems have been developed to provide mechanisms for client applications and devices to access the services of a server application. However, these service systems have difficulty in servicing the requirements of a very large number of client applications and do not provide re-usability of information processing and content routing technology for applications other than those for which they are specifically designed. Also, there are many different types and formats of information to be transmitted over the same network. Current systems do not provide arbitration or scheduling prioritization based on user or application requirements between information types being transmitted over a network. Further, routing is not based on the actual content of information being transferred. Rather it is based only on certain well-defined, limited attributes such as originator address, destination address, priority, size of object and type of packet of data. Such attributes do not lead to the most efficient transmission of information in mixed usage networks.

Another disadvantage is that client applications must have knowledge of how to communicate with specific server applications to facilitate the location and access of the respective services. This makes the addition of new service applications or devices difficult because client applications must be reconfigured or reprogrammed to recognize the new server applications and to direct service requests to those new applications. There is no mechanism in the service system to allow new services to be added without such reconfiguring or reprogramming.

Another problem is that information to be transmitted may be in one of many different data encoding formats and may be transmitted as bounded data, in the form of objects, files, etc., or as unbounded data in the form of data streams. In prior art service systems, applications using one data encoding format or bounded/unbounded transmission format cannot access the services of another application using a different data encoding format or bounded/unbounded transmission format without the use of a gateway or converter built specifically for that purpose. There is no extensible and re-usable mechanism for resolving communication between the client and server applications, and, further, the underlying service system may support only one transmission format.

CORBA and OLE/COM

Networked object technologies, such as CORBA (Common Object Request Broker Architecture) and OLE/COM (Object Linking and Embedding/Component Object Model), allow applications access to networked objects and their shared services. CORBA is designed to allow different object systems from multiple vendors to interact with each other on a network.

The CORBA system implements an Object Request Broker (ORB) providing for the location and execution of objects through a standard interface protocol, enabling objects and programs to interact with each other across the network. In the CORBA environment, an ORB daemon process (ORBD) receives object calls from the client processes registered to it. The ORB daemon then locates the object on the network, and acts as the interface between the client process and the networked object.

The OLE/COM system supports marshalling of function calls to remote objects using the lightweight remote procedure call format (LRPC). Proxy/stub pair remoting code, defined using IDL (interface definition language), is maintained to service standard marshalling calls. The OLE/COM system includes an object server registry for locating an appropriate object server for a given object class ID. Information regarding what methods an object interface supports, and the types of parameters required by each method, may be obtained from a type library.

In both CORBA and COM, client applications designate a particular server object, or object class, as the target of a function call. To accommodate calls to a new service, the client application must be reconfigured or reprogrammed to send function calls to the new service. There is little flexibility as to which object responds to a function call, as the target service is predetermined by the client application. To determine what other services are available in the system, the client application itself must interrogate objects. This sort of interrogation assumes inherent knowledge of those objects. Further, if similar services are provided in the system, there is no mechanism for selecting between the services. Only that service which is designated in the function call may be accessed, even if another service better suited to the task at hand is available.

The CORBA and COM systems allow for single-source/single-destination communication and are oriented around communication between distributed processing logic rather than supporting the movement and distributed processing of content. That is, a client application may access only one service at a time. More complex service communications with multiple service destinations, such as directing a service request to visit multiple services in sequence, is not supported. To accomplish a similar function, a client must access a first service, receive a response from the first service, forward the first response to the second service, receive a second response from the second service, forward the second response to a third service, etc. It is inefficient for the client to issue multiple service requests in this manner and it usually also creates unnecessary additional network traffic.

ROUTING SYSTEMS

The service systems of the prior art typically rely on low-level systems to route information between parties (computers, applications, etc.). These low-level systems are typically hardware systems with little or no knowledge about the type of information being transmitted or of the relative requirements of one type of transmitted information over another. Thus, there is no mechanism to control routing at the application level where such knowledge exists.

Typical routing systems of the prior art, such as routers manufactured by Cisco Systems, Inc. of San Jose, Calif., operate only at a low level. These systems perform routing based on the network packet type, originating address, destination address, port, priority, tag, size of object and type of packet of data. Dedicated hardware solutions include video routing hardware, splitters, and switches. Those hardware solutions are inflexible, expensive, non-scalable, and suited solely to the task for which they are designed.

In addition to dedicated hardware solutions, general purpose hardware is combined with dedicated software, such as with gateway software or application bridges. For instance, a database gateway may provide conversion from SQL (structured query language) format to proprietary formats, and a four-way H.320 bridge can allow four H.320 video conferencing devices to communicate, with each terminal viewing the other three. Those dedicated software solutions are of limited utility, beyond their specific design purpose.

In the prior art, networks are typically used very inefficiently when multiple digitized information types are being transmitted across a single network simultaneously. For example, current network applications and devices usually request network bandwidth on demand, regardless of the competing requirements of other applications and devices that need to share the available bandwidth. Even in technologies such as ATM (asynchronous transfer mode) switches, which allow applications to make more specific requests of the network (e.g., to provide limited but constant bit rate bandwidth), no consideration is given to the relative requirements of other applications that also need to use the network. Also, when multiple networks are available between a server application and a client application, the network actually used normally is selected based exclusively on configuration settings. That is inefficient because the most appropriate network for transmission may only be determinable at the time of transmission of information.

BACKGROUND REFERENCES

The following U.S. patents pertain to routing and media distribution:

U.S. Pat. No. 5,509,123, issued to Dobbins, is directed to an object-oriented packet routing system which utilizes common protocol-independent base objects to instantiate protocol specific objects, and which distributes the critical function and system behavior into autonomous objects. The system supports multiple network and routing protocols.

U.S. Pat. Nos. 5,251,205 and 5,430,727, issued to Callon, are directed to routing algorithms that support multiple protocols. The method includes a determination of nearest neighbor routers and their respective packet format support capabilities for use in determining network transmission paths. Multi-protocol routers are used to forward packets of differing formats, such as IP (internet protocol) and OSI (open systems interconnection) formats, to the nearest router that is in the desired transmission path and that also supports the packet format of each respective packet.

In Callon '205 and '727, when the nearest routers do not support a given packet format, the packet data is encapsulated into a supported format and forwarded. The new encapsulated packet is given a dummy address which another router in the transmission path can interpret as indicating an encapsulated packet. The encapsulated packet is extracted and routed to the designated end system or another router.

U.S. Pat. Nos. 5,423,002 and 5,583,997, issued to Hart, disclose a system for transparently extending network resources, such as the multi-protocol routing functionality of a router, to a remote LAN (local area network). From the perspective of the end systems on interconnected LANs, a "routing adapter" and a "boundary router" provide the same functionality as two interconnected routers. A small site LAN may install a routing adapter which operates independently of the higher level protocol suites. The boundary router at the local LAN provides the higher level protocol suite services to the remote LAN by way of a direct communication link and the routing adapter.

U.S. Pat. No. 5,434,863, issued to Onishi, discloses an internetworking apparatus for performing routing and packet transmission. The apparatus comprises one or more routing accelerators for assisting a main processor to perform routing. The routing accelerator subjects reception packet data to routing and transmits the data to other routing accelerators if necessary. The routing accelerator discriminates the type of the data frame, and, where the data frame is not of a routable protocol, the data is transmitted to other routing accelerators to perform bridge operations. The main processor acts as a routing manager for the internetworking apparatus, and distributes the routing table to the routing accelerators. More routing accelerators may be added to the apparatus as the network size increases.

U.S. Pat. No. 5,519,704, issued to Farinacci provides a reliable transport protocol that works with unicast and multicast transmission, and a routing protocol based on the transport protocol. A technique is provided by which destinations may be labeled with authentication information or with an administrative tag that specifies a method of routing in response to policy considerations such as security, financial, reliability, application-based policy, or other policy reasons.

U.S. Pat. No. 5,381,527, issued to Inniss, discloses a method and system for distributing messages utilizing a data processing system. A user specifies and prioritizes alternate distribution media and associated distribution channels. In the event that the distribution of a message fails in the preferred channel, the system automatically attempts to distribute the message via the user-specified alternate distribution channels based on the priorities specified by the user.

U.S. Pat. No. 5,473,599, issued to Li, is directed to network systems having redundant routers for receiving packets from a host on a LAN. Data packets are routed from a host on a LAN through a virtual address belonging to a group of routers. The group of routers comprise an active router and a standby router. The active router handles all data packets processed through the virtual address. If the active router becomes inoperative, the standby router takes over as the active router. The other routers in the group hold an election to determine a new standby router.

U.S. Pat. No. 5,517,620, issued to Hashimoto, discloses a system for dynamically updating routing information for routing packets between LANs connected to a plurality of routers via a public network. A local router comprises a protocol processor for periodically processing routing information into a local routing information protocol (RIP) datum indicative of the LANs connected to the local router. A comparator compares the RIP datum with stored information in a RIP memory, and the stored information is updated if the RIP datum is incoincident with the current stored information. The current stored RIP information is sent to other routers via a public network interface, and routing tables in each router are updated in response to the incoming RIP information.

U.S. Pat. No. 5,544,320, issued to Konrad, discloses a remote information service access system based on a client-server-service model. The service functionality is separated into a human interface service functionality, a starter service functionality, and a desired utility service functionality. The functionality is then distributed between a local host and a remote host in a manner transparent to the user.

U.S. Pat. No. 5,553,289, issued to Johnson, provides a method for automatically assigning attributes, such as "Private—Audio Content," to multimedia distributions. Specific attributes are associated with specific types of media. The distribution is searched to determine the types of media being distributed, and those attributes associated with the media types contained in the distribution are assigned to the distribution.

U.S. Pat. No. 5,583,862, issued to Callon, discloses a method and apparatus for routing for virtual networks. Routing tables are maintained in routers or gateways which identify whether or not a destination is directly reachable by the router listed in the routing information entry, or whether the destination is part of a virtual network served by the listed destination routers. Routers in communication with a virtual network are first queried for the identity of a particular destination router address before packets are delivered to eliminate the need of packet forwarding.

U.S. Pat. No. 5,608,726, issued to Virgile, discloses a system and method for routing multicast packets in a subnetwork so as to conserve bandwidth in at least some of the network segments or collision domains of the subnetwork. Multicast packets are only retransmitted in the network segments that are on a path to a host that is a member of the multicast group of hosts to which the multicast packet is directed.

SUMMARY OF THE INVENTION

The invention provides a method and apparatus for incorporating content processing and content routing intelligence into networks. In one embodiment, the content processing and routing (CPR) system is aware of the content and requirements of data and service requests, as well as the capabilities of all services accessible via the system. Efficient network routing is accomplished by considering the capabilities of the available transmission channels, and the transmission needs of all current transmission service requests. Also, service requests are able to be cast without specifying a particular service to fulfill the request. A service request is routed to the most suitable service or combination of services to fulfill the request. This permits services to be added to the system without reconfiguration or reprogramming existing applications. The CPR system also provides a mechanism for transparently converting data to accommodate data format differences between clients and services.

In one embodiment, the CPR system comprises a system kernel consisting of core software modules that are required to load, initialize and start CPR services, and that allow the services to communicate securely. The CPR services conform to several general service types. These types include (1) application services that act as the interface between a specific application and the CPR system; (2) kernel services that provide services on behalf of the kernel, including service location and routing resolution; (3) content services that act on information in transit through the CPR system, including providing data conversions; (4) routing services that contain the routing logic specific to a particular application, such as broadcasting to a subscriber list; and (5) link services that provide for the joining of two CPR instances over a network or other transmission channel. Each service implementation of these general types performs a particular task or set of tasks and supports a standard set of software interfaces, such that the kernel and other services are able to call functions within the service.

Data exchange is supported for bounded data in the form of media objects and unbounded data in the form of media streams. An object handler kernel component is provided so that each service may uniformly read, write or delete data in a media object. Service requests are communicated between services in the form of remote service calls (RSCs) which are encapsulated within media objects. A remote service call manager kernel component packs and unpacks remote service calls from media objects and interfaces with services to issue the remote service call as direct function calls.

BRIEF DESCRIPTION OF THE DRAWINGS

FIG. 5A illustrates object flow when the service is acting as a server, and FIG. 5B illustrates object flow when the service is acting as a client.

DETAILED DESCRIPTION OF THE INVENTION

The present invention is a method and apparatus for content processing and routing. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

1. Hardware Embodiment of a General Purpose Computer System

Figure 10:
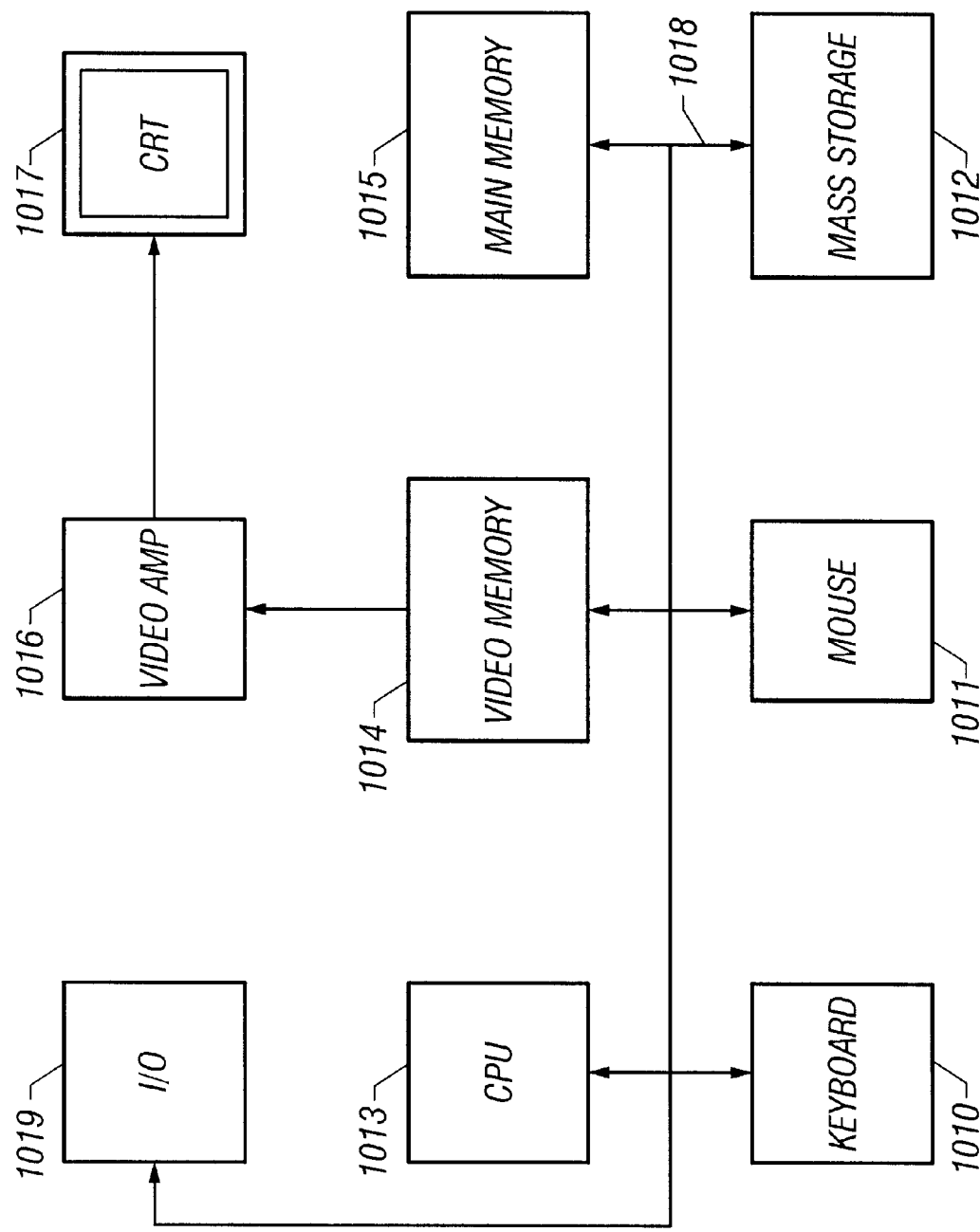
FIG. 10 is a block diagram of a general purpose computer suitable for implementing a content processing and routing system embodiment of the invention.

An embodiment of the invention can be implemented as computer software in the form of computer readable program code executed on a general purpose computer such as illustrated in FIG. 10. A keyboard 1010 and mouse 1011 are coupled to a bi-directional system bus 1018. The keyboard and mouse are for introducing user input to the computer system and communicating that user input to central processing unit (CPU) 1013. Other suitable input devices may be used in addition to, or in place of, the mouse 1011 and keyboard 1010. I/O (input/output) unit 1019 coupled to bi-directional system bus 1018 represents such I/O elements as a printer, network communications card, modem, A/V (audio/video) I/O, etc.

The computer system of FIG. 10 also includes a video memory 1014, main memory 1015 and mass storage 1012, all coupled to bidirectional system bus 1018 along with keyboard 1010, mouse 1011 and CPU 1013. The mass storage 1012 may include both fixed and removable media, such as magnetic, optical or magnetic optical storage systems or any other available mass storage technology. Bus 1018 may contain, for example, thirty-two address lines for addressing video memory 1014 or main memory 1015. The system bus 1018 also includes, for example, a 32-bit data bus for transferring data between and among the components, such as CPU 1013, main memory 1015, video memory 1014 and mass storage 1012. Alternatively, multiplex data/address lines may be used instead of separate data and address lines.

In one embodiment of the invention, the CPU 1013 is a microprocessor manufactured by Intel, such as a processor from the 80×86 or Pentium processor families. Other possible microprocessors include the 680×0 or PowerPC 60× processor families manufactured by Motorola, the SPARC microprocessor from Sun Microsystems, and the DEC Alpha. However, any other suitable processor or microcomputer may be utilized. Further, the apparatus may comprise a plurality of microprocessors in a multi-processing arrangement.

Main memory 1015 is comprised of dynamic random access memory (DRAM). Video memory 1014 is a dual-ported video random access memory. One port of the video memory 1014 is coupled to video amplifier 1016. The video amplifier 1016 is used to drive the cathode ray tube (CRT) raster monitor 1017. Video amplifier 1016 is well known in the art and may be implemented by any suitable apparatus. This circuitry converts pixel data stored in video memory 1014 to a raster signal suitable for use by monitor 1017. Monitor 1017 is a type of monitor suitable for displaying graphic images.

The apparatus of FIG. 10 may be used as a stand-alone system, or the apparatus may be coupled to other similar apparatus across any type of network (e.g., LAN, WAN (wide area network), PSTN (public switched telephone network), Internet, Cable TV, etc.), or any combination thereof.

The computer systems described above are for purposes of example only. An embodiment of the invention may be implemented in any type of computer system or programming or processing environment.

2. The Content Processing and Routing (CPR) System

The invention provides a software platform for incorporating content processing and content routing intelligence into any type of network, enabling re-use of existing applications and content in a network service, and enabling more efficient use of underlying data networks. The invention also provides for developing, deploying and managing of new services across a digital network, which, in the prior art, typically requires extensive customized system development and re-engineering of existing applications and content.

Scalable support is provided for processes. Where a large amount of information has to be processed very quickly to enable an application to deliver its business objectives (e.g., real-time video processing), the invention, automatically and transparently to the host application, generates multiple instances of the process on a single processor, multiple processors and/or at other nodes in a content routing and processing (CPR) network as appropriate.

Support is provided for bounded (object type) and unbounded (streaming type) data in a single model. Traditionally, in the prior art, separate tools are required for different types of applications. The CPR system of the invention includes a queue and stream manager which can interface with any service to support applications processing either objects or streams.

Attributes are associated with every service request which allow the CPR system to obtain knowledge about the content and requirements of each service request. Further, every service registers its associated capabilities with the CPR system. The CPR system uses its knowledge about the content and requirements of a service request as well as its knowledge of the available services to make intelligent routing decisions with respect to selecting suitable services for the fulfillment of service requests and selecting and scheduling network transmissions between CPR nodes, i.e., between computers containing an active instance of the CPR system.

The invention enables applications or devices competing for access to network or processing resources to be granted access in a more efficient, calculated manner. Depending on the nature of the information type and content, there are different requirements for the data crossing the network. By understanding all of the types and content of information, the invention controls usage of network resources in a more efficient manner. The routing decisions are not made at the usual network level (e.g., based on pre-defined destination network address, resolvable named network address, packet priority, circuit priority, etc.), but are based on the content and properties of the information itself. This may be independent of the type of underlying network that provides the digital communications capabilities.

Also, many digital devices and applications in the prior art are unable to communicate with each other due to differences in information formats and communications session protocols. The invention provides a platform through which these incompatible devices and applications can communicate. CPR system components handle the conversion of information formats and the support of appropriate communications session protocols.

Content Processing and Routing (CPR) System Architecture

One embodiment of the CPR system of the invention is an object-oriented design based around a kernel. Communication between all software components outside the kernel is asynchronous and location-independent, enabling applications and services developed on the CPR platform to scale from a single processor machine to high volume, multi-processor servers in a clustered or wide-area distributed environment. The kernel consists of the core software modules that are required to load, initialize and start CPR services and allow the services to communicate securely.

The fundamental application unit of the CPR system is known as a service. There are several different types of services, though all share certain common facets. A service performs a particular task or set of tasks and supports a standard set of software interfaces, such that the kernel and other services are able to call functions within the service. The general types of services in the CPR system include: kernel services, link services, application services, content services and routing services. An instance of the CPR system can host many services of each type and multiple instances of each service. Each service may support either bounded media objects or unbounded media streams. Service requests and inter-service communication are performed using a standard call format referred to as a remote service call (RSC). These remote service calls are encapsulated in bounded media objects to conform to a standard media-object-based interface.

Figure 9:
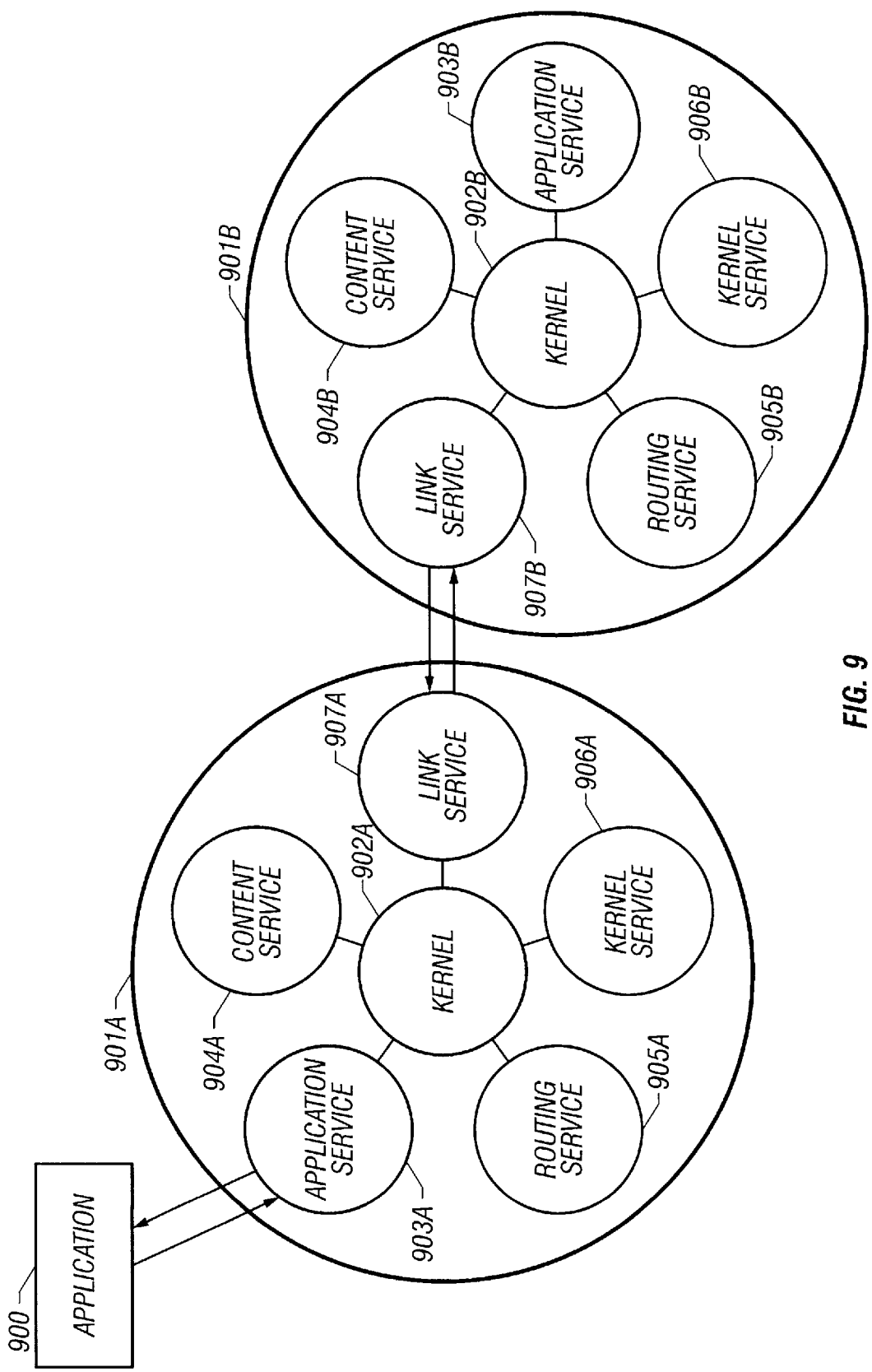
FIG. 9 is a block diagram illustrating an embodiment of the content processing and routing system of the invention.

FIG. 9 is a general block diagram illustrating the primary components of a CPR instance, and the general means by which a CPR instance communicates with an external application and a second CPR instance. CPR instance 901A comprises kernel 902A, application service 903A, content service 904A, routing service 905A, kernel service 906A, and link service 907A. CPR instance 901B comprises kernel 902B, application service 903B, content service, 904B, routing service 905B, kernel service 906B, and link service 907B.

Each type of service (i.e., kernel service, application service, etc.) performs a separate general function for the system. Each service in CPR instance 901A is coupled to kernel 902A to share the kernel resources. Similarly, kernel 902B in CPR instance 901B is coupled to each service within CPR instance 901B. Each service shown represents a general service type, and multiple specialized services of each service type may be present in the CPR instance. Further, when necessary, multiple instances of a service may run concurrently in the CPR system.

The CPR system communicates with external applications via application services specifically designed to transport data between the respective application and the CPR system in the manner required by the application. Thus, a different application service may be required for each possible external application.

In FIG. 9, application 900 is coupled to CPR instance 901A via application service 903A. A second external application may be similarly coupled to CPR instance 901A via another application service to allow the two external applications to exchange services, as well as utilize the other services provided by the CPR instance. Thus, a single instance of the CPR system may be used as a stand-alone platform for joining applications.

A computer system containing an active CPR instance is referred to as a CPR node. CPR nodes communicate across networks to other CPR nodes via link services. A CPR network comprises one or more CPR nodes joined or capable of joining in this manner. Different link services may be provided to support communication via many different communication protocols or across many different types of networks. Link services can interface to the network at any required level, for instance ATM (layer two of the OSI seven layer stack), TCP (transmission control protocol, layer four) or MQ (message-queuing, layer seven). In FIG. 9, link service 907A is coupled to link service 907B to join CPR instances 901A and 901B. Through the link provided by link services 907A and 907B, application 900 may access the services provided by CPR instance 901B, as well as any applications joined to CPR instance 901B via application service 903B.

Application Services

An application service operates as the interface between the CPR system and a third-party application or an industry-standard information interchange interface. The task of the application service is to obtain and/or deliver information externally to the CPR environment. To a third-party application, an application service may appear to be a conventional client, a server, a peer, or a gateway.

Examples of application services include a WWW (World Wide Web)/Java service, an FTP (file transfer protocol) service, a MAPI (messaging application programming interface) service, and a DMTF (Desktop Management Task Force) service. The WWW/Java service is able to receive requests using HTTP (hypertext transport protocol) over a TCP/IP (transmission control protocol/internet protocol) network from a web browser and to return HTML (hypertext markup language) content to a browser. A CPR system can emulate a WWW server or filter HTML requests for specific information while passing general requests to a third-party web server. Any Java application may access CPR capabilities through the WWW/Java service by using remote service calls.

An FTP service is used to send and receive files to and from an FTP server over a TCP/IP network connection. A MAPI service is used to connect as a user to any e-mail system supporting the messaging API, such as Microsoft Mail, Exchange, CompuServe and Internet Mail (SMTP—simple mail transfer protocol). A DMTF service enables DMTF-compliant system management products to remotely manage and monitor one or more CPR instances.

Kernel Services

Kernel services provide services on behalf of the kernel. Kernel services have special knowledge of the CPR kernel, and the kernel has special knowledge of these kernel services to enable the kernel and the kernel services to cooperate in providing fundamental system services, such as logging, monitoring, version management, etc., that form part of the core CPR system. Examples of kernel services include the kernel router service, the service locator service, the service monitor, the capability-based service request (CBSR) service and the network resource service.

The kernel router service is responsible for the precise routing of every media object and media stream, and also validates the security and integrity of every media object that it routes. The kernel router service will be discussed in further detail later in this specification.

The service locator service provides and maintains, in a database or directory, information about the location, identity and capabilities of all known services in a CPR network, and also maintains a list of remote service calls (RSCs) supported by each known service. The database for the service locator service may comprise a complete copy of all location, identity, capability and RSC information for the CPR network stored at each CPR node in the network. Also, the database may comprise a distributed database in which information about services local to each CPR node is stored at the respective CPR node, and is accessible to the service locator services of other CPR nodes on the network via remote service calls.

The service monitor tracks the status of all CPR services running on the local CPR node, and is also capable of monitoring services running on remote CPR nodes. The monitoring of remote CPR nodes is accomplished by performing scheduled or requested updates via remote service requests to and from the service monitors of the remote CPR nodes.

The capability-based service request service permits service requests to be routed based upon quality-of-service requirements of the request rather than a fixed route to a predetermined destination service. This is accomplished by assigning attributes to service requests. In resolving the route for the service request, selection is made from those services, or combinations of services, that fulfill the capability and quality-of-service requirements of the service request. If no single service can fulfill the service request, the CBSR service resolves a piecewise resolution of the service request by determining a route through multiple services that each perform one or more functions of the service request. The capabilities of each service are detailed in the database of the service locator service, and service status may be obtained from the service monitor.

For example, if a request is made to transmit data from one location to another, the request may include attributes detailing transmission requirements, such as encryption, bandwidth, and cost requirements. To resolve the transmission route, the CBSR service determines which link services are associated with transmission channels meeting the given requirements. Content services may also be used to change data formats to accommodate format requirements of specific routes.

Once a transmission channel has been selected, a remote service call may be made to the CBSR service on the CPR node at the other end of the transmission channel to further resolve the next section of the transmission route, if required. A given route may be registered so that subsequent transmissions with the same requirements may follow the same route without the need for further CBSR route resolution. Also, the registered route may be assigned a lifetime to prevent chosen routes from becoming obsolete due to changes in available bandwidth and other dynamic channel characteristics. The following are some examples of attributes that can be assigned to service requests:

| | |
|---|---|
| Net/Cost | Net/Bandwidth/Minimum |
| Net/Cost/PricedByUsage | Net/Bandwidth/Average |
| Net/Cost/PricedByConnection | Net/Security |
| Net/Cost/FixedPrice | Net/Security/Encryption |
| Net/Jitter | Net/Security/Encryption/Level |
| Net/Jitter/Maximum | Net/Security/Authentication |
| Net/Jitter/Average | Net/Security/Authentication/Level |
| Net/Latency | Net/Security/Delivery |
| Net/Latency/Maximum | Net/Security/Delivery/Guaranteed |
| Net/Latency/Average | Net/Security/Private |
| Net/Bandwidth | Net/Security/VirtualPrivate |
| Net/Bandwidth/Maximum | Net/Security/Public |
| Person/Name | Person/Position |
| Person/Name/English | Person/Company |
| Person/Name/Japanese | Person/TelephoneNumber |
| Person/Name/LastName | Person/TelephoneNumber/Home |
| Person/Name/FirstName | Person/TelephoneNumber/Work |
| Person/Name/Title | Person/TelephoneNumber/Mobile |

By performing service requests based on respective service capabilities, it is possible to have the service request transparently fulfilled by any service meeting the capability requirements. This permits service requests to be more generalized in nature without requiring an application to have any specific knowledge of the service providers in the CPR network. Further, applications may be added to the CPR network to provide services simply by providing the necessary application service, and characterizing the capabilities of the services the application can perform. Thus, client and server applications may be plugged into the CPR network without requiring reprogramming of other applications already linked to the CPR network. Also, the capabilities base can be increased or refined by further extending or refining attributes.

The network resource service manages resources in a networking environment. Link and network-related application services make remote service calls on the network resource service to request and schedule network resources. The network resource service is able to schedule the use of network resources with consideration for the competing needs of all requesting services. Data transmission is scheduled such that those requests with stricter requirements are granted the resources needed when the less strict requirements of other requests permit. Thus, for example, situations can be avoided where smooth real-time video or audio is disrupted due to high priority e-mail or transaction traffic.

Link Services

As previously described, a link service establishes a corresponding connection with another link service on a remote CPR node to transfer information between two CPR nodes across a network connection. Any link service may support many simultaneous peer-to-peer sessions. Examples of link services are TCP/IP, SPX/IPX, RTP (UDP) and MQ Assured Object Delivery. The TCP/IP service may be used to transfer media objects between CPR nodes over a TCP/IP network. The SPX/IPX (sequenced packet exchange/internetwork packet exchange) service may be used to transfer media objects between CPR nodes over a SPX/IPX network. The RTP service uses the real-time protocol implemented within UDP (user datagram protocol) to stream media streams over IP networks. The MQ assured delivery service is used to provide assured delivery of media objects between CPR nodes. A link service can establish a connection across any type of network (e.g., LAN, WAN, PSTN, Internet, cable TV, etc.), and can interface to the network at any layer.

Also, analog and non-standard "network" connections joining two CPR nodes can be supported. For example, one link service may provide data to an international mail service, which ships the data on, for example, a floppy disk via air mail to another country, where the data is input through a floppy drive to another link service to enter another CPR node. Thus, all types of networks may be used to join CPR nodes via link services. The link service provides the means for transferring data on and off of the given transmission channel.

Content Services

A content service acts on information in transit within a CPR network. Typically, a content service modifies the media object or data stream. This may be through conversion, replication or termination. Alternatively, a content service may perform non-intrusive analysis of the information in transit and report its results. Examples of content services include: conversion of a video stream from one format to another; generation of a video stream from still images; conversion of proprietary format information into HTML suitable for WWW publishing; conversion of mainframe application data into PC application data; performance of a virus check; language translation; speech-to-text or text-to-speech translation; and performance of keyword detection within a message or file.

Also, content services may be developed for assisting the CBSR service by determining new attributes, or transforming existing attributes, associated with service requests. For example, a content service may examine the contents of a media object or stream to determine content aspects of the enclosed data that may be reflected in particular attributes. The content service then assigns those attributes to the media object or stream. The content service may also examine existing attributes on a media object or stream to determine, for instance, by accessing an attribute library, other associated attributes to assign to the object or stream. Existing attributes may also be transformed into new attributes. The case of determining new or alternate attributes based on existing attributes is particularly useful when large streams of data are involved, as it is more efficient to send only the attributes to the content service.

Occasionally, the performance of a service request may entail the separation of object or stream data into separate components for individual processing by another service. A content service may be created to perform the requisite separation of data components, and to assign appropriate attributes to each new component. The same or a new content service may then recombine the data at a later step in the fulfillment of the service request.

The CPR system provides for the encapsulation of object or stream processing functionality implemented by hardware. This encapsulation is implemented either within a content service (for media processing of in-transit information) or an application service (where an event is triggered or information is sourced). Encapsulation of hardware functionality into a CPR service enables any CPR application to make use of the specialized hardware without additional development. It also permits capabilities to be implemented in the CPR network that may not be possible in a purely software environment.

Routing Services

A routing service contains the routing logic specific to a particular application, with respect to routing media objects or streams through the appropriate CPR services to carry out sequential processing and onward delivery as required by the application. For example, a subscriber video service may implement a routing service to direct how a single video stream input is routed to a plurality of subscribing customer locations over a CPR network through multiple CPR nodes via respective link services, culminating in the output of the video stream through endpoint application services for display. This routing may include accessing a first content service to censor certain data from the media stream for particular customers, or a second content service to insert subtitles into the media stream. A routing service may route multiple media objects or streams through multiple CPR services or instances of services in parallel, enabling very high CPR system throughput.

Service Application Programming Interfaces (APIs)

A simple service interface may be used to provide a standard, simplified interface to the CPR system for those services that do not require the use of complex CPR system functionality. In one embodiment of the invention, a simple service interface supports the following API by providing an implementation for each of the function calls:

void DLLEXPORT SimpService_Initialise( . . . )
    void DLLEXPORT SimpService_Start( . . . )
    void DLLEXPORT SimpService_Stop( );
    void DLLEXPORT SimpService_Shutdowno;
    BOOL DLLEXPORT SimpService_RouteInboundObject( . . . );
    void DLLEXPORT SimpService_ProcessRSC( . . . );
    void DLLEXPORT SimpService_PrepareTakeover( . . . )
    void DLLEXPORT SimpService_Takeovero( );
    void DLLEXPORT SimpService_PrepareHandover( );
    void DLLEXPORT SimpService_Handovero( );

The Initialize( ) function call refers to the initialization of the simple service interface, and the loading of all associated services. The Shutdown( ) function call implements the controlled shutting down of the simple service interface and all associated services. The Start( ) and Stop( ) function calls are used to start and stop sessions with individual services. RouteInboundObject( ) routes an incoming media object to the destination service served by the simple service interface, and returns a Boolean value indicating whether the media object can be routed successfully. ProcessRSC( ) is called to process a remote service call via the remote service call manager.

PrepareTakeover( ) and Takeover( ) are function calls referring to one service "taking over" for another service, for example, in the replacement of an older version of a service with a newer version. PrepareHandover( ) and Handover( ) are function calls for the service that is "handing operation over" to the service that is "taking over." These function calls allow for services to be swapped without interrupting the operation of the CPR system.

In one embodiment of the invention, in addition to any other APIs for carrying out specific functionality, services other than those using the simple service interface provide function call implementations for the following basic API:

void DLLEXPORT Service_AddnternalQueue( . . . )
    void DLLEXPORT Service_AddExternalQueue( . . . )
    void DLLEXPORT Service_Start( . . . )
    void DLLEXPORT Service_Stop( . . . )
    void DLLEXPORT Service_Shutdown( . . . )
    void DLLEXPORT Service_PrepareTakeover( . . . )
    void DLLEXPORT Service_Takeover( . . . )
    void DLLEXPORT Service_PrepareHandover( . . . )
    void DLLEXPORT Service_Handover( . . . )

The AddInternalQueue( ) and AddExternalQueue( ) function calls are for establishing incoming and outgoing object queues for a given service. The remaining function calls are as discussed above with respect to the simple service interface.

To manage application-specific routing of media objects and the links necessary to support those routes in one embodiment of the invention, routing services support the following API:

void DLLEXPORT Service_Route_AddMediaType( . . . )
    void DLLEXPORT Service_Route_AddRoute( . . . )
    void DLLEXPORT Service_Route_AddSupportedType( . . . )
    void DLLEXPORT Service_Route_AddRemoteAddress( . . . )
    void DLLEXPORT Service_Route_AddConversion( . . . )
    void DLLEXPORT Service_Route_StartSingle( . . . )
    void DLLEXPORT Service_Route_ShutdownSingle( . . . )
    void DLLEXPORT Service_Route_StartServiceLinks( . . . )
    void DLLEXPORT Service_Route_ShutdownServiceLinks(. . .)

Link services support the following function call for adding the destination address of another CPR node accessible over a network or channel according to one embodiment of the invention.

void DLLEXPORT Service_AddExtenalRemoteAddress( . . . )

In one embodiment of the invention, streaming link services also support the following API:

```
void                              DLLEXPORT
    Service_Stream_AddStreamRoute( . . . )
void    DLLEXPORT    Service_Stream_
    AddRemoteAddress( . . . )
void                              DLLEXPORT
    Service_Stream_AddMediaType( . . . )
```

Other behavioral differences between services may be manifested by their remote service call APIs.

System Kernel Embodiment

Figure 1:
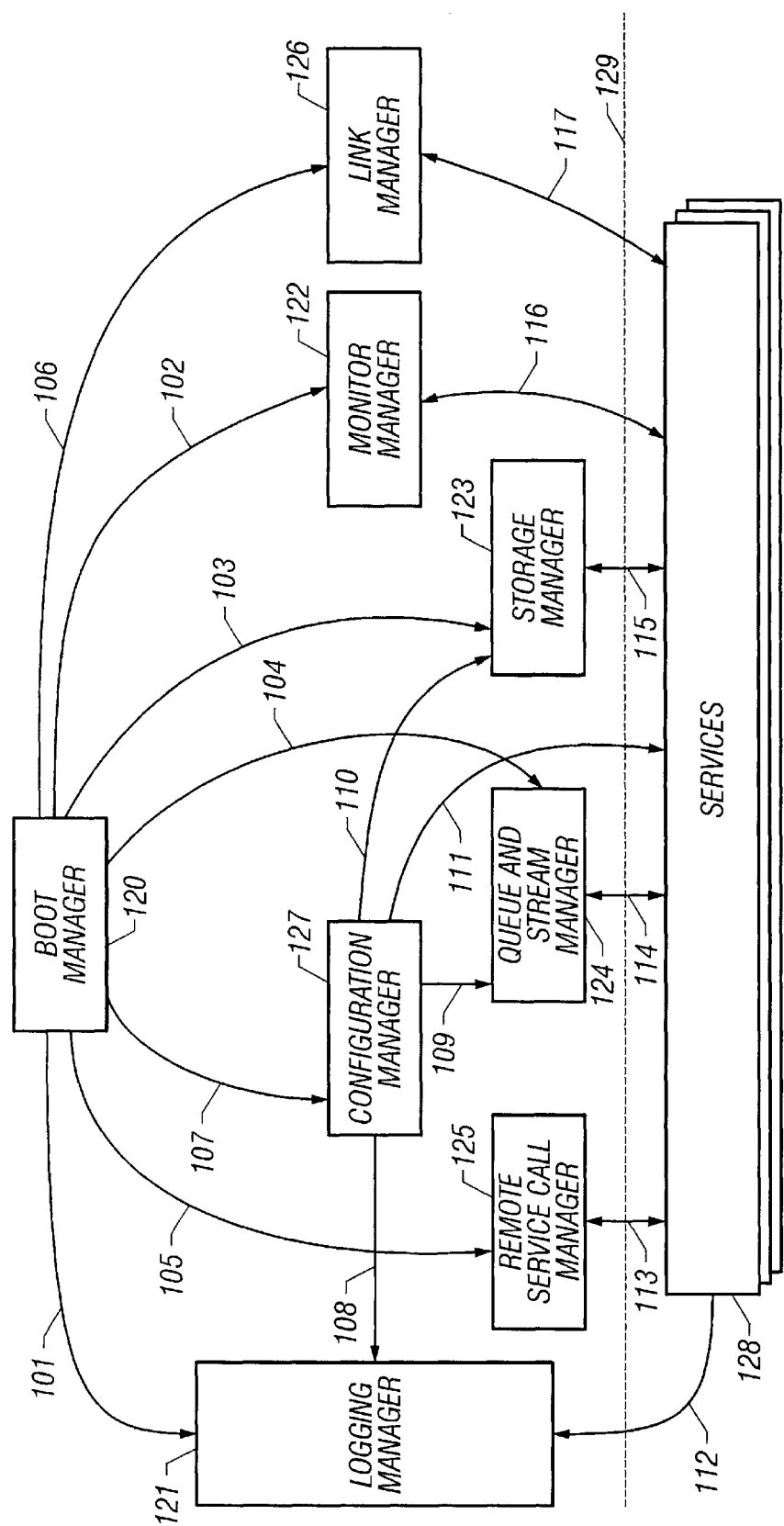
FIG. 1 is a diagram of component interaction in the system according to an embodiment of the invention.

FIG. 1 is a block diagram illustrating components of the system kernel and their interaction with each other and CPR services. Shown in FIG. 1 are eight management components resident in the kernel of the system, and a plurality of services jointly identified as element 128. Components of the system kernel are shown above dashed line 129, whereas services 128 are shown below dashed line 129. The kernel management components in the embodiment of FIG. 1 include the following: boot manager 120, logging manager 121, monitor manager 122, storage manager 123, queue and stream manager 124, remote service call (RSC) manager 125, link manager 126 and configuration manager 127. Lines coupling components in FIG. 1 represent a path of interaction between those components.

Boot manager 120 is coupled to logging manager 121, monitor manager 122, storage manager 123, and queue and stream manager 124 via lines 101, 102, 103 and 104, respectively. Boot manager 120 is also coupled to remote service call manager 125, link manager 126 and configuration manager 127 via lines 105, 106, and 107, respectively. Services 128 are coupled to logging manager 121, monitor manager 122, storage manager 123, queue and stream manager 124, remote service call manager 125, link manager 126 and configuration manager 127 via lines 112, 116, 115, 114, 113, 117 and 111, respectively. Configuration manager 127 is further coupled to logging manager 121, storage manager 123, and queue and stream manager 124 via lines 108, 110, 109, respectively.

Boot manager 120 (also referred to as the "boot loader") contains the initial start-up code for the CPR system. Boot manager 120 is responsible for starting an instance of the CPR system by loading and starting the other CPR kernel components in the correct order.

Figure 11:
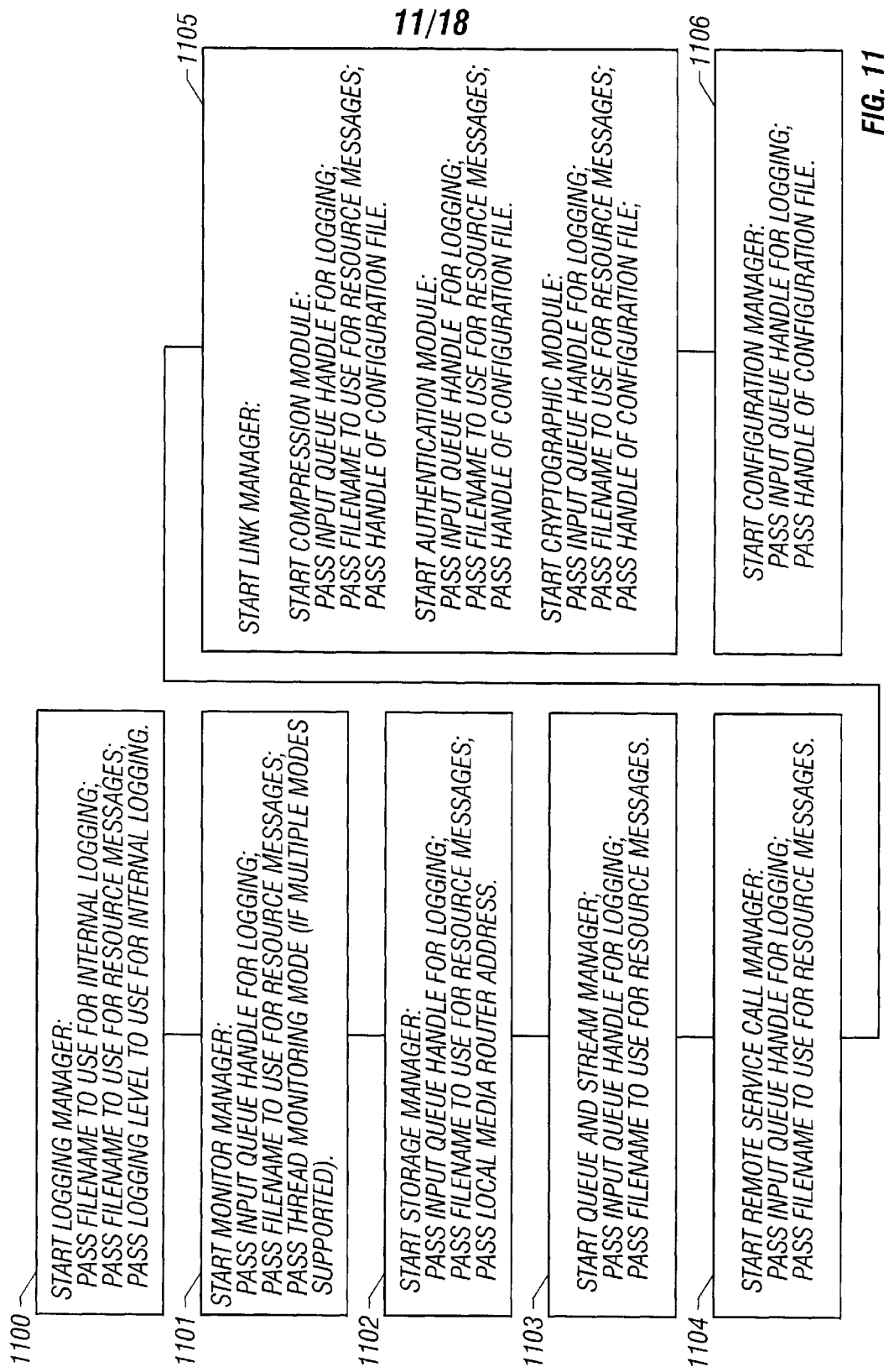
FIG. 11 is a flow diagram illustrating an embodiment of the startup process for the kernel components.

The lines between boot manager 120 and the other kernel components in FIG. 1 represent the start-up interaction. FIG. 11 illustrates one embodiment of a kernel resource startup procedure carried out by the boot manager. In step 1100, the boot manager invokes the logging manager's Start( ) method, and passes the logging manager the filename and logging level to use for internal logging, as well as the filename to use for resource messages. The logging level is used by the logging manager to filter out lower priority log messages. Those log messages whose logging level falls below the logging level stored in the logging manager are discarded.

In step 1101, the boot manager invokes the Start( ) method of the monitor manager, and passes the monitor manager an input queue handle for logging purposes, a filename to use for resource messages, and, optionally, a thread monitoring mode if more than one monitoring mode is supported. The monitor manager may be used in a multi-processor environment to determine processor affinity based on monitored thread execution behavior. The thread monitoring mode can be used to select an affinity assignment strategy.

In step 1102, the boot manager invokes the storage manager's Startup( ) method, and passes the storage manager an input queue handle for logging purposes, the filename to use for resource messages, and the local CPR node address. In step 1103, the boot manager invokes the Start( ) method of the queue and stream manager, and passes the input queue handle for logging purposes and the filename to use for resource messages. In step 1104, the boot manager invokes the Start( ) method of the remote service call manager, and passes the input queue handle for logging purposes and the filename to use for resource messages.

In step 1105, the boot manager starts the individual modules (compression, authentication, cryptographic, etc.) of the link manager by invoking their respective Start( ) methods. Each module is passed an input queue handle for logging, a filename for resource messages and the handle of a configuration file. In step 1106, the boot manager invokes the Start( ) method of the configuration manager, and passes the input queue handle for logging and the handle of a configuration file.

Referring again to FIG. 1, configuration manager 127 initializes any logs required by services through the logging manager 121 as indicated by line 108, initializes any queues required by services through queue and stream manager 124 as indicated by line 109, and initializes any storage entities required by services through the storage manager 123 as indicated by line 110. Then, as stated previously, via line 111, configuration manager 127 loads each service 128 dynamically and passes appropriate log, storage and queue handles. Each service is then started in turn.

Services 128 represent the application units of a CPR instance. Each service interacts with logging manager 121 via line 112 for logging messages to a log. Each service also uses the remote service call manager 125 for calling functions on other services and to act as a server for such functions (line 113). Queue and stream manager 124 is used by each service to pass media objects to another service via line 114. Configuration information for each service is loaded and saved via interaction with storage manager 123, as indicated by line 115. Whenever a service creates a thread, the thread is registered with monitor manager 122 via line 116. Link services interact with link manager 126, as indicated by line 117, in the process of communicating with other remote link services.

Kernel Components and APIs

Logging manager 121 is used by all CPR system components for the logging of messages. The logging manager coordinates the input of logging information from a large number of threads and processes which are imultaneously active within the CPR system. The logging manager also manages the structure and file storage of output logs. One embodiment of the logging manager API is provided below.

| Logging Manager API | |
|---|---|
| Start( ); | Sets up the internal logging file and logging level, and begins internal logging |
| Stop( ); | Stops internal logging |
| CreateInputQueue( ); | Creates an input queue for writing log strings |
| CreateOutputQueue( ); | Creates an output queue; the output queue may receive strings from several input queues and write them to a file |
| DeleteInputQueue( ); | Deletes an input queue previously allocated |
| DeleteOutputQueue( ); | Deletes an output queue previously allocated |
| BindQueue( ); | Binds an input queue to an output queue |
| WriteLog( ); | Writes a message to a given input queue; messages below the current logging level are discarded |
| GetLoggingLevel( ); | Retrieves the current logging level in force on an input queue |
| BindDirect( ); | Creates an input queue and binds it to a given output queue |
| WriteEventLog( ); | Writes a message to a particular event log |

Whenever a service wishes to log a message to the CPR logs, the service uses the logging manager API. In one embodiment, the logging manager API methods use a separate resource DLL (dynamic link library) that contains the service's respective log messages, or resource messages, with spaces for insertion of variable text. This allows an alternate language to be used for logging without restarting the CPR instance. Also, the logging manager may write out binary versions of the log messages that do not include any text from the resource file, only the resource ID. This allows a log viewing application to display the binary log in whichever language is required.

For example, a TCP/IP link service may use the file mrtcpipres.dll as its resource DLL. Some sample resource messages that might be included in a TCP/IP link service resource DLL are:

| Message Name | Message |
|---|---|
| IDS_MRTCP_STARTUP | "MRTCPIP Transport service V1.05 Copyright (c) 1996–97 RedBox Holdings NV. All rights reserved." |
| IDS_STARTUP_FAILED | "This service failed to start up correctly. This service is unable to route data." |
| IDS_STARTUP_WINSOCK_INIT_SUCCESS | "Windows Sockets (2.0) initialized." |
| IDS_STARTUP_WINSOCK_INIT_FAILURE | "Error initializing Windows Sockets. Error was %1!d!." |
| IDS_STARTUP_INVALID_CONFIG_FILE | "Error accessing the kdb file. This service will have no external links - unable to route data." |
| IDS_SHUTDOWN_WINSOCK_SUCCESS | "Windows Sockets successfully closed." |
| IDS_SHUTDOWN_WINSOCK_FAILURE | "Error closing Windows Sockets. Error was %1!d!." |
| IDS_CONFIG_LINK_LOCAL_IP | "Link %1: Local I.P. address is %2." |
| IDS_CONFIG_LINK_REMOTE_IP | "Link %1: Remote I.P. for this link is %2." |
| IDS_CONFIG_LINK_SERVER_PORT | "Link %1: The server is listening on port %2!d!." |
| IDS_CONFIG_FILE_ERROR | "Link %1: Error in line %2." |
| IDS_SERVER_START_SUCCESS | "Link %1: Server started successfully." |
| IDS_SERVER_START_FAILURE | "Link %1: Error starting the server. This link will not be able to accept incoming data." |
| IDS_SERVER_SHUTDOWN_SUCCESS | "Link %1: Server stopped successfully." |
| IDS_SERVER_SHUTDOWN_FAILURE | "Link %1: Error stopping the server." |
| IDS_SERVER_SOCKET_CREATE_SUCCESS | "Link %1: Server listening socket created successfully." |
| IDS_SERVER_SOCKET_CREATE_FAILURE | "Link %1: Error creating Server listening socket." |
| IDS_SERVER_SOCKET_NAME_FAILURE | "Link %1: Server unable to name to socket for client associations. Error was %2!d!." |
| IDS_SERVER_LISTEN_SUCCESS | "Link %1: Server listening for network ACCEPT and CLOSE messages." |

The elements %1, %2, etc. in the resource messages are replaced during message logging by data parameters specific to the event causing the message to be logged. Foreign language versions may alter the order of display of these data parameters to fit the respective language syntax of their messages.

Monitor manager 122 monitors all threads created in the respective instance of the CPR system. A mechanism is provided for specifying a thread "type" which may be used, in addition to monitoring of thread execution behavior, to more efficiently determine processor affinity for threads in a multi-processor environment. An embodiment of the monitor manager API is provided below.

| Monitor Manager API | |
|---|---|
| Start( ); | Starts the monitor manager in a given mode |
| Shutdown( ); | Stops the monitor manager |
| CreateThread( ); | Creates a thread with a given stack size, start address, thread ID, thread type, etc. |

Storage manager 123 is used by all CPR system components for the storage of configuration information. In an embodiment of the invention, a database management scheme is used to store, retrieve and update configuration information. The storage manager API provides mechanisms for loading and closing databases, opening and closing database sessions, and retrieving, writing or deleting information from a database. One embodiment of the API is provided below.

| Storage Manager API | |
|---|---|
| Startup( ); | Initializes the storage manager |
| LoadConfig( ); | Loads a file as a database and returns a handle |
| CloseConfig( ); | Closes a database and saves the data to a file |
| Shutdown( ); | Shuts down all configuration databases |
| SetupSession( ); | Starts a session with a database |
| EndSession( ); | Cancels a session with a database |
| GetFirstAddress( ); | Retrieves first unique address in database |
| GetNextAddress( ); | Returns next unique address for any given session |
| GetFirstType( ); | Retrieves the first type in a configuration for an address/type tuple |
| GetNextType( ); | Retrieves next type in a configuration for the given session |
| GetFirstService( ); | Retrieves the first unique service given an address and type |
| GetNextService( ); | Retrieves the next unique service for a given session |
| GetFirstName( ); | Retrieves the first name in a configuration for an address/type/service three-tuple |
| GetNextName( ); | Retrieves the next name for a session |
| GetInformation( ); | Retrieves info from the specified data point |
| SaveInformation( ); | Adds the given data to the database at the given data point |
| DeleteInformation( ); | Deletes the specified data point |

In one embodiment, configuration information is stored in a Unicode text file, with fields separated by a first character delimiter, such as a comma, and records separated by a second character delimiter, such as a carriage return/line feed pair. The data itself may contain further character delimiters to separate data elements. The fields in one embodiment include: (1) the CPR address or node name; (2) the service type of information (configuration, queue configuration, encryption module configuration, etc.); (3) the data type of the information (queue, service, kernel component, log, etc.); (4) name of data type (service name, queue name, log name, etc.); (5) an update flag (typically, −1); (6) a number indicating (directly or indirectly) the length of the data; and (7) the data itself. An example record for configuring a web (HTTP) service might appear as:

CPR1,Config,SERVICE,HTTPSRV,−1,0, ; ; ;C:\cpr\bin\httpsrv.dll;
C:\cpr\bin\httpsrvres.dll; ;NORMAL; ; ; ;ROUTE;MainLog;HTTPSRVKDB; ;

wherein the node name is CPR1, the service type of information is Config, the data type is SERVICE (i.e., service configuration data), the name of the service is HTTPSRV, the update flag is enabled as "−1". The configuration data elements are delimited by semicolons, and include the pathname for the service DLL (httpsrv.dll), the pathname for the service's resource DLL (httpsrvres.dll) containing resource messages for logging, the log file name (MainLog), a separate routing database for use by the web service (HTTPSRVKDB), and other configuration parameters. Blank data elements are place holders for elements used in the configuration of other services, but unneeded for this particular service example. For instance, for services using the simple service interface, the pathname of the simple service DLL may be entered prior to the pathname of the service DLL.

Queue and stream manager 124 manages object queues within the CPR system. Object queues are the input and output queues for all media objects that are being passed to or from CPR services within a single instance of the CPR system. There are usually many such queues in a CPR instance. The queue manager transfers media objects between object queues and signals each service when a media object has arrived on its object queue. Similarly, means are provided for establishing stream buffers for unbounded stream data transmitted between services. The queue and stream manager provides a mechanism for binding services with object queues and stream buffers. The queue and stream manager also creates media objects and stream buffers. Media objects are allocated from a bank or group of media objects of a given size. An embodiment of the queue and stream manager API is provided below.

| Queue & Stream Manager API | |
|---|---|
| Start( ); | Starts the queue and stream manager |
| Shutdown( ); | Shuts down the queue and stream manager in this instance |
| CreateObjectBank( ); | Creates a new object bank |
| DeleteObjectBank( ); | Deletes a specified object bank |
| CreateObjectQueue( ); | Creates an object queue |
| ModifyObjectQueue( ); | Modifies an existing object queue |
| DeleteObjectQueue( ); | Deletes a specified object queue |
| CreateMediaObject( ); | Creates a media object (allocated from an appropriate bank) |
| LockObjectToPtr( ); | Obtains the pointer to the object memory from the object handle |
| UnlockObject( ); | Unlocks the object previously locked w/ LockObjectToPtr() |
| DeleteMediaObject( ); | Deletes a media object allocated by CreateMediaObject() |
| ReallocateMediaObject( ); | Reallocates the size of a media object |
| BindToInputQueue( ); | Binds a given service with input end of a queue |
| GetQueueClassType( ); | Retrieves the class type of objects associated w/ a given queue |
| PlaceObjectOnQueue( ); | Places a media object on a given queue |
| BindToOutputQueue( ); | Binds a given service with the output end of a queue |
| RegisterQueueSemaphore( ); | Registers a semaphore object with the output end of a queue |
| GetObjectFromQueue( ); | Retrieves an object from a queue |
| UnbindQueue( ); | Unbinds a service from a queue |
| CreateStreamBuffer( ); | Creates a stream buffer with a specified maximum size and number of channels |
| DestroyStreamBuffer( ); | Destroys a given stream buffer |
| BindToInputStream( ); | Binds a given service to the input of a given stream buffer |
| BindToOutputStream( ); | Binds a given service to the output of a given stream buffer |
| RegisterStreamEvent( ); | Registers a given event with a stream |
| AddDataToStream( ); | Adds data to a stream buffer |
| GetDataFromStream( ); | Retrieves data from a stream buffer |

Remote service call (RSC) manager 125 enables simple, high performance function calls to be passed between CPR services, independently of location. The remote service call manager handles the packaging or encapsulation of function calls and parameters into media objects for delivery to the appropriate service and the unpackaging at the receiving end. The remote service call manager also manages the return and packaging/unpackaging of results as media objects. The interaction between the RSC manager and CPR services is described more fully with respect to FIGS. 2, 4, and 5A–B, later in this specification. An embodiment of the RSC manager API is provided below.

| Remote Service Call Manager API | |
|---|---|
| Start( ); | Starts the RSC manager |
| Shutdown( ); | Stops the RSC manager |
| Callside_Start( ); | Initializes the calling side info for a service |
| Callside_ProcessObject( ); | Used to process a received RSC object at the calling side; returns TRUE if processed |
| InitializeCall( ); | Sets up a new function call |
| AddParameter( ); | Adds a parameter to a function |
| MakeCall( ); | Makes a function call |
| GetStatus( ); | Tests the state of a given function call |
| WaitMore( ); | Waits for a longer time for completion of a function call |
| GetStatusDescription( ); | Retrieves any description of an error state |
| GetReturnValue( ); | Gets a return parameter from a returned function |
| CloseCall( ); | Destroys an outbound call |
| ReceiveSide_Start( ); | Starts a session for responding to API calls |
| ReceiveSide_ProcessMediaObject( ); | Used to process an incoming media object at the receive side; returns TRUE if processed |
| GetParameter( ); | Retrieves a parameter from a function call |
| GetSafeParameter( ); | Same as above, but exceptions are trapped and the size is set to zero and the data to null automatically |
| AddReply( ); | Adds a reply to a function call |
| ReturnReply( ); | Replies to a function call |
| CloseReply( ); | Closes a reply to a function call |

Link manager 126 consists of three primary components used by link services: a compression module manager, an encryption module manager, and a terminal/authentication module manager. The compression module manager provides the management of installable compression modules used mainly by link services. The installable compression modules are kernel level components implemented to support a standard interface specification. The encryption module manager provides the management of installable encryption modules used mainly via link services. The installable encryption modules are also kernel level components implemented to support a standard interface specification. The terminal/authentication module manager provides the management of installable authentication modules which enable two link services on separate CPR nodes to determine that they are each communicating with the authentic correspondent.

Each module manager comprises an API for managing the respective component modules. These APIs further include general function calls for authentication, encryption or compression of data. However, authentication, encryption and compression are implemented within the respective component modules. The manager API passes those function calls through to the API of a given installed component module for actual processing. An embodiment of the API for the terminal/authentication module manager is provided below.

| Terminal/Authentication Module Manager (Link Manager) API | |
|---|---|
| Start( ); | Starts the terminal/authentication module manager |
| Stop( ); | Stops the terminal/authentication module manager |
| Initialize( ); | Sets up all terminal services |
| AddTerminalService( ); | Installs a terminal service DLL (module) |
| StartTerminalSession( ); | Starts a terminal session of a given terminal service |
| GetDataFromTerminal( ); | Retrieves data to be sent across transmission channel to the remote terminal |
| GiveDataToTerminal( ); | Passes data retrieved from the transmission channel to the terminal |
| ConvertToChannelData( ); | Lets the terminal convert regular data into a form to place on the channel |
| ConvertFromChannelData( ); | Lets the terminal convert channel data back to the data buffer originated at the source terminal |
| StopTerminalSession( ); | Ends a terminal session |

Each respective terminal/authentication module implements the following API which receives function calls passed from the terminal/authentication module manager:

Terminal_Startup( ); //starts the given terminal/ authentication module

Terminal_StartTerminalSession( );

Terminal_GetDataFromTerminal( );

Terminal_GiveDataToTerminal( );

Terminal_StopTerminalSession( );

Terminal_Shutdown( ); //shuts down the given terminal/ authentication module

In addition, the following type definitions are associated with the terminal/authentication module manager.

```
typedef enum
{
    KTERM_SLAVE,    // The terminal should wait for
communication
    KTERM_MASTER   // The terminal should initiate the protocol
} KTERM_TYPE;
typedef enum
{
    KTERM_NOTIFY_WAITING,    // The terminal is waiting for
the other end
    KTERM_NOTIFY_HASDATA,    // The terminal has data it
wishes to send over the channel
    KTERM_NOTIFY_AUTHENTICATED, // The terminal has
authenticated the remote terminal
    KTERM_NOTIFY_SECURE,         // The terminal has
```

-continued

```
agreed on an encryption standard for the channel
(all data should flow through the terminal)
    KTERM_NOTIFY_COMPRESS,         // The terminal has
agreed on a compression standard for the channel
(all data should flow through the terminal)
    KTERM_NOTIFY_NOTAUTHENTICATED,  // The terminal
could not authenticate the remote terminal
    KTERM_NOTIFY_DISCONNECT        // The terminal
has disconnected from the channel
} KTERM_NOTIFICATION;
```

This callback is in the link service:

typedef void (*PFN_TERMMAN_CALLBACK) (KTERM_HANDLE *terminal_handle, KTERM_NOTIFICATION notification_message, DWORD *notification_param, LPDWORD callback_data);

When a link service wishes to use a terminal/ authentication procedure, the link service first calls the StartTerminalSession( ) function of the terminal/ authentication module manager as follows:

```
void DLLEXPORT KTermMan_StartTerminalSession(
    const_TCHAR *terminal_name,    // The name of the terminal
service
    const_TCHAR *terminal_address,  // Address of terminal
    KTERM_TYPE  terminal_type,     // Whether the terminal is
to be the master or slave
    KTERM_HANDLE *terminal_handle  // Will be filled with
the handle to this terminal session
    PFN_TERMMAN_CALLBACK callback,  // The callback to be
used for notification of important state changes
    LPDWORD      callback_data);
```

Via the callback function passed to the StartTerminalSession( ) function, the link service receives notifications about the authentication process. If the authentication process requires authentication data to be sent to the remote link service, the callback function is called by the terminal/authentication module manager. The link service retrieves the authentication data from the terminal and sends it to the remote link service. When the remote link service receives the authentication data, the remote link service passes the data to the remote terminal/authentication module manager. Typically, the remote terminal will initiate a further callback from the remote link service to reply to the local terminal. After one or more rounds of sending authentication data between the local and remote terminals, the callback function is called indicating whether the link has been authenticated or not.

Embodiments of APIs for the encryption and compression module managers are provided below. The operations indicated below are, in most cases, performed by forwarding the function call to an appropriate module in which the operation is implemented.

| Encryption Module Manager (Link Manager) API | |
| --- | --- |
| Start( ); | Starts the encryption module |
| Stop( ); | Stops the encryption module |
| Initialize( ); | Sets up all crypto services found in the configuration file |
| AddCryptoService( ); | Installs a crypto service DLL |
| EncryptObject( ); | Encrypts a media object |
| DecryptObject( ); | Decrypts an encrypted media object |
| DeleteObject( ); | Deletes an object created by EncryptObject() or DecryptObject() |
| AddPublicKey( ); | Adds a public key to the database supported by the encryption type |
| RevokeKey( ); | Revokes a key |

Each respective encryption module implements the following API which receives function calls passed from the encryption module manager, and carries out the indicated operation as befits the encryption standard supported by the given module:

KCryp_Startup( ); // starts the given encryption module

KCryp_EncryptObject( );

KCryp_DecryptObject( );

KCryp_DeleteObject( );

KCryp_AddPublicKey( );

KCryp_RevokeKey( );

KCryp_Shutdown( ); // shuts down the given encryption module

Configuration manager 127 of FIG. 1 is used to manage the services running in a CPR instance. The configuration manager is responsible for loading and starting all CPR services, including kernel services. The start-up configuration of a CPR instance (i.e., which services get loaded, how initial resources are allocated, language of operation, etc.) is defined by a configuration script. The configuration script is retrieved by the boot manager from a database loaded by the storage manager 123, and is passed to the configuration manager by the boot manager. The configuration manager parses the configuration script to create an internal model of the CPR start-up configuration. The configuration manager then creates the appropriate resources, and loads, initializes, and starts the CPR services, as represented with line 111 in FIG. 1.

The configuration manager is also called to provide the orderly shutdown of services and deallocation of initial resources during a CPR shutdown process. The configuration manager can also perform this function dynamically, starting or stopping services during CPR system operation. An embodiment of the configuration manager API is provided below.

| Compression Module Manager (Link Manager) API | |
| --- | --- |
| Start( ); | Starts the compression module manager |
| Stop( ); | Stops the compression module manager |
| Initialize( ); | Sets up all compression services found in the configuration file |
| AddCompService( ); | Installs a compression service DLL |
| CompressObject( ); | Compresses a media object |
| DecompressObject( ); | Decompresses a compressed media object |
| DeleteObject( ); | Deletes an object created by CompressObject() or DecompressObject() |

Each respective compression module implements the following API which receives function calls passed from the compression module manager, and carries out the indicated operation as befits the compression standard supported by the given module:

KComp_Startup( ); // starts the given compression module

KComp_CompressObject( );

KComp_DecompressObject( );

KComp_DeleteObject( );

KComp_Shutdown( ); // shuts down the given compression module

| Configuration Manager API | |
|---|---|
| Start( ), | Starts the configuration manager |
| Stop( ); | Stops the configuration manager |
| GetVariable( ); | Gets a variable defined |
| GetFirstService( ); | Returns details of first services currently active on this CPR instance |
| GetNextService( ); | Returns details of next service active on this CPR instance |
| PrepareScriptFromServiceObject( ); | Prepares a configuration script from a running service and returns the script as a string |
| ScriptSetup( ); | Configures a new service from a string of configuration information |
| ServiceSetup( ); | Starts up a service when CPR system is already running |
| ServiceShutdown( ); | Shuts down an existing service while CPR system continues to run |

Another kernel component which is not shown in FIG. 1 is the object handler. The object handler provides a standard interface for manipulating the contents of media objects. In one embodiment, the object handler is a media object API, such as that shown below, which provides a set of capabilities that allows any CPR service to manipulate objects without explicit knowledge of their data structure.

| Object Handler API | |
|---|---|
| StartSession( ); | Starts an object handler session; creates a new media object |
| EndSession( ); | Ends an object handler session; deletes the media object |
| GetObjectData( ); | Copies the raw data of the media object to a buffer |
| CompactObject( ); | Compacts the data of the media object; removes media marked as deleted |
| GetTotalSize( ); | Returns the total size of the media object |
| Add( ); | Adds a medium to the media object |
| Get( ); | Gets a medium from the media object |
| Delete( ); | Marks a medium in the media object as deleted |
| GetFirstName( ); | Retrieves the first name of the specified type, if present |
| SingleShot_GetFirstName( ); | Starts a session, retrieves first name of the specified type, and closes the session |
| GetNextName( ); | Retrieves the next name of the current type |
| AddName( ); | Adds a name of the specified type |
| GetFirstAddress( ); | Retrieves the first address of the specified type |
| SingleShot_GetFirstAddress( ); | Starts a session, retrieves the first address of the specified type, and closes the session |
| GetNextAddress( ); | Retrieves the next address of the current type |
| AddAddress( ); | Adds an address of the specified type |
| CompressObject( ); | Compresses the media object |
| DecompressObject( ); | Decompresses the media object |
| SignObject( ); | Creates a message digest for the media object and encrypts that digest using the private key for the source service |
| CheckSignedObject( ); | Tests to see if the media object is signed using SignObject |

A media object is the format in which all bounded data is passed between CPR services. There can be many different types of media objects, all of which share the same general structure. Examples of possible media object and media stream types are:

/Fax/FR/Outbound
/Fax/FR/Inbound
/Fax/FR/Response
/Multimedia/Combined/MPEG2System
/Multimedia/Video/MPEG2
/Multimedia/Video/AVI
/Multimedia/Video/QuickTime
/Multimedia/Image/PCX
/Multimedia/Image/PCX/4Bit
/Multimedia/Image/PCX/8Bit
/Multimedia/Image/PCX/16Bit
/Multimedia/Image/PCX/24Bit
/Multimedia/Image/BMP
/Multimedia/Image/TIFF
/Multimedia/Image/TIFF/Group3
/Multimedia/Image/TIFF/Group4
$Install/FileGrouping
$Install/InstallFile
$KRSC/OutboundCall
$KRSC/ReturnFromCall
$Debug/ObjectSpawn/TestObject
$Debug/PipePing/KSTATRequest
($ indicates internal system object types)

The above type object and stream types would be placed into the media object or stream as a name type so that the service the object or stream is directed to may know how to interpret the object or stream data. If it is a remote service call embedded in a media object, a service or the remote service call manager may determine that such is the case by using the SingleShot_GetFirstName( ) or GetFirstName( ) methods of the object handler to read the media object type.

Figure 13:
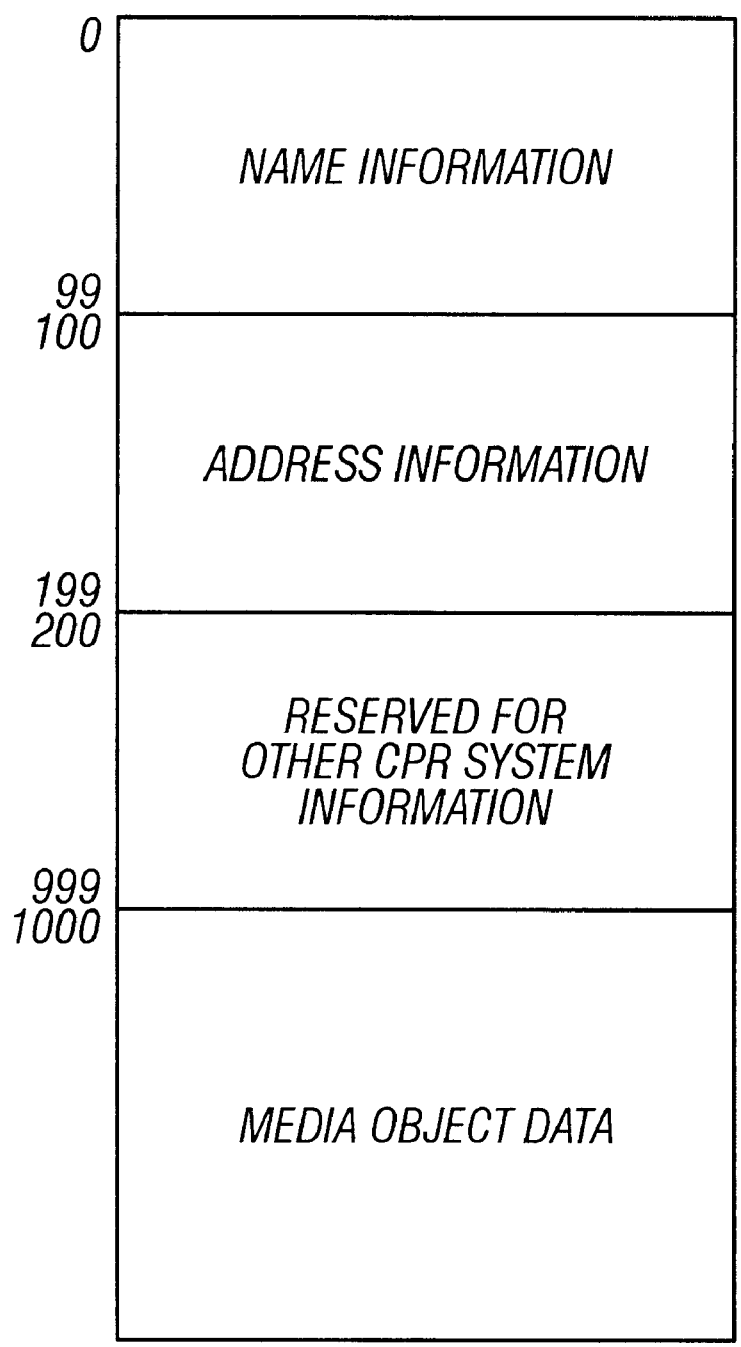
FIG. 13 is an example embodiment of a media object.

An example embodiment of a media object is illustrated in FIG. 13. The numbers associated with the media object example are index values that refer to a particular media type. Some specific media types are: name types for identification information, address types for source/destination and routing information, and data types for the data specific to the media object type. Index values 0–99 are used to store name type information, such as the universal ID of the media object or the media object public name types listed above (e.g., "/Fax/FR/Outbound"). Specific name types are assigned to each index value, but multiple names may be added to each name type. This may be accomplished, for example, by appending each added name to the last name after insertion of a name delimiter such as the character "/". Names would thus be stored as character strings in the format "/first name/second name/etc."

Similarly, address type information, such as the source and destination CPR node addresses, are stored in index values 100–199. As with name types, each index refers to a specific address type, but multiple addresses may be entered for each address type. In the embodiment shown, index values 200–999 are reserved for other CPR system information.

Index values 1000 and beyond are used to store data type information for the media object. The mapping of particular data types to each index above 1000 is specific to the type of media object, and is known by those services handling media objects of the given type. For example, services associated with faxing that use the media object type "/Fax/FR/Outbound" may store, at a first index, data regarding the number of pages in the fax, while at second and third indices, data regarding the recipient's telephone number and resolution may be stored. At another index, the fax data itself is stored. A fax application service may extract this information by invoking the Get( ) method of the object handler and specifying the appropriate media type index. Other services in the CPR system may add, delete or alter data in the media object over the course of the media object's transit of the CPR network.

The generation of a media object is performed by first opening a session with the object handler (StartSession( )). This returns a handle to the media object which is used in all subsequent object handler method invocations. Data is then added to the media object by using the AddName( ), AddAddress( ), and Add( ) methods. When all desired name, address and data types have been filled as needed, the media object is compacted by invoking the CompactObject( ) method. This reduces the size of the media object to the actual size of the enclosed data, and removes name, address and data type items marked as deleted. After the media object has been compacted, the object may be compressed, if desired, by invoking the CompressObject( ) method. The GetObjectData( ) method is then used to place the actual data of the media object into a newly allocated variable preferably matching the size of the actual object data. The data in the variable is then sent on to the CPR system for routing and further processing. To clean up after processing the object, the variable is deleted and the object handler session is closed using the EndSession( ) method.

Service/Kernel Interaction

Figure 12:
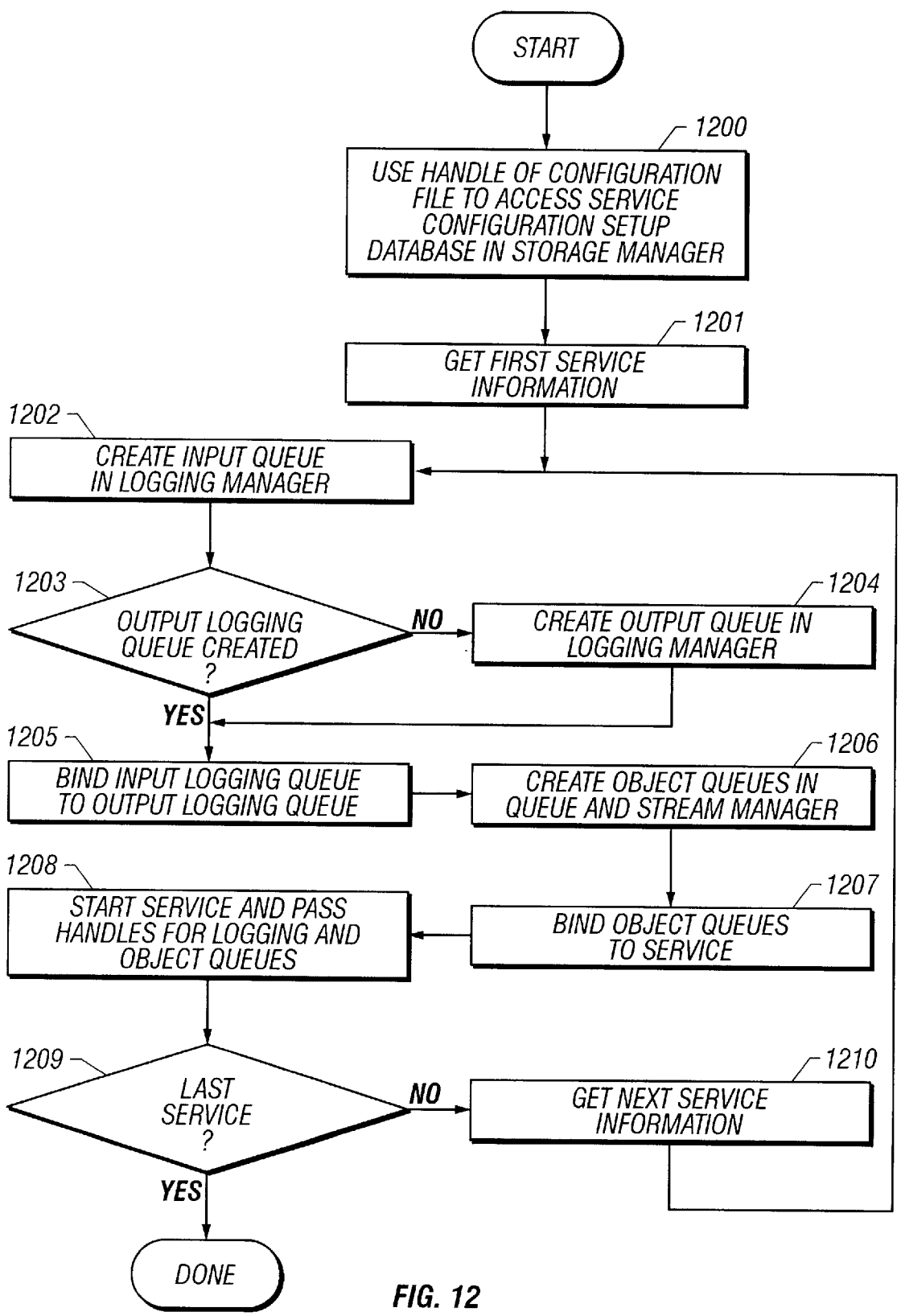
FIG. 12 is a flow diagram illustrating an embodiment of the startup process for services.

FIG. 12 is a flow diagram illustrating one embodiment of a general service startup procedure carried out by configuration manager 127. In step 1200 of FIG. 12, the configuration manager uses the handle of the configuration file to access the service configuration setup database in the storage manager. In step 1201, the setup information for the first service is retrieved from the service configuration setup database. Using the setup information, an input queue is created in the logging manager in step 1202. If, in step 1203, an output logging queue has been created, the procedure continues at step 1205. If an output logging queue has not yet been created, the configuration manager creates an output queue in the logging manager in step 1204, before proceeding to step 1205. In step 1205, the configuration manager binds the input logging queue to the output logging queue.

In step 1206, object queues are created for the service in the queue and stream manager, and in step 1207, the configuration manager binds the object queues to the service. In step 1208, the configuration manager starts the service, and passes the handles of the logging and object queues to the service. In step 1209, if there are no more services to start, the procedure is completed. Otherwise, the setup information for the next service is retrieved in step 1210, and the procedure returns to step 1202 for handling of the next service.

Figure 2:
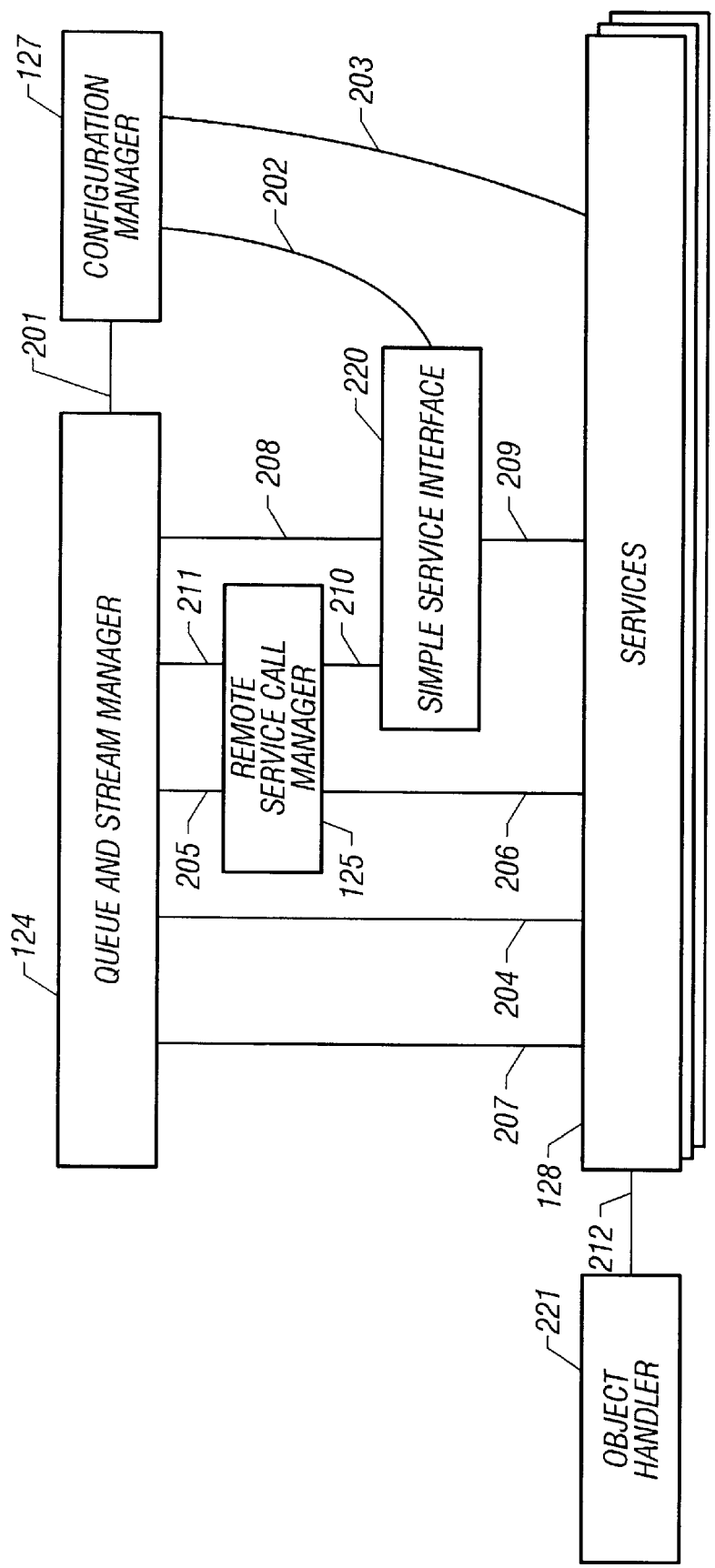
FIG. 2 is a diagram illustrating the interaction between services and the kernel with respect to queuing and object passing according to an embodiment of the invention.

FIG. 2 is a block diagram illustrating the interaction between services and kernel components with respect to the loading of services and establishing of queue handles for the passage of media objects. FIG. 2 comprises queue and stream manager 124, remote service call manager 125, configuration manager 127 and services 128, as well as simple service interface 220 and object handler 221. Simple service interface 220 provides a simplified interface to the CPR system for those services that do not require the use of complex CPR functionality.

Configuration manager 127 interacts with queue and stream manager 124 (line 201) to create any object queues to be used by a service. If the configuration data states that the service uses the simple service interface, these queues are passed to the simple service interface module (line 202) which then loads the real service. If the configuration data states that the service is to be loaded directly, the service is loaded by configuration manager 127 (line 203), and the queue handles are passed to the service as described with respect to FIG. 12.

A service 128 can use the queue handles passed directly to the service to both receive objects from other services and to send objects to other services via line 204. Media objects that are actually remote service call objects are passed through remote service call manager 125 via line 205. Remote service call manager 125 passes the actual function call to the service via line 206. A number of queues, as represented by line 207, can be used in addition to line 204 to pass objects of various types to and from service 128. The number of queues depends on the current loading of the service.

When the service 128 uses the simple service interface 220, all the queues pass through the simple service interface 220, shown by line 208, instead of passing directly to the service 128. The simple service interface 220 then passes the objects onto service 128 (line 209) as a function call. Remote service call manager 125 interacts similarly with simple service interface 220 via line 210, as is done with service 128 via line 206. Service 128 interacts with object handler 221, as represented by line 212, in order to manipulate the contents of media objects.

Figure 3:
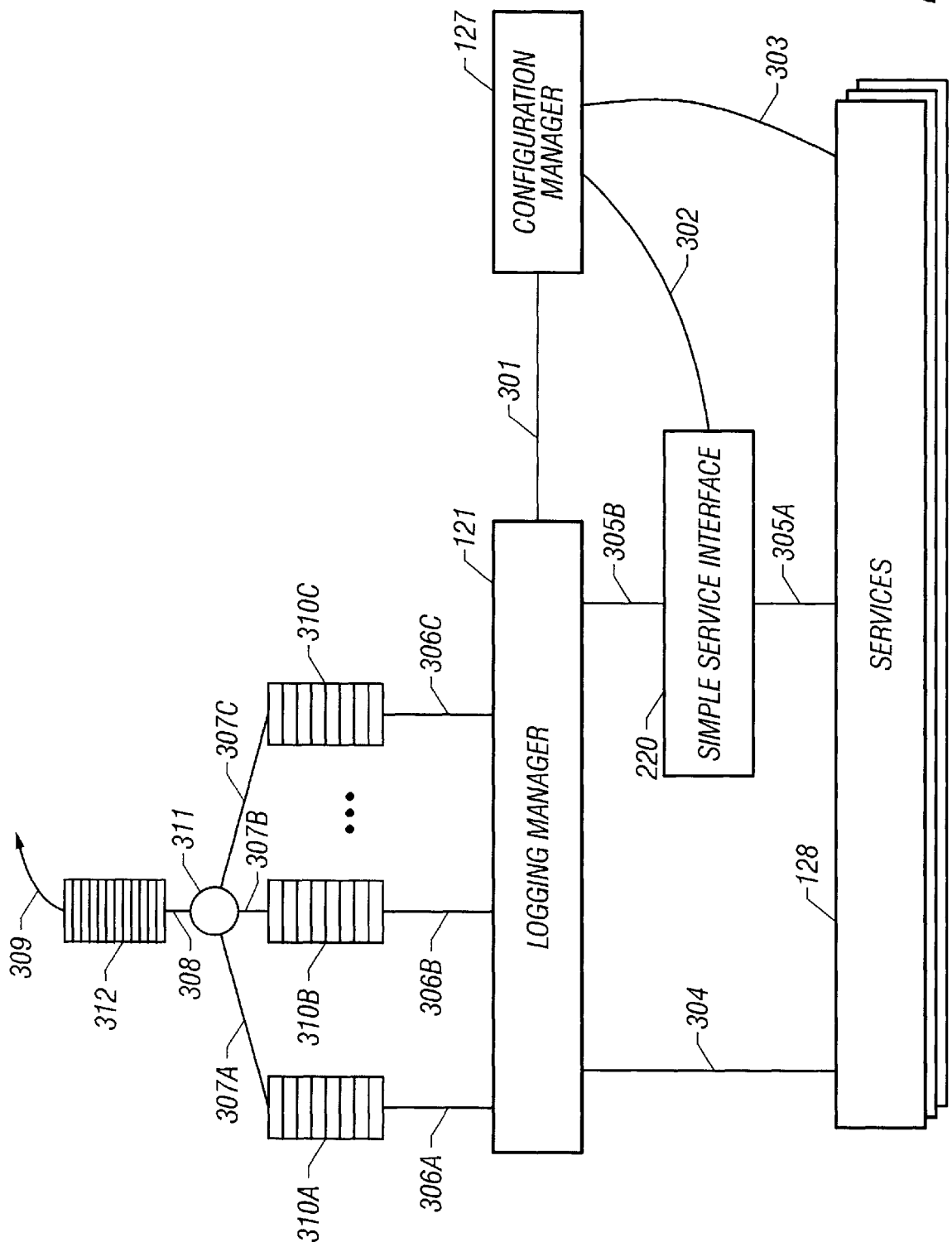
FIG. 3 is a diagram illustrating interaction between services and the kernel with respect to logging of messages according to an embodiment of the invention.

FIG. 3 illustrates the interaction between CPR services and the CPR kernel for the purposes of logging. FIG. 3 includes logging manager 121, configuration manager 127, services 128, simple service interface 220, input queues 310A–310C and output queue 312. Input queues 310A, 310B, and 310C are the inbound log queues for logging manager 121. Each queue contains logged messages from a single service which need to be written to an external log file. Output queue 312 is an outbound log queue for logging manager 121. Output queue 312 contains log messages from multiple services. There may be a plurality of such output queues 312, each servicing multiple input queues.

Before loading any service, configuration manager 127 interacts with logging manager 121, as represented by line 301, to create an input log queue for each service. Configuration manager 127 also creates one or more output log queues and binds any number of the input log queues to a given output queue. The handle for the instantiated input log queue is presented to the respective service 128 either directly, as represented by line 303, or via the simple service interface 220 if appropriate, as represented by line 302. When a service 128 needs to log a message, the message is passed to logging manager 121 with the handle for the associated input queue, as represented by line 304. When simple service interface 220 is involved, the log message and the input queue handle are provided to logging manager 121 in a similar manner via lines 305A and 305B.

After receiving a message to be logged, logging manager 121 places a logged message on the appropriate input queue (310A, 310B or 310C) as represented by lines 306A, 306B or 306C, based on the handle included with the log message. Each output queue 312 has a monitor thread 311 which detects when there are messages in any bound input queue 310A, 310B or 310C. Monitor thread 311 retrieves the log message from input queues 310A, 310B or 310C, as represented by lines 307A, 307B, or 307C, respectively, and places the message on output log queue 312 via line 308. Another thread monitors the end of the output log queues and writes any message on the output log queues to an appropriate file, as represented by arrow 309.

Service-To-Service Communication

Figure 4:
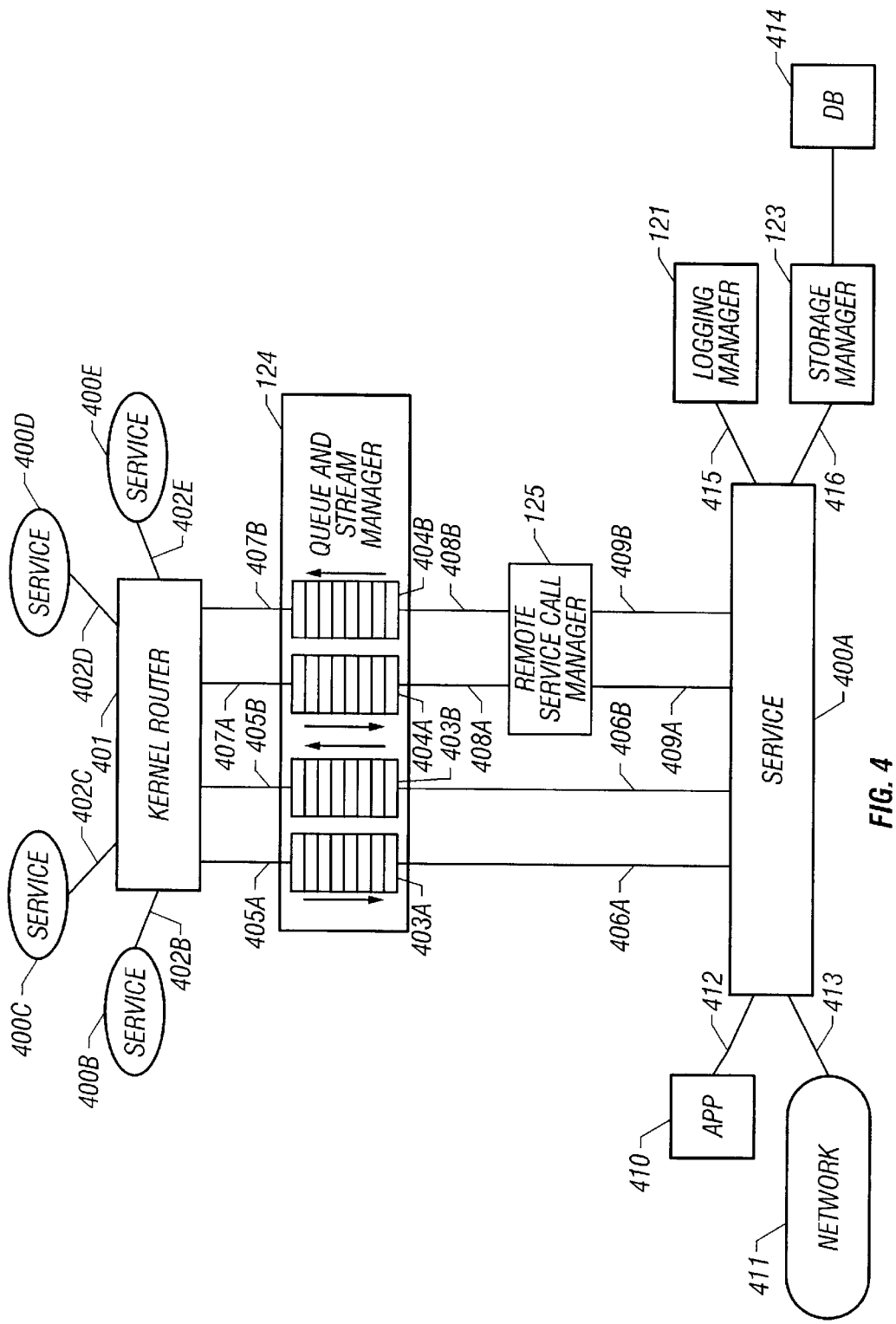
FIG. 4 is a diagram illustrating an embodiment of an information flow between services in the system of the present invention.

FIG. 4 is a block diagram illustrating the flow of information between services in the CPR system. FIG. 4 comprises the following elements: kernel router 401; queue and stream manager 124 managing queues 403A, 403B, 404A and 404B; remote service call manager 125; logging manager 121; storage manager 123 and database 414; application 410; network 411; and services 400A, 400B, 400C, 400D and 400E. All lines in FIG. 4 represent interaction between the respective components.

In FIG. 4, queue and stream manager 124 manages object queues 403A, 403B, 404A, and 404B, associated with media object communication between kernel router 401 and service 400A. Object queues 403A and 403B are coupled to kernel router 401 via lines 405A and 405B, respectively, and to service 400A via lines 406A and 406B, respectively. Object queues 404A and 404B are coupled to kernel router 401 via lines 407A and 407B, respectively, and to remote service call manager 125 via lines 408A and 408B, respectively.

Remote service call manager 125 is coupled to service 400A for the purpose of sending and receiving remote function calls derived from remote service call media objects via lines 409A and 409B. Service 400A is coupled to application 410 and network 411 via lines 412 and 413, respectively. Service 400A is also coupled to logging manager 121 and storage manager 123 via lines 415 and 416, respectively. Storage manager 123 is coupled to database 414. Services 400B, 400C, 400D and 400E are coupled to kernel router 401 via lines 402B, 402C, 402D and 402E, respectively.

Although not explicitly shown, services 400B–400E are coupled to kernel router 401 in a similar manner to which service 400A is coupled to kernel router 401, i.e. services 400B–400E are coupled via respective queues in queue and stream manager 124, and via remote service call manager 125 to kernel router 401.

If service 400A is an application service, then the service acts as the CPR interface for a third party application or device such as application 410. Information and requests from the third party application or device are thus transmitted via an application service into the CPR system in the form of media objects containing data or remote service calls. Also, media objects and remote service calls may be directed to service 400A to request services from the third party application or to return a service request response to the application.

If service 400A is a link service, then the link service provides an interface to other CPR nodes through a network connection or channel, as represented by network 411. Content, routing and kernel services interact directly with other services and components internal to the given CPR instance.

Service 400A interacts with logging manager 121 to log messages to a log file as previously described with respect to FIG. 3. Service 400A may interact with storage manager 123 to store and retrieve data to and from database 214.

Service 400A sends media objects to other services, such as service 400B, by placing a media object on queue 403B. Kernel router 401 retrieves the media object from queue 403B, reads the next destination (i.e., service 400B) from the object, and places it on similar queue bound to service 400B. Service 400B can similarly put a media object on a queue bound to kernel router 401, after which the kernel router 401 will retrieve the incoming media object and place it on queue 403A where it is retrieved by service 400A.

Media objects containing remote service calls originating from or destined for service 400A are passed between the kernel router and the remote service call manager via queues 404A and 404B. Alternatively, remote service call objects may be sent to the service via queue 403A, and forwarded from service 400A to the remote service call manager. Function calls and responses are passed between the remote service call manager and service 400A via lines 409A and 409B.

Figure 5B:
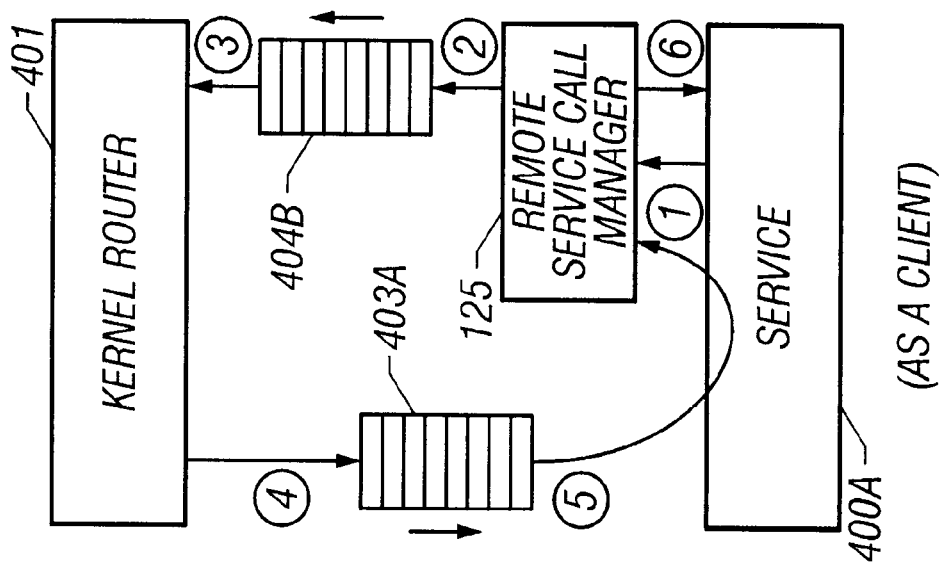
FIGS. 5A and 5B are block diagrams illustrating the flow of remote service call objects between services and the kernel router in an embodiment of the invention.
Figure 5A:
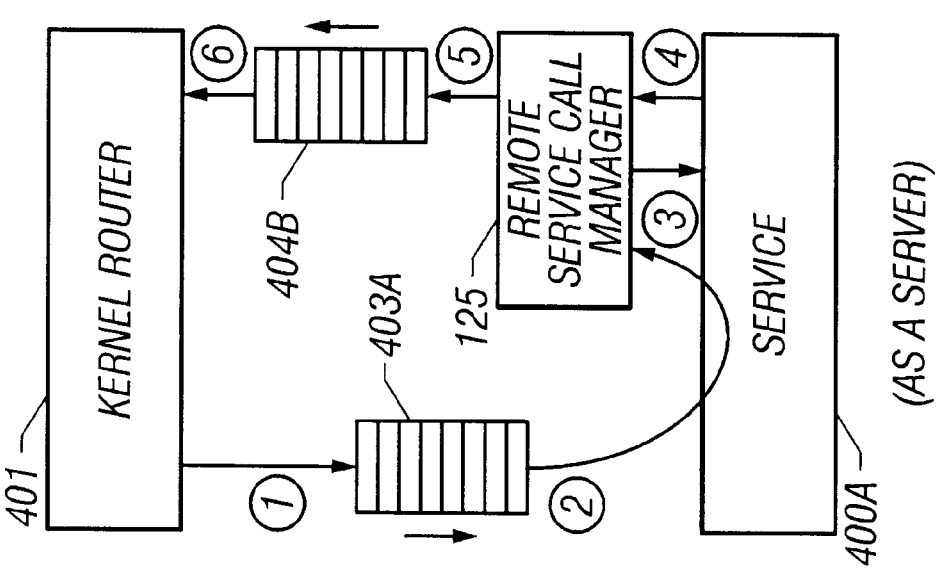

FIGS. 5A and 5B provide a more detailed description of the flow of remote service call objects. FIG. 5A shows the interaction between service 400A and kernel router 401 when service 400A is acting as a server with respect to a remote service call object. FIG. 5B illustrates the interaction between service 400A and kernel router 401 when service 400A is acting as a client with respect to a remote service call object. In this embodiment, remote service call manager 125 is equipped with a single outbound queue 404B directed to kernel router 401. No queue for passing objects from kernel router 401 to remote service call manager 125 is needed in this embodiment.

All media objects destined for service 400A, including remote service call objects, are passed to service queue 403A for transmission to service 400A. Those media objects which are remote service calls are detected by service 400A and forwarded to remote service call manager 125 for processing into a function call. Communication between service 400A and remote service call manager 125 is accomplished via stub code compiled into the service.

In FIG. 5A, with service 400A acting as a server, a remote service call object generated by a client service (not shown) is forwarded by kernel router 401 to service input queue 403A in step 1. In step 2, the media object is removed from input queue 403A by service 400A, and passed to remote service call manager 125. If remote service call manager 125 cannot process the object, it is returned to service 400A for post processing. If remote service call manager 125 recognizes the object as a remote service call, it unpackages the information from the remote service call and calls a stub function in service 400A in step 3.

When service 400A has actually performed the remote service call, service 400A returns any return values and status codes back to remote service call manager 125 in step 4. Remote service call manager 125 packages the function return values and status codes as a media object referencing the original call object, and, in step 5, places the new media object on queue 404B, which is bound to kernel router 401. In step 6, kernel router 401 obtains the returned media object from queue 404B and delivers it to the original client service that made the remote service call.

In FIG. 5B, service 400A acts as a client with respect to generating remote service calls. In step 1, service 400A calls stub code compiled into the service which in turn calls remote service call manager 125. In step 2, remote service call manager 125 packages the function call as a remote service call media object, and places the newly created object on queue 404B for kernel router 401. The object is removed from queue 404B in step 3, and kernel router 401 interacts with the service acting as a server as described with respect to FIG. 5A. Kernel router 401 may forward the remote service call object to a CBSR service for determination of an appropriate service to act as a server.

In step 4, kernel router 401 places the returned media object containing the response to the remote service call onto queue 403A. On receipt of the return function call object from queue 403A, in step 5, service 400A passes the object to remote service call 125. Remote service call manager 125 unpackages the returned call and correlates the call with the original call, signaling service 400A that the remote service call has completed in step 6. Service 400A then requests the returned parameters from the remote service call manager (again implemented in the same stub as step 1).

Node-To-Node Communications

Figure 6:
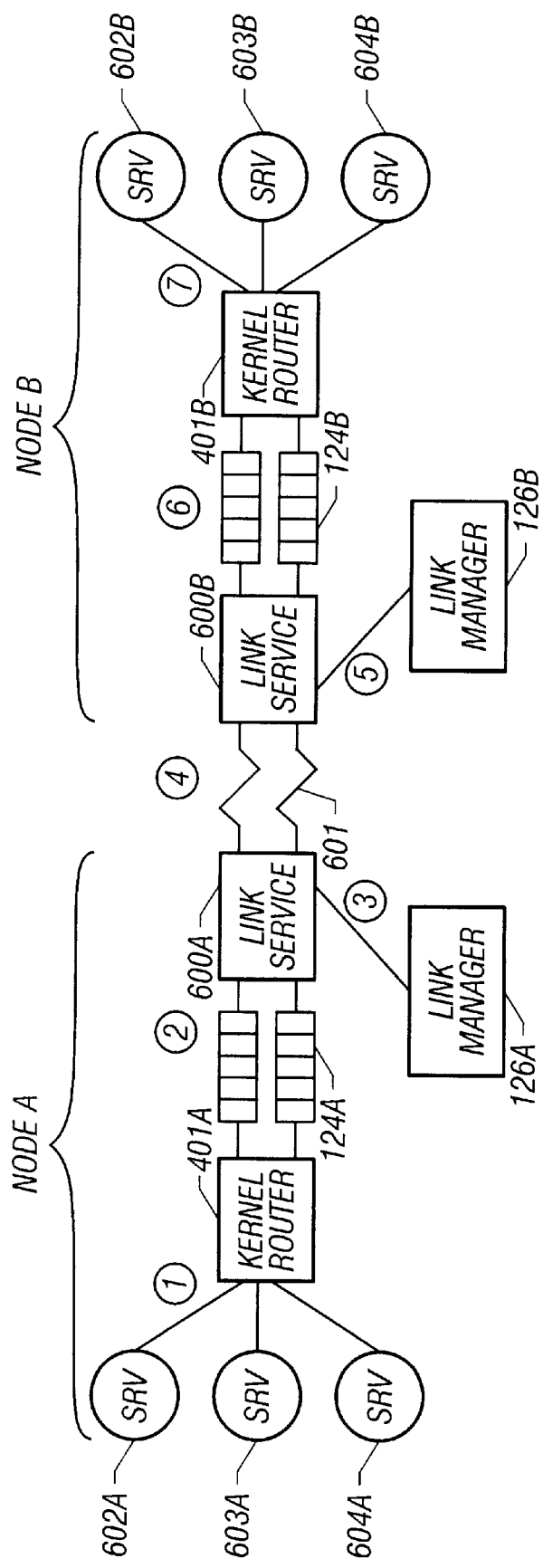
FIG. 6 is a block diagram illustrating the communication of media objects between two instances of the content processing and routing system according to an embodiment of the invention.

FIG. 6 is a block diagram illustrating the process for communication between separate instances or nodes of the CPR system. Node A comprises services 602A, 603A and 604A coupled to kernel router 401A, and node B comprises services 602B, 603B and 604B coupled to kernel router 401B. Interaction between these services and the respective kernel routers is as described with respect to FIGS. 5A and 5B. Kernel router 401A is coupled to link service 600A via object queues 124A. Kernel router 401B is coupled to link service 600B via object queues 124B. Link service 600A and link service 600B are coupled to link manager 126A and link manager 126B, respectively. Link service 600A and link service 600B are coupled together via network 601, which acts as the communication link between node A and node B.

The process by which remote services communicate is described as follows with respect to the communication of a media object from service 602A of node A to service 602B of node B. In step 1, service 602A creates a media object addressed to remote service 602B and places the object on a queue bound to kernel router 401A. In step 2, kernel router 401A examines the address of the media object and determines, possibly with the assistance of the CBSR service, the best route to service 602B. In this case, the route found is through link service 600A. Therefore, the media object is placed on queue 124A bound to link service 600A.

On reception of the media object from queue 124A, in step 3, link service 600A interacts with link manager 126A via the link manager API to compress or encrypt the media object. In addition, link manager 126A may be used to authenticate the connection to the remote CPR link service 600B. In step 4, the media object is sent over network 601 from link service 600A to link service 600B in a manner supported by each link service, such as a TCP/IP protocol. Different link services may be provided to accommodate communication over different types of networks.

In step 5, link service 600B interacts with link manager 126B to decrypt and decompress the media object as appropriate. The decrypted and decompressed media object is then delivered to kernel router 401B via queue 124B. In step 7, kernel router 401B locates the service 602B (or additional link service for communications with remote services at other nodes), and places the media object on the respective service's (602B) object queue for processing. Thus, remote client-server operations may take place between services across a network or other transmission channel.

Figure 7:
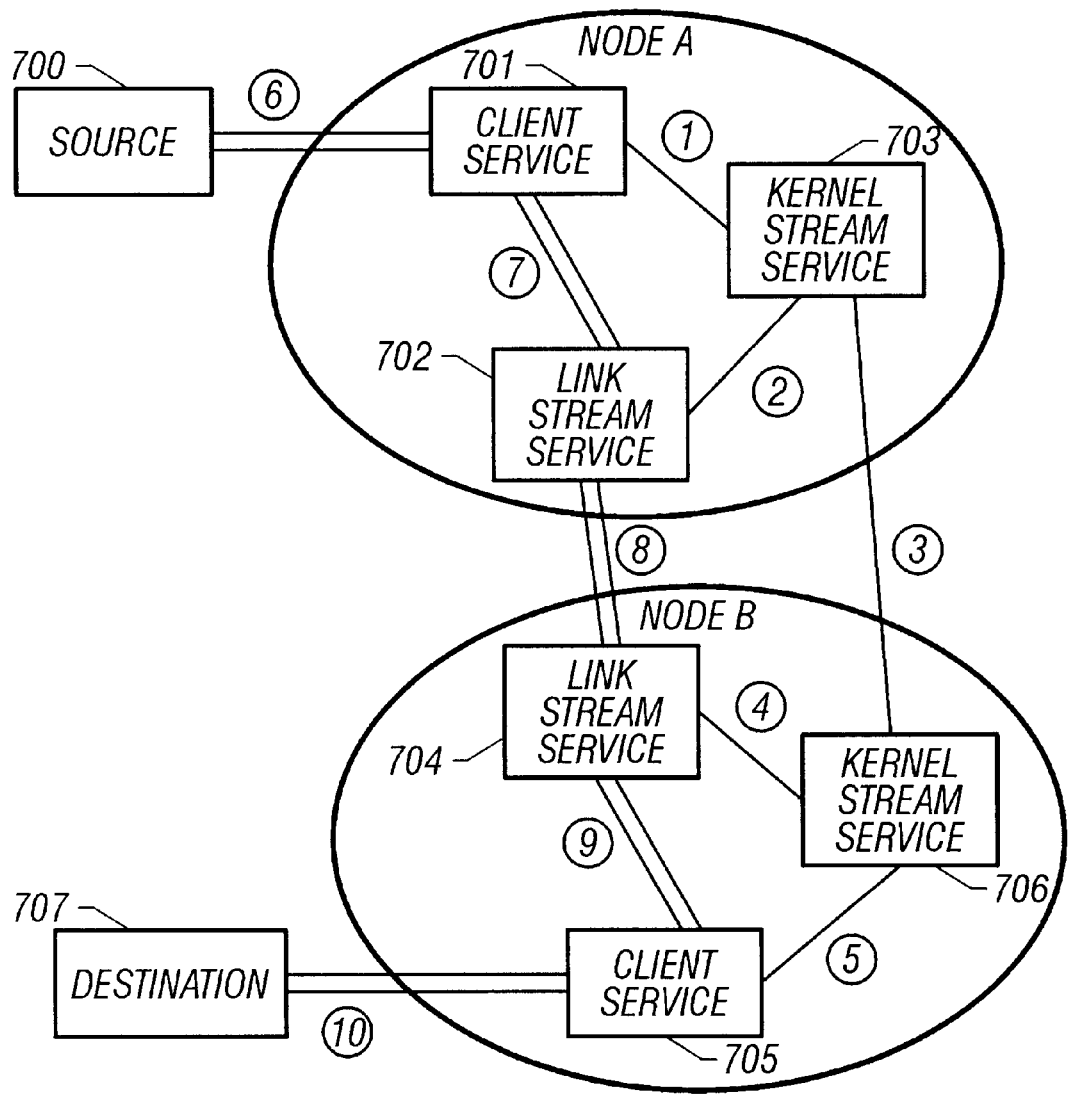
FIG. 7 is a block diagram illustrating communication of media streams between two instances of the content processing and routing system according to an embodiment of the invention.

FIG. 7 illustrates the interaction which takes place between CPR nodes to support the transmission of data in the form of a data stream. The transmission path comprises stream source 700, destination 707, and CPR nodes A and B, which each comprise a client service, a link stream service and a kernel stream service. An example of the kernel stream service API used in one embodiment of the invention is provided below.

| Stream Service API | |
|---|---|
| CreateCircuit( ); | Creates a stream between the requesting service and a designated destination service |
| SetupStream( ); | Informs all points in a stream circuit that the stream should be set up |
| StartStream( ); | Informs all parties that information is to be sent on the circuit |
| CloseStream( ); | Informs all parties of the termination of the stream circuit |

When a source service wishes to create a stream to a destination service, the initiating service makes the following remote service call at the local kernel stream service (bracketed values prior to an argument name indicate function input or output):

KSTREAM_CreateCircuit([out] CircuitID, [out] CircuitStatus, [in] StreamInformation, [in] DestinationAddress, [in] MediaType, [in] ChannelCount);

The local stream service (KSTREAM) may invoke remote service calls at streaming link services, remote stream services and the destination service in the processing of this call. Management of the stream, from the point of view of the local stream service, is handled by remote service calls from the local stream service to the initiating source service.

To inform all points in the stream that the stream should now be set up (e.g. so that TCP/IP connections can be made between streaming link services), the source service then calls:

KSTREAM—SetupStream([in] CircuitID, [out] Status);

One of the side effects of this call is a remote service call from the local stream service to the source service, informing the source service of the name/ID of the stream queue in the queue and stream manager that should be used for transmission.

To inform all parties that information is to be sent on the circuit, the following call is made:

KSTREAM_StartStream([in] CircuitID, [out] Status);

Again, this call results in a "callback" remote service call to the source service, informing the latter that it may start transmission. Other parties and the destination service are also informed via remote service calls.

Once the transmission ends, the source (or any service in the circuit) can call the following remote service call at any stream service in the circuit. This function informs all parties of the termination of the circuit.

KSTREAM_CloseStream([in] CircuitID, [in] ReasonDescription, [out] Status);

To support reception or transmission of streams, a service implements the following API:

| API For Services Supporting Streams | |
|---|---|
| AcceptStream( ); | Receives information about a stream to sink or pass through; returns status |
| CreateSenderCircuit( ); | Receives information about a stream to be sourced |
| SetStreamName( ); | Informs service of queue and stream manager stream name to be used to transfer or receive data |
| CloseStream( ); | Discontinues data stream |
| StartStream( ); | Initiates transmission of stream data |
| PauseStream( ); | Pauses transmission of stream data |

The AcceptStream( ) function is called with parameters as follows:

AcceptStream([in] CircuitID, [in] StreamInformation, [in] SourceAddress, [in] DestinationAddress, [in] MediaType, [in] ChannelCount, [in] StepConfiguration, [out] Accepted, [out] RemoteAddress, [out] RemoteConfiguration);

This function may be called in one of two ways. If the called service is the ultimate destination of the stream circuit, the first six input parameters and the "Accepted" return value are used. If the called service is a streaming link service, all input parameters and return values are used.

The input parameters and return values are:

| | |
|---|---|
| CircuitID | A unique identifier for the circuit |
| StreamInformation | Information sent by the originating (client) service |
| SourceAddress | The original source of the stream |
| DestinationAddress | The ultimate destination of the stream |
| MediaType | The media type that will be present on the stream |
| ChannelCount | The number of channels present on the stream |
| StepConfiguration | If the service is a streaming link service, this information pertains to how the service should route to the ultimate destination (e.g. protocols, port numbers, encryption settings) |
| Accepted | The service returns a status code in this value |

| | |
|---|---|
| RemoteAddress | If the service is a streaming link service, this is the CPR address of the streaming service that this service is transmitting to (the kernel stream service calls this service separately) |
| RemoteConfiguration | This contains information that should be delivered to the remote streaming link service (it appears in StepConfiguration above) |

The CreateSenderCircuit( ) function is called when a sending circuit is required from the called service (the AcceptStream ( ) function above is for a receiving circuit or pass through circuit).

CreateSenderCircuit([in] CircuitID, [in] Streamnformation, [in] MediaType, [in] ChannelCount, [in] Configuration, [out] RemoteConfigurat);

When the stream circuit has been created, the following function is used to inform the service of the stream queue name (from the queue and stream manager) that should be used to physically transfer or receive the data:

SetStreamName([in] CircuitID, [in] StreamName);

The final functions are used to control the stream flow:

CloseStream([in]CircuitID, [in]ReasonDescription);
StartStream([in] CircuitID, [out]Status);
PauseStream([in] CircuitID, [out] Status);

Referring to FIG. 7, the data stream from source device 700 enters the CPR network at local node A via client (application) service 701, and is passed to link stream service 702. Link stream service 702 transmits the data stream over the network from local node A to remote node B into link stream service 704 of the remote CPR node. Link stream service 704 passes the data stream to client (application) service 705, which in turn transmits the data stream to destination device 707.

Kernel stream service 703 interacts with client service 701 and link stream service 702 at the local node A to coordinate the stream path. Similarly, kernel stream service 706 at the remote CPR node interacts with link stream service 704 and client service 705 to coordinate the remote portion of the stream path. Kernel stream service 703 and kernel stream service 706 interact via remote service calls to coordinate transmission of the data stream between the local node A and remote node B.

Source device 700 is the original source of the data stream. Examples of source devices are video cameras, disk based media, etc. Destination device 707 is the ultimate destination of the data stream. Examples of destination devices are monitors, televisions, recorders, etc. Client services 701 and 705 are examples of application services which are specifically designed in this instance to interact with source and destination devices sending data streams into, and receiving data streams from, a CPR network.

Link stream services 702 and 704 represent instances of a link service designed to deliver streamed information to a remote CPR node across a network. Different link stream services may be written to support various stream types and various network protocols. Kernel stream services 703 and 706 are instances of a type of kernel service designed to manage the set-up of a stream between CPR nodes.

The information flow of FIG. 7 is as follows. In step 1, client service 701 makes a remote service call to kernel stream service 703 to set up the stream to the remote client service 705. In step 2, kernel stream service 703 determines that the stream must go through a suitable link service in order to reach the remote client service. Accordingly, kernel stream service 703 makes a remote service call to link stream service 702 to determine whether that service can support the stream. Kernel stream service 703 also makes a remote service call in step 3 to the remote kernel stream service 706, requesting for kernel stream service 706 to continue setting up the stream route.

In step 4, remote kernel stream service 706 makes a remote service call to link stream service 704 to determine whether the remote end of the stream can be supported. In step 5, remote kernel stream service 706 also makes a remote service call to client service 705 to determine whether it can accept an incoming stream.

Once the stream has been set up, by going through steps 1 through 5 with different remote service calls and establishing stream buffers between the services in the stream path, source 700 is started, and stream data is passed to client service 701 in step 6. In step 7, client service 701 uses the stream buffer handle to send the streamed data to link stream service 702. In step 8, link stream service 702 streams the information across the network to the remote link stream service 704. Remote link stream service 704 in turn streams the information to client service 705 in step 9. Finally, in step 10, client service 705 delivers the stream data to destination device 707. Thus, data streams may be formed between services on a single CPR node, and between services on remote CPR nodes.

In the prior art, real-time media streams are often incompatible with certain types of networks. For example, many applications are limited to transmitting streaming data over only those networks for which they are designed. The CPR system of the invention understands the formats applicable for transmission of media streams over different types of networks and can convert streams in real-time accordingly for transmission over otherwise incompatible networks.

Figure 8:
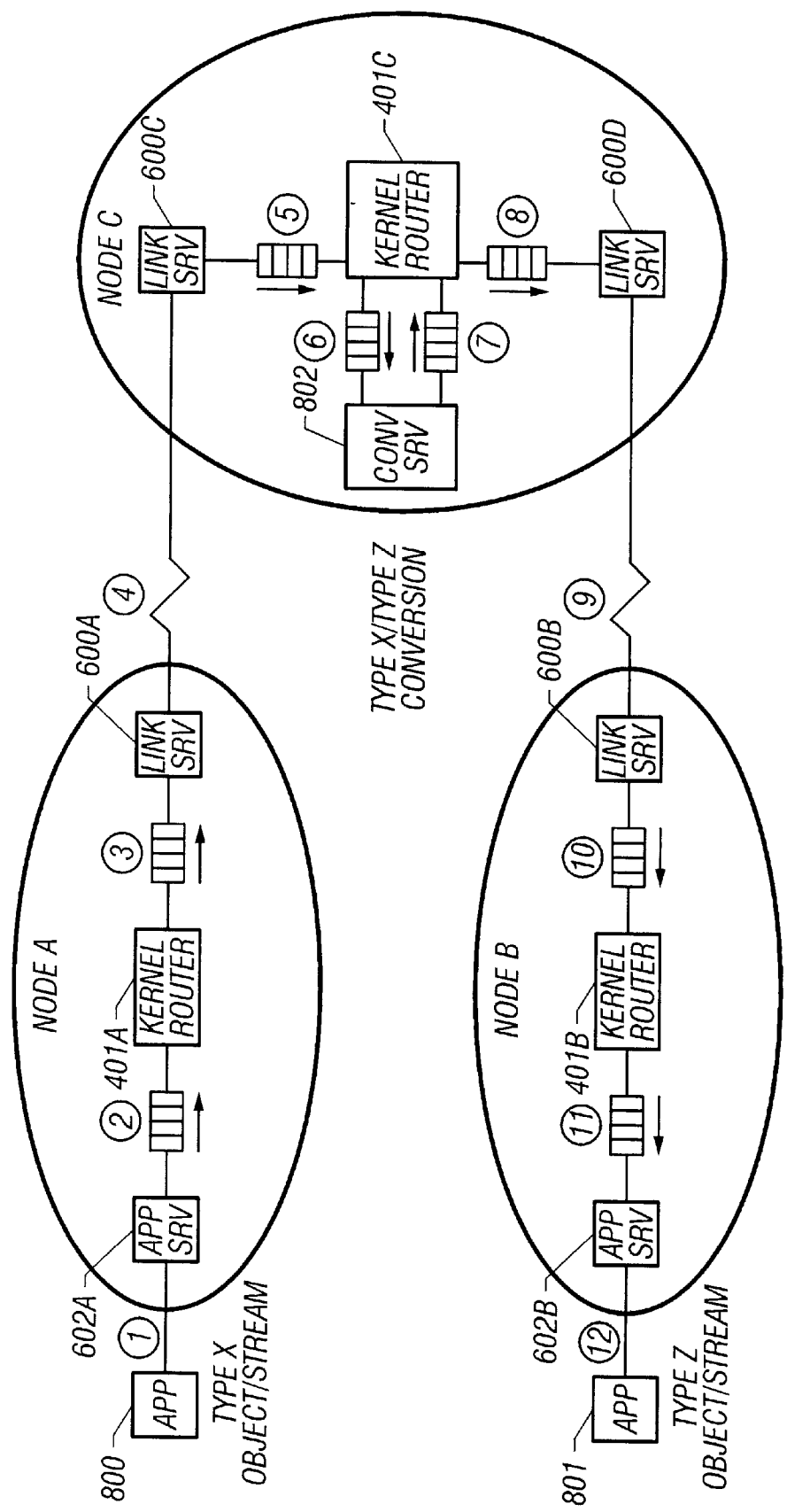
FIG. 8 is a block diagram illustrating an embodiment of a content processing and routing (CPR) network, including conversion between object or stream types.

FIG. 8 illustrates a CPR network model comprising end nodes A and B, and intermediate node C. Each node contains an executing instance of the CPR system. This model illustrates how object or streamed data of a first type, type X, is input into the network at a first node, and extracted from a second node as object or stream data of a second type, type Z. Further, source and destination devices or applications located in different networks may be linked by a CPR node acting as a gateway, supporting communication with both types of networks. Thus, data routes may be supported across widely disparate networks, where the data is converted as necessary for transmission across the networks and for use by end applications.

For the purposes of this example, nodes A and B represent input/output points of the CPR network with respect to applications 800 and 801. Node A comprises application service 602A, link service 600A and kernel router 401A. Application 602A and link service 600A are coupled to kernel router 401A by suitable object queues or stream buffers. Application service 602A provides the interface into the CPR system for application 800. Link service 600A provides the means for communicating across a network to link service 600C of node C.

Node C further comprises kernel router 401C, conversion service 802 and link service 600D. Conversion service 802 and link services 600C and 600D are coupled to kernel router 401C via suitable object queues or stream buffers. Conversion service 802 is an instance of a content service designed to convert data objects or a data stream from type X to type Z. Link service 600D provides the means for communicating across a network to link service 600B of node B. Node B also comprises kernel router 401B and application service 602B. Kernel router 401B is coupled to application service 602B and link service 600B via suitable object queues or stream buffers. Application service 602B provides the interface into the CPR system for application 801.

Though FIG. 8 is shown with object queues to support the transportation of media objects through the network, data streams are also supported through the use of appropriate link stream services and kernel stream services as described with respect to FIG. 7, though not shown explicitly in FIG. 8.

Applications 800 and 801 can source or sink objects and streams. Examples of these types of applications include fax cards, e-mail packages, video cameras, video cassette recorders, etc. Data can be transported in an object or stream form of type X from application 800, through each node of the CPR network, to provide data in object or stream form of type Z to application 801. Conversion of data from type X to type Z is performed in intermediate node C through the use of a content service designed to provide the appropriate conversion. The transportation steps are as follows.

In step 1, application 800 generates a stream or information that can form a media object and delivers it to application service 602A. Application service 602A then sends the media object or stream data to kernel router 401A in step 2. In step 3 the kernel router 401A determines that the media object or stream data should be given to link service 600A for delivery to remote service 602B at the end destination of the CPR network. In step 4, link service 600A transmits the media object or stream to remote link service 600C in the CPR instance executing at node C.

In step 5, link service 600C forwards the media object or stream to kernel router 401C, which sends the media object or stream in step 6 to conversion service 802. Conversion service 802 converts the media object or stream from type X to type Z, and delivers the new media object or stream back to kernel router 401C in step 7. In step 8, kernel router 401C delivers the media object or stream to link service 600D for transmission to the CPR instance at node B. Accordingly, link service 600D transmits the media object or stream, in step 9, to remote link service 600B at node B.

In step 10, link service 600B sends the media object or stream to kernel router 401B, which sends the media object or stream to application service 602B in step 11. Finally, in step 12, application service 602B delivers the object or stream to application 801. Thus, information may be transmitted between source and destination points in a CPR network with data and transmission types transparently converted as needed to meet the individual requirements of source and destination applications, as well as any intervening networks.

Exemplary Applications Of A CPR System

FIGS. 14–18 illustrate several applications implementing an embodiment of the invention. The applications depicted in FIGS. 14–18 are: a business internet application, a business video network application, a personalized television application, an information publishing and broadcasting application, and a distributed Java application, respectively. In each example, any single CPR node may be replaced with a local-area or wide-area CPR network, consisting of multiple interconnected CPR nodes. In each of FIGS. 14–18, various content services may be implemented within one or more of the CPR nodes to transparently convert data from one format to another, or to otherwise process data in transit through the CPR network. Routing services may be also implemented to meet specific routing needs. For reasons of clarity, individual services (e.g., link services, application services, etc.) of each CPR node or network are not shown.

Figure 14:
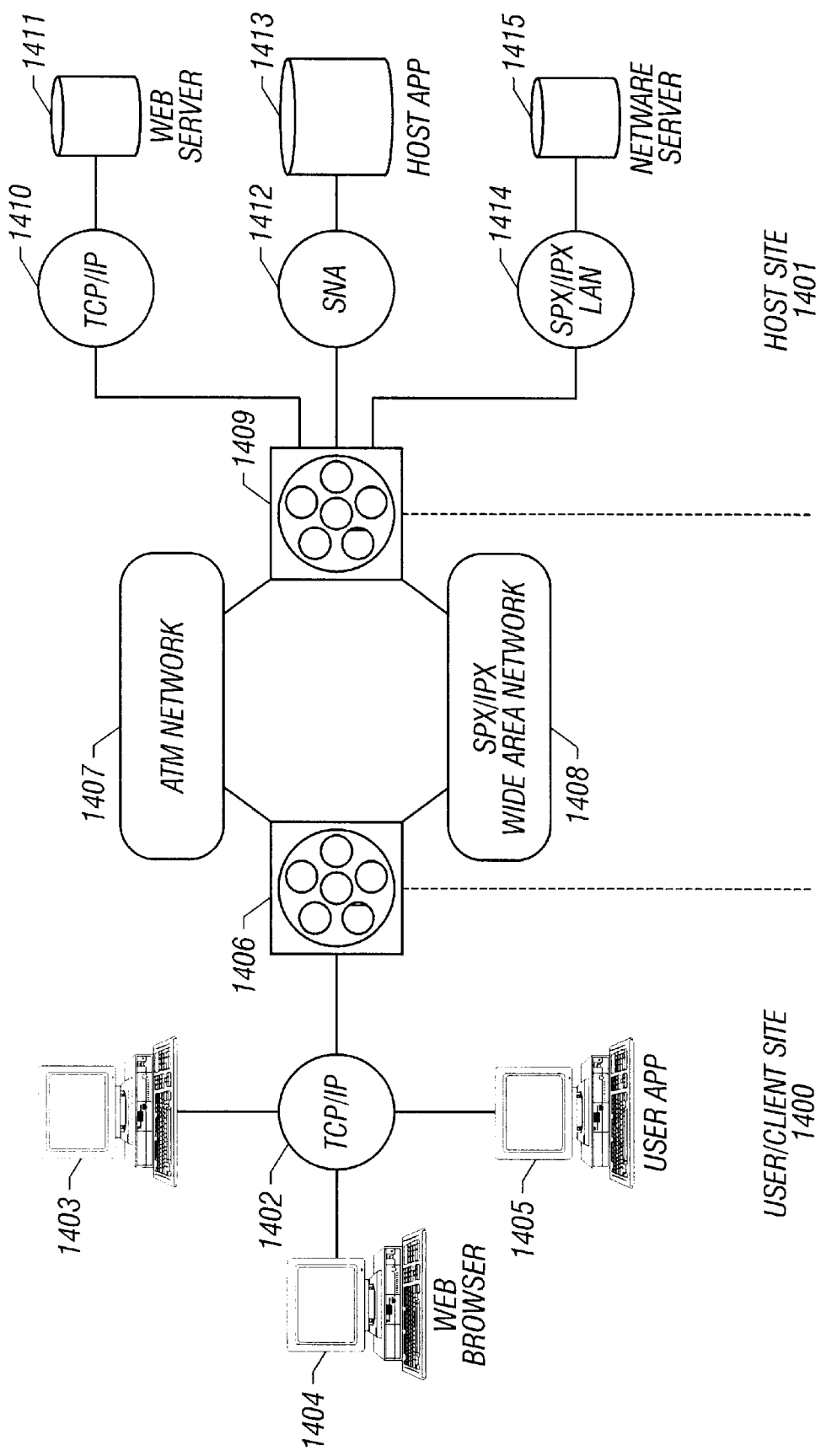
FIG. 14 is an example of a business internet application implementing an embodiment of the invention.

In the business internet application of FIG. 14, user or client computers 1403–1405 at user/client site 1400 are coupled to CPR node 1406 via TCP/IP network 1402, using one or more TCP/IP-based application services of CPR node 1406 to interface with the CPR network comprising CPR nodes 1406 and 1409. Utilizing corresponding link services at each node, CPR node 1406 is further coupled to CPR node 1409 via one or more networks, such as ATM network 1407 and SPX/IPX wide area network 1408.

On the server side (1401) of the business internet, various servers are coupled to CPR node 1409 via supporting communication networks. In this example, web server 1411 interfaces with an application service of CPR node 1409 via TCP/IP network 1410 (e.g., the Internet) to serve HTML/HTTP information to, for example, a web browser application on user computer 1404. Host application 1413 interfaces with an application service of CPR node 1409 via SNA (systems network architecture) network or interface 1412 to provide, for example, host application services over the CPR network to a user application on user computer 1405. Netware server 1415 interfaces with an application service of CPR node 1409 via SPX/IPX LAN 1414 to provide common Netware services.

As shown in FIG. 14, the CPR system enables business internets to be built over existing underlying network infrastructure. The business internet has the flexibility of the Internet, but is designed to support business requirements by providing performance aspects such as assured delivery, bandwidth management, dynamic routing based on media type, encryption, authentication, billing, auditing and logging as transparent and inherent capabilities implemented by the services and components of the CPR nodes. The business internet of FIG. 14 also allows Internet applications to operate over non-TCP/IP networks.

Figure 15:
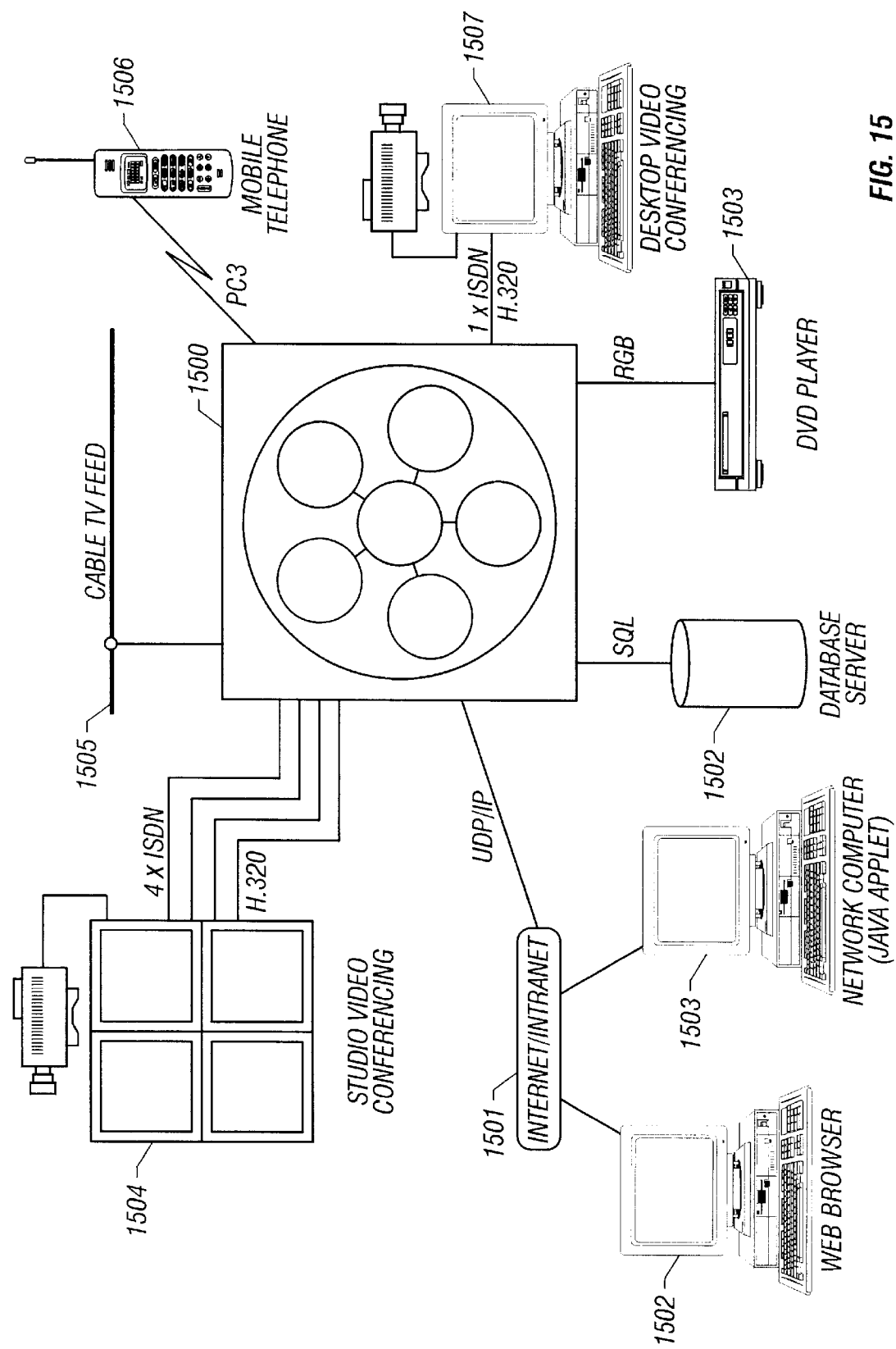
FIG. 15 is an example of a business video network application implementing an embodiment of the invention.

In the business video network application of FIG. 15, CPR network 1500, which comprises one or more CPR nodes, is used to link various video data sources and sinks. Each video data source and/or sink interfaces with CPR network 1500 via one or more application services. High-bandwidth studio video conferencing units 1504 are coupled to CPR network 1500 via multiple ISDN lines with the CPR network acting as a H.320 gateway. Low-bandwidth desktop video conferencing unit 1507 is coupled to CPR network 1500 via a single ISDN line. The studio and desktop video conferencing units may act as sources and/or sinks with respect to the video network. Mobile telephone 1506 is coupled to CPR network 1500 via a cellular link, and acts as an audio-only source and/or sink.

Cable TV feed 1505 is coupled to CPR network 1500 to provide a cable video source or sink for the video network, and DVD player 1503 provides input into CPR network 1500 in the form of RGB video data. Database server 1502 is accessible via an SQL interface with CPR network 1500, to act as a video store for the network for archiving and reviewing video sessions.

Desktop computer 1502 and network computer 1503 are coupled to CPR network 1500, and hence the video network, via internet/intranet 1501. Streaming video and audio may be received from the video network in UDP format over IP network 1501, and viewed by computers 1502 and 1503 using means such as a web browser or Java applet.

The CPR system allows incompatible devices and applications to inter-operate, and permits a broad range of video services to be made available to users of many types of applications and devices. Examples of video capabilities offered by a business video network such as shown in FIG. 15 are: multi-point video conferencing; bridging of video conferencing with telephone conferencing; bridging of high bandwidth participants in a video conference with low bandwidth participants; web based configuration and scheduling of video conferences; view-only participation through a web browser or network computer; video store for subsequent review of video conference sessions; video briefings broadcast to a wide range of viewing devices; real-time image enhancement of limited quality video sources (e.g., desktop video); access to video-based training materials; and remote access to DVD based video media.

Figure 16:
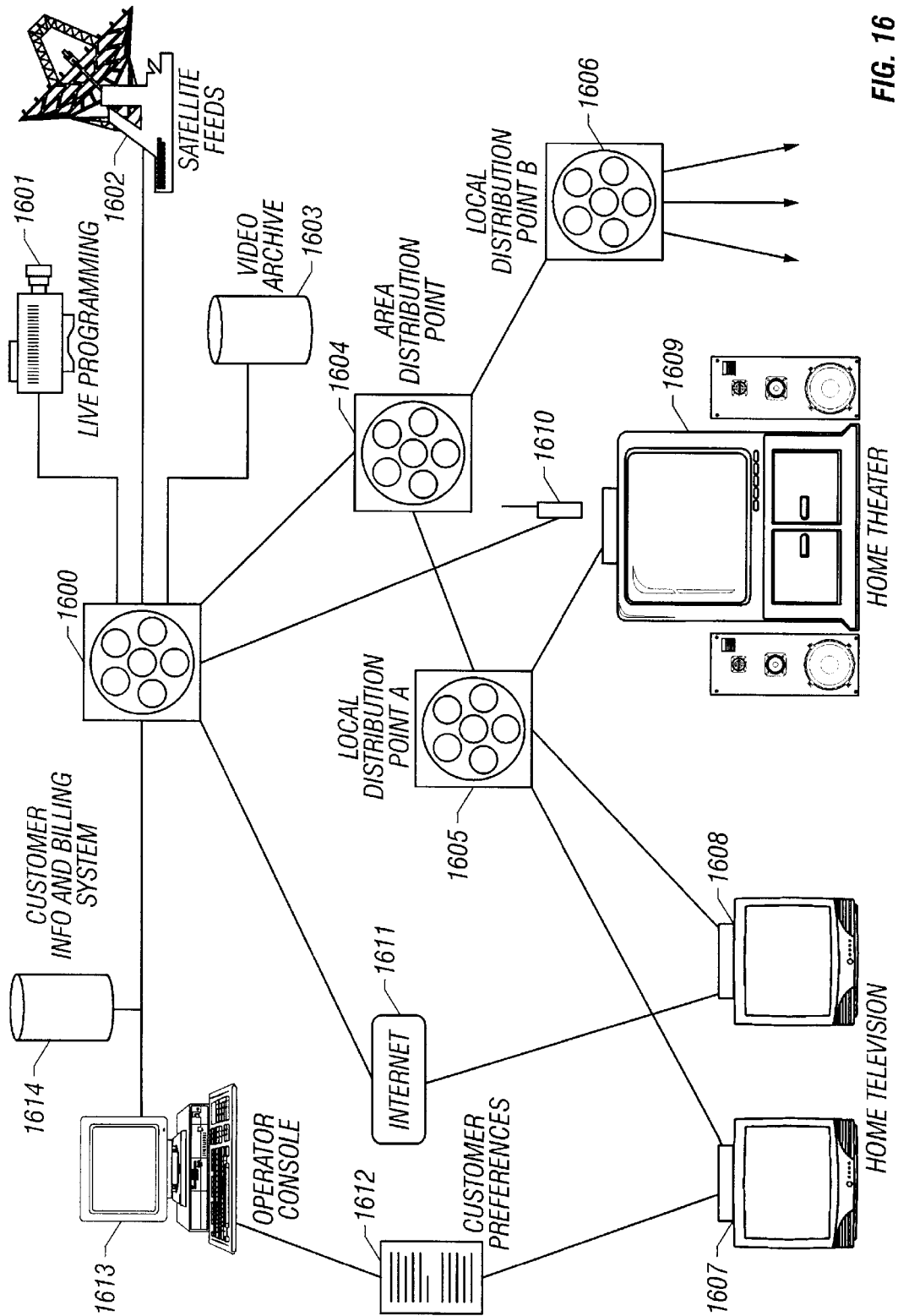
FIG. 16 is an example of a personalized television application implementing an embodiment of the invention.

In FIG. 16, a personalized television application is illustrated that allows a viewer to select the type of television programming he would like to receive, without having to make continual interactive choices as to what to view next. Through a web-based, telephone-based or manual operator-based interface, the viewer would have control over, for example, the following aspects of television: the type of programming, such as news, sports, and documentaries; specific shows, such as TV series, sports events and news shows; level of acceptable controversial material, such as violence, profanity and adult material; type and quantity of advertising; and enhanced services, such as theater-quality sound and resolution-enhanced images for big screen TVs.

In FIG. 16, multiple media sources, such as live programming feed 1601, satellite feed 1602, and video archive 1603, are coupled to CPR node 1600. Customer info and billing system 1614 is coupled to CPR node 1600 to provide a repository for customer preference and payment information. CPR node 1600 is coupled to one or more area distribution points, such as CPR node 1604. CPR node 1604 is further coupled to one or more local distribution points, such as CPR nodes 1605 and 1606, for distribution of the selected television signal to respective customer televisions via, for example, switched digital cable networks. Home television units 1607 and 1608, and home theater unit 1609 represent customer units coupled to CPR node 1605 for receipt of selected programming.

Several methods for implementing customer programming selection are illustrated in FIG. 16. Telephone unit 1610 is provided for the user of home theater unit 1610 to select programming (e.g., using a touch-tone menu-driven system) through CPR node 1600. The customer can thus interact with the customer information and billing system 1614 to establish viewing preferences. Another method is to select viewing preferences over the Internet using a WWW-based application. Home television unit 1608 is coupled to CPR node 1600 via Internet 1611 to illustrate this approach. A third method is to select preferences through an operator interface. As illustrated with respect to home television unit 1607, a customer may submit preference information 1612, for example via a mailed or faxed form, or by speaking with an operator. The operator enters customer preference information 1612 into customer information and billing system 1614 via operator console 1613.

In the personalized television network of FIG. 16, application services provide the interfaces for receiving the media input from sources 1601–1603, as well as interacting with customer information and billing system 1614 and customer units 1607–1609. Routing services may be employed to direct routing of selected programming through respective CPR nodes or distribution points to implement proper disbursement of selected programming. Content services may be implemented to perform any monitoring, censoring or other manipulation of programming content to conform to the selected preferences of each customer. Thus, a personalized television network may be implemented using a CPR system.

Figure 17:
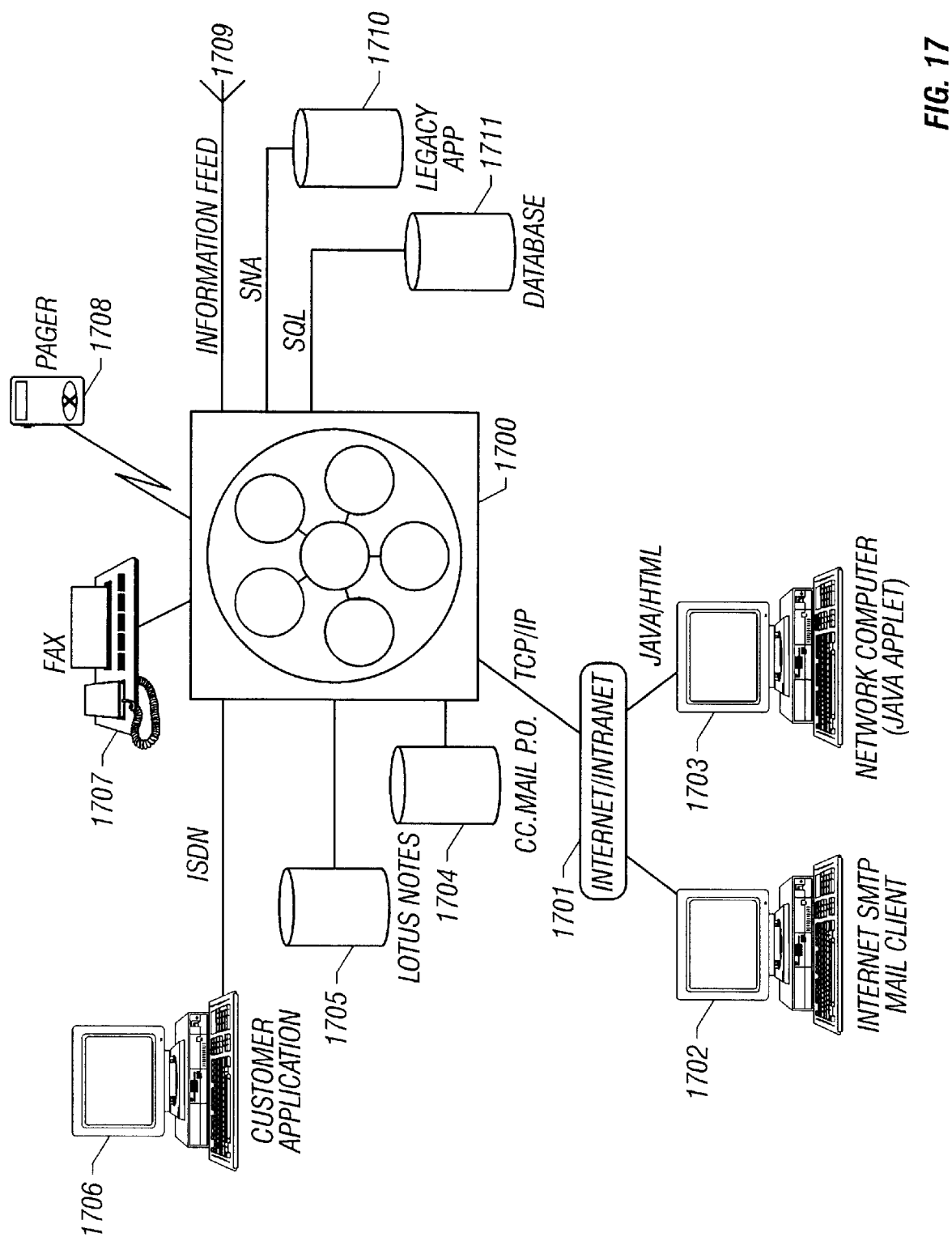
FIG. 17 is an example of an information publishing and broadcasting application implementing an embodiment of the invention.

FIG. 17 is a block diagram of an information publishing and broadcasting application implemented on a CPR network. The methods of information delivery may include, for example, the World Wide Web, facsimile, e-mail, FTP, proprietary networks and telephone. Before delivering information over these networks, the information is sourced from proprietary applications and converted into the formats required by the recipients. Billing, logging and auditing may also be desired where information is being delivered for commercial use, or where the information itself constitutes business (e.g., orders, bookings, etc.). The CPR network provides these functions for the application.

In FIG. 17, CPR network 1700 comprises one or more CPR nodes coupled via link services. CPR network 1700 is coupled through application services to one or more information sources, such as information feed 1709, legacy application 1710, and database 1711. For example, the legacy application may be coupled to CPR network 1700 via an SNA interface application service, and database 1711 may be coupled to CPR network 1700 via an SQL interface application service.

Content services within CPR network 1700 provide for the format conversion necessary for transmission of the information to the specified information recipients. Routing services may be used to direct the information to the specified recipients, and to configure the direction of information to other services required to fulfill the desired application. Application services provide the means by which the information is transmitted externally from CPR network 1700 to the recipients.

FIG. 17 illustrates several examples of methods by which recipients may receive information from CPR network 1700. An application service may interface with a paging service to deliver messages to pager 1708. Another application service may transmit messages to designated recipients via facsimile machine 1707. A customer may receive information in customer application 1706 by interfacing with an application service over an ISDN line. Information may be delivered to e-mail distribution sites, such as Lotus Notes 1705 and CC.Mail P.O. 1704. CPR network 1700 may also use a TCP/IP-based application service to distribute information over internet/intranet 1701 in the form of e-mail for receipt by SMTP mail client 1702, or in the form of Java/HTML information for receipt by a Java applet executed on network computer 1703.

Figure 18:
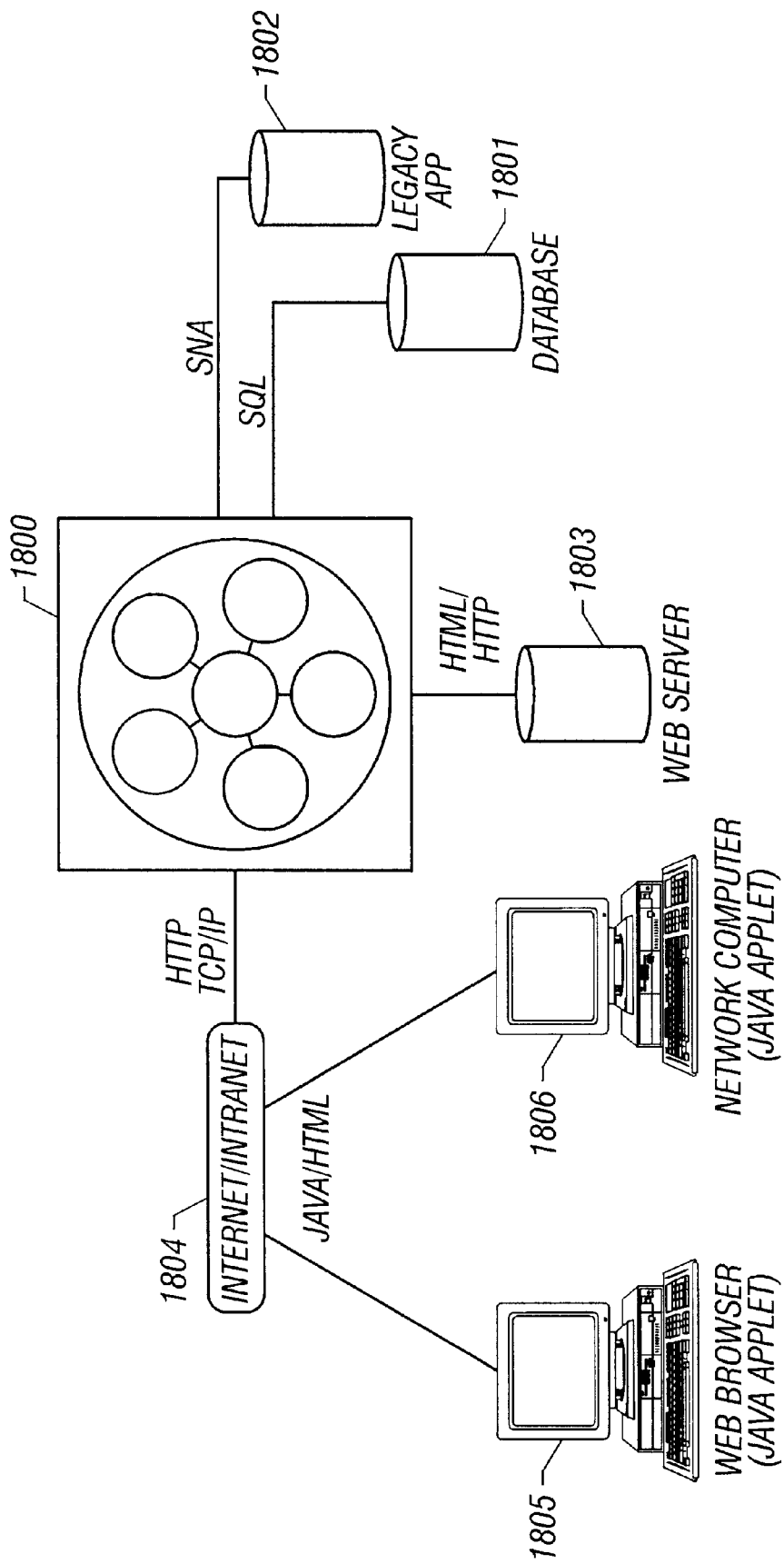
FIG. 18 is an example of a distributed Java application implementing an embodiment of the invention.

FIG. 18 illustrates a distributed Java application implemented on a CPR system. The CPR system enables standard Java applications to communicate in a regulated manner with multiple servers, unlike the prior art in which a Java applet is limited to communication with the local web server from which the Java applet was loaded. Java applications are thus able to access information or utilize resources in non-Internet/intranet domains. The system of FIG. 18 provides secure, reliable, audited access to legacy systems through modern, easy-to-maintain, Java-based applications.

In FIG. 18, Java applets are executed on web browser 1805 and network computer 1806, both of which communicate Java/HTML information to CPR network 1800 via internet/intranet 1804. CPR network 1800 maintains an HTTP and TCP/IP-based application service for interfacing with internet/intranet 1804. CPR network 1800 also maintains an application service providing an HTML/HTTP connection with web server 1803. Database 1801 and legacy application 1802 are coupled to CPR network 1800 via SQL-based and SNA-based application services, and are thus accessible to web server 1803, as well as Java-based applets executed by web browser 1805 or network computer 1806.

Each Java application is available to any Java-compatible web browser or client, and any authorized Java application may cause a service transaction to be initiated via the CPR network. The CPR network provides each Java application with access to information from proprietary legacy applications over non-TCP/IP networks.

Thus, a method and apparatus for content processing and routing have been described. Particular embodiments described herein are illustrative only and should not limit the present invention thereby. The invention is defined by the claims and their full scope of equivalents.

Included as Appendix 1 are the header files defining the API interfaces for an embodiment of the kernel configuration manager (KCFG), the kernel logging manager (KLOG), the kernel monitor manager (KMON), the kernel object handler (KOBJ), the queue and stream manager (KQM), the kernel remote service call manager (KRSC), the kernel storage manager (KSTOR), and components of the kernel link manager, an encryption module manager (KCRYP) and authentication module manager (KTERMMAN). These header files illustrate example data structures and function definitions suitable for implementing an embodiment of the invention.

APPENDIX 1

```
/************************************************************************

//@module KLOG_API (Definition)| Definition of KCFG API

//Copyright © 1996-97, RedBox Holdings NV. All Rights Reserved

//This file defines the API interface for the Kernel Configuration Module

//The Kernel Configuration module manages the configuration and loading of all CPR //
modules ifndef KFG_API_H
define KFG_API_H include "headers\mr_gen.h"
include "headers\klog_api.h"
#include "headers\kstor_api.h"

define MAXSRVBUFF 256 typedef struct {
        _TCHAR srvName[ MAXSRVBUFF ];
        _TCHAR srvModule[ MAXSRVBUFF ];
        _TCHAR srvAddress[ MAXSRVBUFF ];
        _TCHAR srvLanguage[ MAXSRVBUFF ];
} SRV_DETAILS;

// Exceptions
// @class An exception generated when a parameter to a function is invalid (usually NULL).
class KCFG_Parameter {};
// @class An exception generated when the script specified has invalid syntax
class KCFG_ScriptError {};

// @func Start the KCFG module
void DLLEXPORT MR_KCFG_Start(
        // @parm The logging queue to use for messages
        MR_KLOG_ILOGQUEUE hQueue,
        // @parm The file that contains the language resources
        const _TCHAR *resource_filename,
        // @parm Handle to file that contains config info for the kernel
        const KSTOR_CONFIG_HANDLE cHandle
        ) throw (KCFG_Parameter, KCFG_ScriptError);

// @func Stop the KCFG module
void DLLEXPORT MR_KCFG_Shutdown();
```

```
    // @func Get a variable defined. Variable value is set to a null length string if the variable
    // does not exist.

void DLLEXPORT MR_KCFG_GetVariable(
5           const _TCHAR *variable_name,
            _TCHAR *variable_value,
            int max_length
            );

10  // Will return details of first services currently active on this MR
    void DLLEXPORT MR_KCFG_GetFirstService(
            SRV_DETAILS *servInfo,
            BOOL *last
            );
15
    // returns details of next service active on this MR
    // last is true if this is the last service in the list
    void DLLEXPORT MR_KCFG_GetNextService(
            SRV_DETAILS *servInfo,
20          BOOL *last
            );

// prepares a configuration script from a running service and returns the script as a string
    void DLLEXPORT MR_KCFG_PrepareScriptFromServiceObject(
25          const _TCHAR* srvName,
            _TCHAR** outScriptString,
            int *outScriptLength
            );

30  // to configure a new service from a string of configuration information
    void DLLEXPORT MR_KCFG_ScriptSetup(
            const _TCHAR* scriptString,
            DWORD scriptStringSize
            );
35
    // to startup a service when CPR is already running
    void DLLEXPORT MR_KCFG_ServiceStartup(
            const _TCHAR* serviceName,
            int *status
40          );

// shuts down an existing service while CPR continues to run
    void DLLEXPORT MR_KCFG_ServiceShutdown(
            const _TCHAR* serviceName,
45          int *status
            );

#endif
```

```
/***************************************************************************

//@module KLOG_API: KLOG API Definition

//Copyright © 1996-97, RedBox Holdings NV.  All Rights Reserved

//This file defines the API interface into the Kernel Logging (KLOG) module.

//The Kernel Logging module provides a standard way of writing out logging information to
// files (and databases) without any I/O waiting. The API supports multiple thread and
// process access.

#ifndef _KLOG_API_H
define _KLOG_API_H include "headers\mr_gen.h"

define MR_KLOG_DEBUG_0            1
#define MR_KLOG_DEBUG_1            2
#define MR_KLOG_DEBUG_2            4
#define MR_KLOG_VERBOSE_0          8
#define MR_KLOG_VERBOSE_1          16
#define MR_KLOG_VERBOSE_2          32
#define MR_KLOG_NORMAL_0           64
#define MR_KLOG_NORMAL_1           128
#define MR_KLOG_NORMAL_2           256
#define MR_KLOG_ERRORS             512
#define MR_KLOG_WARNINGS           1024
#define MR_KLOG_ROUTE              2048
#define MR_KLOG_STARTUP            4096
#define MR_KLOG_SHUTDOWN           8192
#define MR_KLOG_KERNEL_0           16384
#define MR_KLOG_KERNEL_1           32768
define MR_KLOG_KERNEL_2           65536 define MR_KLOG_ALL                (MR_KLOG_KERNEL_1 - 1)
define MR_KLOG_DEBUG_ALL          (MR_KLOG_DEBUG_0 +
                                    MR_KLOG_DEBUG_1 +
                                    MR_KLOG_DEBUG_2)
#define MR_KLOG_VERBOSE_ALL        (MR_KLOG_VERBOSE_0 +
                                    MR_KLOG_VERBOSE_1 +
                                    MR_KLOG_VERBOSE_2)
#define MR_KLOG_NORMAL_ALL         (MR_KLOG_NORMAL_0 +
                                    MR_KLOG_NORMAL_1 +
                                    MR_KLOG_NORMAL_2)
#define MR_KLOG_KERNEL_ALL         (MR_KLOG_KERNEL_0 +
                                    MR_KLOG_KERNEL_1 +
                                    MR_KLOG_KERNEL_2)

// Exceptions
```

```
// @class General Exception raised by the KLOG API
class KLog_GenException {};
// @class The Input Queue Handle is invalid
class KLog_InputQueueHandle {};
// @class The Output Queue Handle is invalid
class KLog_OutputQueueHandle {};
// @class The Filename passed is invalid
class KLog_FileName {};
// @class The name of a queue is invalid
class KLog_QueueName {};
// @class A parameter passed to and API function is invalid
class KLog_Parameter {};

// enumerations

// @enum MR_KLOG_OUTQ_OPT | Output Queue logging options
typedef enum
{
    // @emem Log all results to the same file
    MR_KLOG_OUTQ_FILE,
    // @emem Use the current date to create the name of the file
    MR_KLOG_OUTQ_DATE,
    // @emem Ensure that the log files do not grow beyond a given size
    MR_KLOG_OUTQ_SIZE,
    MR_KLOG_OUTQ_ROTATE
} MR_KLOG_OUTQ_OPT;

// Handles

// @type MR_KLOG_ILOGQUEUE | An input queue handle
typedef int MR_KLOG_ILOGQUEUE;
// @type MR_KLOG_OLOGQUEUE | An output queue handle
typedef int MR_KLOG_OLOGQUEUE;

// API functions

// @func This function is used to setup the internal logging file and logging level used by the
// KLOG module. This function can throw the "KLog_Parameter" or "KLog_GenException"
// exceptions void DLLEXPORT MR_KLog_Start(
        // @parm The filename to use for internal logging
        const _TCHAR *internal_logfile,
        // @parm The filename to use for resource messages
        const _TCHAR *resource_file,
        // @parm The logging level to use for internal logging
        const int log_options
        ) throw (KLog_GenException);

// @ex The start function can be called as follows:
```

```
   // try
   // {
   //      MR_KLog_Start("KLOG.LOG", MR_KLOG_DEBUG_0);
   // }
   // catch(KLog_GenException)
   // {
   //      printf("Could not start internal logging for KLOG\n");
   // }

// @func This function is used to stop internal logging and is the reverse of MR_KLog_Start.
   // This function can throw the "KLog_GenException" exception, normally if MR_KLog_Start
   // has not been called void DLLEXPORT MR_KLog_Stop(
           void    // @parm This function takes no parameters
           ) throw (KLog_GenException);

// @ex The stop function can be called as follows:
   // try
   // {
   //      MR_KLog_Start("KLOG_LOG", MR_KLOG_DEBUG_0);
   //      MR_KLog_Stop();
   // }
   // catch(KLog_GenException)
   // {
   //      printf("Error occurred during logging\n");
   // }

// @func This function is used to create a new input queue. An input queue is used by the calling
   // application to write log strings. The function can throw the "KLog_GenException" and
   // "KLog_Parameter" exceptions.

void DLLEXPORT MR_KLog_CreateInputQueue(
           // @parm (output) The handle is written to this parameter
           MR_KLOG_ILOGQUEUE *phlog,
           // @parm The name of the queue (displayed on the output file)
           const _TCHAR *name,
           // @parm The logging level to use for this queue
           const int LoggingLevel
           ) throw(KLog_GenException, KLog_Parameter);

// @ex The create input queue function could be called as follows:
   // MR_KLOG_ILOGQUEUE hQueue;
   // try
   // {
   //      MR_KLog_CreateInputQueue(&hQueue, "EXAMPLE",
   //              MR_KLOG_DEBUG_0);
   // }
   // catch(KLog_GenException)
   // {
   //      printf("A general exception occurred while creating an input queue\n");
```

```
//}
// catch(KLog_Parameter)
//{
//      printf("One of the parameters passed was invalid\n");
//}

// @func This function is used to create a new output queue. An output queue corresponds to a
// queue that receives its log strings from a number of input queues and writes them to a file. The
// function can throw the "KLog_GenException" and "KLog_Parameter" exceptions.

void DLLEXPORT MR_KLog_CreateOutputQueue(
        // @parm (output) The handle is written to this parameter
        MR_KLOG_OLOGQUEUE *phlog,
        // @parm The name of the queue
        const _TCHAR *name,
        // @parm The filename or directory to use for the logging
        const _TCHAR *filename,
        // @parm What type of logging to perform (see MR_KLOG_OUTQ_OPT)
        const MR_KLOG_OUTQ_OPT flags,
        // @parm The size limit of individual log files
        const int sizelimit
        ) throw(KLog_GenException, KLog_Parameter);

// @ex The create output queue function could be called as follows:
// MR_KLOG_OLOGQUEUE hQueue;
// try
//{
//      MR_KLog_CreateOutputQueue(&hQueue, "EXAMPLE", "EXAM.LOG",
//              MR_KLOG_OUTQ_FILE, 0);
//}
// catch(KLog_GenException)
//{
//      printf("A general exception occurred while creating an output queue\n");
//}
// catch(KLog_Parameter)
//{
//      printf("One of the parameters passed was invalid\n");
//}

// @func This function is used to delete an input queue previously allocated with
// MR_KLog_CreateInputQueue. The function can throw the "KLog_InputQueueHandle"
// exception.

void DLLEXPORT MR_KLog_DeleteInputQueue(
        // @parm The handle of the queue to delete
        MR_KLOG_ILOGQUEUE hqueue
        ) throw(KLog_InputQueueHandle);

// @ex The delete input queue function could be called as follows:
// MR_KLOG_ILOGQUEUE hQueue;
// try
```

```
//{
//      MR_KLog_CreateInputQueue(&hQueue, "EXAMPLE", MR_KLOG_DEBUG_0);
//      MR_KLog_DeleteInputQueue(hQueue);
//}
// catch(KLog_InputQueueHandle)
//{
//      printf("The input queue handle was invalid\n");
//}
// catch(KLog_GenException)
//{
//      printf("A general exception occurred while creating an input queue\n");
//}
// catch(KLog_Parameter)
//{
//      printf("One of the parameters passed was invalid\n");
//}

// @func This function is used to delete an output queue previously allocated with
// MR_KLog_CreateOutputQueue. The function can throw the "KLog_OutputQueueHandle"
// exception.

void DLLEXPORT MR_KLog_DeleteOutputQueue(
        // @parm The handle of the queue to delete
        MR_KLOG_OLOGQUEUE hqueue
        ) throw(KLog_OutputQueueHandle);

// @ex The delete output queue function could be called as follows:
// MR_KLOG_OLOGQUEUE hQueue;
// try
//{
//      MR_KLog_CreateOutputQueue(&hQueue, "EXAMPLE", "EXAM.LOG",
//              MR_KLOG_OUTQ_FILE, 0);
//      MR_KLog_DeleteOutputQueue(hQueue);
//}
// catch(KLog_OutputQueueHandle)
//{
//      printf("The output queue handle was invalid\n");
//}
// catch(KLog_GenException)
//{
//      printf("A general exception occurred while creating an output queue\n");
//}
// catch(KLog_Parameter)
//{
//      printf("One of the parameters passed was invalid\n");
//}

// @func This function binds an input queue to an output queue. An input queue can only be bound
// to one output queue but an output queue can be bound to many input queues. This function can
// throw the "KLog_OutputQueueHandle" and "KLogInputQueueHandle" exceptions.
```

```
    void DLLEXPORT MR_KLog_BindQueue(
            // @parm The handle of the input queue
            const MR_KLOG_ILOGQUEUE hIqueue,
            // @parm The handle of the output queue
 5          const MR_KLOG_OLOGQUEUE hOQueue
            ) throw(KLog_InputQueueHandle, KLog_OutputQueueHandle);

// @ex The bind queue function could be called as follows:
    // MR_KLOG_ILOGQUEUE hInputQueue;
10  // MR_KLOG_OLOGQUEUE hOutputQueue;
    // try
    // {
    //      MR_KLog_CreateInputQueue(&hInputQueue, "EXAMPLE", MR_KLOG_DEBUG_0);
    //      MR_KLog_CreateOutputQueue(&hOutputQueue, "EXAMPLE", "EXAM.LOG",
15  //              MR_KLOG_OUTQ_FILE, 0);
    //      MR_KLog_BindQueue(hInputQueue, hOutputQueue);
    // }
    // catch(KLog_InputQueueHandle)
    // {
20  //      printf("The input queue handle was invalid\n");
    // }
    // catch(KLog_OutputQueueHandle)
    // {
    //      printf("The output queue handle was invalid\n");
25  // }
    // catch(KLog_GenException)
    // {
    //      printf("A general exception during the example\n");
    // }
30  // catch(KLog_Parameter)
    // {
    //      printf("One of the parameters passed was invalid\n");
    // }

35  // @func This function is used to write a message to a given input queue. If the input queue is
    // bound to an output queue, the message will eventually be moved to that output queue and then
    // to the log file associated with that output queue. If the logging level passed does not contain
    // any flags in common with those when the queue was setup, the message is thrown away. This
    // function can throw the "KLog_InputQueueHandle" and "KLogParameter" exceptions.
40
    void DLLEXPORT MR_KLog_WriteLog(
            // @parm The handle of the input queue
            const MR_KLOG_ILOGQUEUE hqueue,
            // @parm The logging level for this message
45          const int LoggingLevel,
            // @parm The message itself
            const _TCHAR *msg,
            // @parm The length of the message
            const unsigned int msg_length
50          ) throw(KLog_InputQueueHandle, KLog_Parameter);
```

```
// @ex The write log function could be called as follows:
// MR_KLOG_ILOGQUEUE hInputQueue;
// MR_KLOG_OLOGQUEUE hOutputQueue;
// try
// {
//     _TCHAR msg[] = "A test message";
//     MR_KLog_CreateInputQueue(&hInputQueue, "EXAMPLE", MR_KLOG_DEBUG_0);
//     MR_KLog_CreateOutputQueue(&hOutputQueue, "EXAMPLE", "EXAM.LOG",
//         MR_KLOG_OUTQ_FILE, 0);
//     MR_KLog_BindQueue(hInputQueue, hOutputQueue);
//     MR_KLog_WriteLog(hInputQueue, MR_KLOG_DEBUG_0, msg, strlen(msg));
// }
// catch(KLog_InputQueueHandle)
// {
//     printf("The input queue handle was invalid\n");
// }
// catch(KLog_OutputQueueHandle)
// {
//     printf("The output queue handle was invalid\n");
// }
// catch(KLog_GenException)
// {
//     printf("A general exception occurred during the example\n");
// }
// catch(KLog_Parameter)
// {
//     printf("One of the parameters passed was invalid\n");
// }

// @func This function is used to retrieve the current logging level in force on an input queue. A
// module can use this information to selectively call MR_KLog_WriteLog instead of letting
// that function throw away a string that took a while to setup. This function can throw the
// "KLog_InputQueueHandle" and "KLogParameter" exceptions.

void DLLEXPORT MR_KLog_GetLoggingLevel(
        // @parm The handle of the input queue
        const MR_KLOG_ILOGQUEUE hQueue,
        // @parm The logging level is written to this parameter
        int *logging_level
        ) throw(KLog_InputQueueHandle, KLog_Parameter);

// @ex The get logging level function could be called as follows:
// MR_KLOG_ILOGQUEUE hQueue;
// int logging_level = MR_KLOG_DEBUG_0;
// int read_logging_level;
// try
// {
//     MR_KLog_CreateInputQueue(&hQueue, "EXAMPLE", MR_KLOG_DEBUG_0);
//     MR_KLog_GetLoggingLevel(hQueue, &read_logging_level);
//     assert(read_logging_level == logging_level);
// }
```

```
//  catch(KLog_GenException)
//  {
//      printf("A general exception occurred while creating an input queue\n");
//  }
//  catch(KLog_Parameter)
//  {
//      printf("One of the parameters passed was invalid\n");
//  }
//  catch(KLog_InputQueueHandle)
//  {
//      printf("The input queue handle was invalid\n");
//  } void DLLEXPORT MR_KLog_ThrowErrorWithStack(
    LPVOID exception_to_throw,
    const _TCHAR *msg
    );

void DLLEXPORT MR_KLog_BindDirect(
    // @parm The NAME of the output queue to find
    const _TCHAR* nameOQueue,
    // @parm The NAME to give the new input queue
    const _TCHAR* nameIQueue,
    // @parm The LOGGING LEVEL for the new input queue
    const int LoggingLevel,
    // @parm Pointer for the new input queue HANDLE
    MR_KLOG_ILOGQUEUE* p_hIQueue
    );

VOID DLLEXPORT MR_KLog_WriteEventLog(
    //@parm The type of event as defined in the MACRO for ReportEvent()
    int EventType,
    //@parm The message to be printed out to the Event Log
    LPTSTR lpszMsg
    );

LPVOID DLLEXPORT MR_KLog_DebugAllocAdd(
    LPVOID,
    const char *,
    int,
    const char *,
    int
    );

BOOL DLLEXPORT MR_KLog_DebugAllocRemove(
    LPVOID,
    const char *,
    int);

#endif
```

```
/*********************************************************************/

//@module KMON_API (Definition): Definition of KMON API

//Copyright © 1996-97, RedBox Holdings NV. All Rights Reserved

//This file defines the API interface into the Kernel Monitoring Component (KMON) module.

//The Kernel Monitoring component is used to monitor the running threads in the CPR
// and report on their usage to external applications (or other CPRs). In this way, the
// CPR can report overall performance or availability of performance resource to help
// better manage processor utilization.

#ifndef KMON_API_H
define KMON_API_H include "headers\mr_gen.h"
include "headers\klog_api.h"

#define THR_NAME_LEN _MAX_PATH
#define THR_DESC_LEN 512
// 40 seconds polling time for the Monitor Thread
#define KMON_POLLING_TIME_INTERVAL 40000
// Max CPU Rate (%) for Reactive Threads
#define MAX_REACTIVE_CPU_RATE 25
// Min CPU Rate (%) for Periodic Threads
#define MIN_PERIODIC_CPU_RATE 26
// Max CPU Rate (%) for Periodic Threads
#define MAX_PERIODIC_CPU_RATE 50
// Min CPU Rate (%) for Constant Threads
#define MIN_CONSTANT_CPU_RATE 51
// Max CPU Rate (%) for Constant Threads
#define MAX_CONSTANT_CPU_RATE 75
// Min CPU Rate (%) for Critical Threads
#define MIN_CRITICAL_CPU_RATE 76
#define REACTIVE_WEIGHT      2      // Weight of Reactive threads
#define PERIODIC_WEIGHT      4      // Weight of Periodic threads
#define CONSTANT_WEIGHT      8      // Weight of Constant threads
define CRITICAL_WEIGHT      16     // Weight of Critical threads // definition of possible types of thread
typedef enum
{
        // normally constantly waiting on a given object or event to happen
        KMON_THREAD_REACTIVE = 0,
        // normally sleeps for a given amount of time and then bursts into life to perform a given
        // task before sleeping again
        KMON_THREAD_PERIODIC,
        // normally runs constantly until completion
        KMON_THREAD_CONSTANT,
```

```
        // a thread that needs to make most use of processor resource.
        KMON_THREAD_CRITICAL,
        KMON_THREAD_NONDEFINED    // Non defined state
}KMON_THREAD_TYPE;

// definition of a strategy to follow
typedef enum
{
        // No thread affinity or ideal processor setting takes place.
        //All threads can run on all processors
        KMON_STRAT_NONE = 1000,
        // Enabled when there are no critical threads and the ration of
        //CONSTANT:PERIODIC:REACTIVE is approximately 1:4:8
        KMON_STRAT_BALANCED,
        // Enabled when there are no CRITICAL threads and the ratio of CONSTANT threads
        // to other threads is close to 1 or more.
        KMON_STRAT_CONSTANT,
        KMON_STRAT_NONDEFINED    // Non defined state
}KMON_THREAD_STRAT;

// definition of type of threads to monitor
typedef enum
{
        // Monitor all threads, including those already not alive.
        KMON_ALL_THREADS = 5000,
        // Monitor Alive threads only
        KMON_ALIVE_THREADS_ONLY,
}KMON_MONIT_MODE;

// Exceptions
// These are the exceptions that can be thrown by this module

// A start or shutdown has been called in the wrong order, or the wrong number of times
class KMON_InvalidState {};
// The handle passed to a function was invalid or out of date
class KMON_InvalidHandle {};

// @func Used to start the module
void DLLEXPORT KMON_Start(
        // @parm Handle used for logging
        const MR_KLOG_ILOGQUEUE hlog,
        // @parm File used for resource messages
        const _TCHAR *resource_file,
        //@parm mode used to monitor threads
        const KMON_MONIT_MODE monit_mode
        );

// @func Used to stop the module
void DLLEXPORT KMON_Shutdown(
        BOOL flush_all
        // @parm If this parameter is TRUE, the memory mapped files associated with the
```

```
            // banks and queues are flushed before deletion
            );

HANDLE DLLEXPORT KMON_CreateThread(
  5             LPSECURITY_ATTRIBUTES lpThreadAttributes,
                DWORD dwStackSize,
                LPTHREAD_START_ROUTINE lpStartAddress,
                LPVOID lpParameter,
                DWORD dwCreationFlags,
 10             LPDWORD lpThreadId,
                LPCTSTR lpThreadName,
                LPCTSTR lpThreadDesc,
                KMON_THREAD_TYPE type
                );
 15
        #endif //KMON_API_H
```

```
/*************************************************************************

//@module KOBJ_API (Header): Definition of KOBJ API

//Copyright © 1996-97, RedBox Holdings NV. All Rights Reserved

//This file defines the API interface into the Kernel Object Helper (KOBJ) module.

//The Kernel Object Helper Module provides API functions to aid the manipulation of a Media
// Object and its component parts.

#ifndef _KOBJ_API_H
define _KOBJ_API_H include "headers\mr_gen.h"

// Exceptions

// @class General Exception raised by the KOBJ API
class KObj_GenException {};
// @class The Object has an invalid format
class KObj_InvalidObject {};
// @class The Size of the Media Object (or component) is insufficient
class KObj_Size {};
// @class The Size of a buffer passed to an API function is insufficient
class KObj_BufferSize {};
// @class A parameter passed to an API function is invalid
class KObj_InvalidParameter {};
// @class Section not valid
class KObj_InvalidSection {};

// defines

// Deleted object type define MR_KOBJ_DELETED            -1

// Name types define MR_KOBJ_NAME_START         0
define MR_KOBJ_NAME_UID           1
#define MR_KOBJ_NAME_PUBLIC        2
#define MR_KOBJ_NAME_REF           3
// Signature of data section (used for validation of user_id)
#define MR_KOBJ_NAME_SIG           4
// The UID of the user that created this object
#define MR_KOBJ_NAME_USERUID       5
#define MR_KOBJ_NAME_USER          10
#define MR_KOBJ_NAME_DELETE        97
#define MR_KOBJ_NAME_END           99
```

```
// Address types define MR_KOBJ_ADDRESS_START           100
define MR_KOBJ_ADDRESS_ROUTE_OUT       101
#define MR_KOBJ_ADDRESS_ROUTE_RET       102
// This is info used to generate the ROUTE_OUT information
#define MR_KOBJ_ADDRESS_INFO            103
#define MR_KOBJ_ADDRESS_SOURCE          104
#define MR_KOBJ_ADDRESS_DEST            105
// This is used to hold all the parameters required by quality of service router
#define MR_KOBJ_ADDRESS_QOSROUTE        106
#define MR_KOBJ_ADDRESS_DELETE          197
#define MR_KOBJ_ADDRESS_USER            110
#define MR_KOBJ_ADDRESS_END             199

// Data types define MR_KOBJ_DATA                    1000

// Typedefs typedef enum
{
        MRKOBJ_COMPRESSION_NONE,
        MRKOBJ_COMPRESSION_RLE
} MRKOBJ_COMPRESSION_T;

typedef int MR_KOBJ_SESSION_HANDLE;

#define MR_KOBJ_MAX_KEYNAME             40
#define MR_KOBJ_MAX_ENCTYPE             40
#define MR_KOBJ_MAX_SIGNATURE           (20 * 2)

// @type MRKOBJ_HEADER_T: This is the header information for a Media Object
typedef struct
{
        // @field The total size of the media object
        int total_size_of_object;
        // @field The low order integer of the version
        int version_low;
        // @field The high order integer of the version
        int version_high;
        // @field The original size before encryption (only valid if encrypt_key_name and
        // type are set and then encryption specific)
        int original_size_of_object;
        int current_route_pos;
        // @field Current route position
        // (in MR_KOBJ_ADDRESS_ROUTE_OUTd)
        MRKOBJ_COMPRESSION_T compression;
        int uncompressed_size;
```

```
        // NULL for any of these implies no encryption in force
        _TCHAR encrypt_key_name[MR_KOBJ_MAX_KEYNAME];
        _TCHAR encrypt_key_type[MR_KOBJ_MAX_ENCTYPE];
        // Signature of the message (encrypted using the private key associated with
5       // ADDRESS_SOURCE). Signature is hash of everything after this structure
        char message_signature[MR_KOBJ_MAX_SIGNATURE];
    } MRKOBJ_HEADER_T;

// @type MRKOBJ: This is simply a type safe declaration of a media object
10  #define MRKOBJ MRKOBJ_HEADER_T // @type MRKOBJ_MEDIA_T: This is the information about a generic medium. It always goes
    // at the start of a media item (e.g. address, name)

15  typedef struct
    {
        int type;       // @field The type of MEDIUM
        int size;       // @field The size of the whole medium (variables + data)
    } MRKOBJ_MEDIA_T;
20
    // @type MRKOBJ_ADDRESS_T: This is the information about a single address typedef struct
    {
25      MRKOBJ_MEDIA_T medium;
        int taken;          // @field Whether the address has been "visited"
        _TCHAR data[1];     // @field The first _TCHARacter of the address
    } MRKOBJ_ADDRESS_T;

30  // @type MRKOBJ_NAME_T: This is the information about a single name typedef struct
    {
        MRKOBJ_MEDIA_T medium;
35      _TCHAR name[1];     // @field The first _TCHARacter of the string
    } MRKOBJ_NAME_T;

// API functions
    //
40  // - All operations are typically done through a session handle. The user is not
    // given access to the raw Media Object data (MRKOBJ structure type).
    // - When the user extracts data, he/she is always given a copy of the object
    // data. So, all buffers must be initialised by the user, prior to the extraction.

45  // @func This function is used to start a session with kobj. It actually creates a new media object.
    // If a buffer is not passed to this function, a new, empty object will be created. Otherwise, the
    // Media Object will be initialised with the contents of the buffer.
    void DLLEXPORT MR_KObj_StartSession(
            //@parm Returns a session handle
50          MR_KOBJ_SESSION_HANDLE *hSession,
            int size = 0,       //@parm Size of buffer
```

```
        char *pdata = NULL   //@parm Buffer
        );

// @func This function ends a session with kobj. It actually deletes the media object.
void DLLEXPORT MR_KObj_EndSession(
        MR_KOBJ_SESSION_HANDLE  hSession
        );

// @func This function is used to copy the raw data of the MRKOBJ that corresponds to the
// session handle, to a buffer.
//If 'pdata' = NULL, size will return the size of the media object.
void DLLEXPORT MR_KObj_GetObjectData(
        MR_KOBJ_SESSION_HANDLE  hSession,    //@parm Session handle
        //@parm The size of the buffer. If buffer = NULL, it returns the size of the data to be
        // returned.
        int *size,
        char *pdata      //@parm Destination Buffer
        ) throw (KObj_BufferSize);

// @func This function is used to compact the data of an MRKOBJ.
//That means:
//1. The total storage area equals the actual size the data occupy (minimum).
//2. Storage space is defragmented (media items marked as 'deleted' are lost permanently).
void DLLEXPORT MR_KObj_CompactObject(
        MR_KOBJ_SESSION_HANDLE  hSession      //@parm Session handle
        ) throw (KObj_InvalidParameter);

// @func This function is used to return the total size of a Media Object.
void DLLEXPORT MR_KObj_GetTotalSize(
        // @parm The session handle of the media object
        MR_KOBJ_SESSION_HANDLE  hSession,
        int *size        // @parm The size is returned in this parameter
        ) throw (KObj_InvalidObject, KObj_InvalidParameter);

// @ex The size function can be called as follows:
// try
// {
//      int size;
//      MR_KObj_GetTotalSize(hObject, &size);
// printf("The size is %ld\n", size);
// }
// catch(KObj_GenException)
// {
//      printf("The media object is invalid\n");
// }

//@func Generic add action. Adds a medium in the Media Object.
void DLLEXPORT MR_KObj_Add(
        MR_KOBJ_SESSION_HANDLE  hSession,    //@parm Session handle
        int media_type,       //@parm The type of the media item
        int size,             //@parm Size of the source buffer
```

```
                  const char *pdata      //@parm Source buffer
                  ) throw (KObj_InvalidObject, KObj_InvalidParameter);

//@func Generic get action. Gets a medium from the Media Object.
 5     void DLLEXPORT MR_KObj_Get(
                  MR_KOBJ_SESSION_HANDLE hSession, //@parm Session handle
                  int media_type,        //@parm Type of medium
                  //@parm Index of item (among media items of the same type).
                  // First one has index '0'.
10                int index,
                  //@parm Size of destination buffer, or size of data returned when buffer is NULL.
                  int *size,
                  const char *pdata,     //@parm Destination buffer
                  int *status            //@parm Returned status
15                ) throw (KObj_InvalidObject, KObj_InvalidParameter);

//@func Generic delete action. Marks a medium in the Media Object as deleted.
       void DLLEXPORT MR_KObj_Delete(
                  MR_KOBJ_SESSION_HANDLE hSession,   // @parm Session handle
20                int type,      // @parm Medium type
                  int index,     // @parm Index of item (among items of the same type)
                  int *status    // @parm Returned status
                  ) throw (KObj_InvalidSection, KObj_InvalidParameter);

25     // Name section functions

//@func Retrieves the first name of the specified type, if it exists in the Media Object. Passing
       // NULL as 'pname' will simply get the size of the data in 'size'.
       void DLLEXPORT MR_KObj_GetFirstName(
30                MR_KOBJ_SESSION_HANDLE hSession,   // @parm Session handle
                  int type,      // @parm Name Type
                  // @parm Size of destination buffer, or size of data returned when buffer is NULL
                  int *size,
                  _TCHAR *pname, // @parm Destination buffer (receives the 'name')
35                int *status    // @parm The returned status
                  ) throw (KObj_InvalidSection, KObj_InvalidParameter);

//@func Retrieves the first name of the specified type after creating a session handle. It closes
       // the session handle at the end of it.
40     void DLLEXPORT MR_KObj_SingleShot_GetFirstName(
                  int type,      // @parm The type
                  _TCHAR **pname,   // @parm The name is placed in this field (not a copy)
                  int *status,   // @parm The returned status
                  int objectsize,   // @parm Size of buffer
45                char *pobject); // @parm buffer //@func Retrieves the next name of the *current* type. Note that there is no 'type' parameter
       // here. We assume that the user requires the next 'name' of the same type, specified in a
       // preceding 'GetFirstName' call. 'MR_KObj_GetFirstName' is equivalent to a generic
50     // 'MR_KObj_Get' with index of 0. It initialises the index to 0. 'MR_KObj_GetNextName' is
       // equivalent to a 'MR_KObj_Get' with index of (last index + 1). It increments the index by one.
```

```
// Passing NULL as 'pname' will simply get the size of the data in 'size'. If 'last' is set, there
// are no other names ('pname' is left untouched).
void DLLEXPORT MR_KObj_GetNextName(
        MR_KOBJ_SESSION_HANDLE hSession,    // @parm Session handle
        int *size,       // @parm Size of destination buffer
        _TCHAR *pname, // @parm Destination buffer (receives the 'name')
        BOOL *last     // @parm Set to true if there are no more names of the specified type
        ) throw (KObj_InvalidSection, KObj_InvalidParameter);

//@func Adds a name of the specified type.
void DLLEXPORT MR_KObj_AddName(
        MR_KOBJ_SESSION_HANDLE hSession,    // @parm Session handle
        int name_type,        // @parm Name type
        int size,             //@parm Size of source buffer
        const _TCHAR *pname  // @parm Source buffer (contains the 'name')
        ) throw (KObj_InvalidSection, KObj_InvalidParameter, KObj_Size);

// Address section functions

//@func Retrieves the first address of the specified type
//Passing NULL as 'paddress' will simply get the size of the data in 'size'.
void DLLEXPORT MR_KObj_GetFirstAddress(
        MR_KOBJ_SESSION_HANDLE hSession,    // @parm Session handle
        int type,        // @parm Address Type
        int *taken,      // @parm The visited component of the address
        // @parm Size of destination buffer, or size of data returned when buffer is NULL
        int *size,
        _TCHAR *paddress,   // @parm Destination buffer (receives the 'address')
        int *status,     // @parm The returned status
        BOOL short_form = TRUE
        ) throw (KObj_InvalidSection, KObj_InvalidParameter);

//@func Retrieves the first address of the specified type  after creating a session handle. It
// closes the session handle at the end of it.
void DLLEXPORT MR_KObj_SingleShot_GetFirstAddress(
        int type,       // @parm The type is placed in this field
        int *taken,     // @parm The visited component of the address
        _TCHAR **paddress, // @parm The name is placed in this field
        int *status,    // @parm The returned status
        int objectsize, // @parm Size of buffer
        char *pobject,  // @parm buffer
        BOOL short_form = TRUE
        );

//@func Retrieves the next address of the current type. It follows the same reasoning as
// 'GetNextName'. Passing NULL as 'paddress' will simply get the size of the data in 'size'.
// If 'last' is set, there are no other addresses ('paddress' is left untouched).
void DLLEXPORT MR_KObj_GetNextAddress(
        // @parm Session handle
        MR_KOBJ_SESSION_HANDLE hSession,
        int *taken,      // @parm The visited component of the address
```

```
        int *size,         // @parm Size of destination buffer
        _TCHAR *paddress,  // @parm Destiantion buffer (contains the 'address')
        BOOL *last,        // @parm Set to true if there are no more addresses of the specified type
        BOOL short_form = TRUE
        ) throw (KObj_InvalidSection, KObj_InvalidParameter);

//@func Adds an address of the specified type.
void DLLEXPORT MR_KObj_AddAddress(
        MR_KOBJ_SESSION_HANDLE hSession,   // @parm Session handle
        int address_type,      // @parm Address type
        int taken,             // @parm The taken component
        int size,              //@parm Size of source buffer
        const _TCHAR *address  // @parm Source buffer (contains the 'address')
        ) throw (KObj_InvalidSection, KObj_InvalidParameter, KObj_Size);

// Compression functions void DLLEXPORT MR_KObj_CompressObject(
        MRKOBJ *object,
        MRKOBJ **new_object
        ) throw (KObj_InvalidObject, KObj_InvalidParameter);

void DLLEXPORT MR_KObj_DecompressObject(
        MRKOBJ *object,
        MRKOBJ **new_object
        ) throw (KObj_InvalidObject, KObj_InvalidParameter);

// Debug functions void DLLEXPORT MR_KObj_DumpObject(
        MRKOBJ *object,
        HANDLE hOutput
        ) throw (KObj_InvalidObject, KObj_InvalidParameter);

// Signature etc.

// This function creates a message digest for the object and encrypts that digest using the
// private key for the service quoted in source. The private key is unlocked using the password
//given void DLLEXPORT MR_KObj_SignObject(
        MRKOBJ *object,
        char *my_password
        );

BOOL DLLEXPORT MR_KObj_CheckSignedObject(MRKOBJ *object);

#endif
```

```
/*************************************************************************

//@module KQM_API (Header): Definition of KQM API

//Copyright © 1996-97, RedBox Holdings NV. All Rights Reserved

//This file defines the API interface into the Kernel Queue Management (KQM) module.

//The Kernel Queue Management module provides an API that manipulates both the queues
// that hold Media Objects and the Media Objects themselves ifndef _KQM_API_H
define _KQM_API_H include "headers\mr_gen.h"
include "headers\klog_api.h"
#include "headers\kobj_api.h"

// Exceptions

// @class The exception thrown when a parameter to an API call is invalid
class KQM_Parameter {};
// @class The exception thrown when there is insufficient memory to allocate a queue or bank
class KQM_Memory {};
// @class The eception raised when a name used in a queue or bank already exists or the name
// does not exist (when it should!)
class KQM_Name {};
// @class The exception is raised when a wait for object timed out
class KQM_Timeout {};

// Internal API functions

// @func This function is used to start the component. It defines the KLOG queue handle used for
// logging void DLLEXPORT MR_KQM_Start(
        // @parm The KLOG queue handle used to write log messages out
        const MR_KLOG_ILOGQUEUE hQueue,
        const _TCHAR *resource_file  // @parm Filename for resources
        );

// @func This function is used to shutdown the KQM in this instance.

void DLLEXPORT MR_KQM_Shutdown(
        // @parm If this parameter is TRUE, the memory mapped files associated with the
        // banks and queues are flushed before deletion
        BOOL flush_all
        );

// @func This function is used to create a new object bank.
```

```
void DLLEXPORT MR_KQM_CreateObjectBank(
        const _TCHAR *name,           // @parm The name of object bank
        const int max_size_of_object, // @parm The maximum size of an object in this bank
        const int max_objects    // @parm The maximum number of objects in this bank
        ) throw(KQM_Memory, KQM_Name, KQM_Parameter);

// @func This function is used to delete an object bank created with
// MR_KQM_CreateObjectBank. It is preferable to never delete object banks however. Use the
// MR_KQM_Shutdown function to perorm a considered close down of the queues and banks in
// the system.

void DLLEXPORT MR_KQM_DeleteObjectBank(
        const _TCHAR *name  // @parm The name of an existing object bank
        ) throw(KQM_Parameter, KQM_Name);

// @func This function is used to create an object queue void DLLEXPORT MR_KQM_CreateObjectQueue(
        const _TCHAR *name,          // @parm The name of the new object queue
        int max_entries,      // @parm The maximum number of entries in this queue
        int def_priority,     // @parm The default priority of objects placed on the queue
        BOOL place_objects,   // @parm Whether services can place objects on the queue
        BOOL retrieve_objects, // @parm Whether services can retrieve objects on the queue
        BOOL use_fifo,  // @parm Whether fifo or priority is used to place objects in the queue
        // @parm The internal class of objects that are to be placed on this queue
        int class_of_object
        ) throw (KQM_Parameter, KQM_Name, KQM_Memory);

// @func This function is used to modify and existing object queue void DLLEXPORT MR_KQM_ModifyObjectQueue(
        const _TCHAR *name,          // @parm The name of an existing object queue
        int def_priority,     // @parm The default priority of objects placed on the queue
        BOOL place_objects,   // @parm Whether services can place objects on the queue
        BOOL retrieve_objects, // @parm Whether services can retrieve objects on the queue
        BOOL use_fifo  // @parm Whether fifo or priority is used to place objects in the queue
        ) throw (KQM_Parameter, KQM_Name, KQM_Memory);

// @func This function is used to delete an object queue created with
// MR_KQM_CreateObjectQueue. It is preferable to never delete object queues however. Use
// the MR_KQM_Shutdown function to perform a considered close down of the queues and banks
// in the system.

void DLLEXPORT MR_KQM_DeleteObjectQueue(
        const _TCHAR *name  // @parm The name of an existing object queue
        ) throw (KQM_Name, KQM_Parameter);

// External API functions
```

```
// More exceptions

// @class The exception thrown when the queue passed is invalid or cannot support the
// operation
class KQM_Queue {};
// @class The exception thrown when there are no objects present on the queue
class KQM_None {};

// Object type structure

// @type The object structure typedef struct
{
        int bank_reference;     // @field The bank reference of this object
        int object_reference;   // @field The reference within this bank
} MR_OBJECT_T;

// @func This function is used to create a media object (allocated from an appropriate bank)
void DLLEXPORT MR_KQM_CreateMediaObject(
        int size,                // @parm The maximum size of the object
        MR_OBJECT_T *object      // @parm The pointer to the object handle
        ) throw (KQM_Memory, KQM_Parameter);

// @func This function is used to obtain the pointer to the object memory from the object handle.
//MR_KQM_UnlockObject is used when finished void DLLEXPORT MR_KQM_LockObjectToPtr(
        // @parm An object previously allocated by MR_KQM_CreateMediaObject
        MR_OBJECT_T *object,
        // @parm This pointer will point to the Media Object contents.
        MRKOBJ **object_ptr
        ) throw (KQM_Parameter);

// @func This function unlocks the object previously locked with the
// MR_KQM_LockObjectToPtr void DLLEXPORT MR_KQM_UnlockObject(
        MR_OBJECT_T *object,     // @parm The object handle
        MRKOBJ *object_ptr       // @parm Unlock this object
        ) throw (KQM_Parameter);

// @func This function is used to delete a Media Object allocated by
// MR_KQM_CreateMediaObject void DLLEXPORT MR_KQM_DeleteMediaObject(
        MR_OBJECT_T *object      // @parm The Media Object to be deleted
        ) throw (KQM_Parameter);

// @func This function reallocates the size of a media object (possibly changing its location)
```

```
void DLLEXPORT MR_KQM_ReallocateMediaObject(
        MR_OBJECT_T *object,      // @parm The Media Object to be reallocated
        int new_size    // @parm The new size of the media object
        ) throw (KQM_Parameter, KQM_Memory, KQM_Queue);

// Queue management typedef struct
{
        int handle;
} MR_QUEUE_T;

// @func This function binds a given service with input end of a queue.

void DLLEXPORT MR_KQM_BindToInputQueue(
        const _TCHAR *service_name,    // @parm The name of the service
        const _TCHAR *queue_name,      // @parm The name of the queue
        MR_QUEUE_T *queue   // @parm This will be filled in with the handle to the queue
        ) throw (KQM_Name, KQM_Parameter);

// @func This function is used to retrieve the class type of objects associated with a given queue void DLLEXPORT MR_KQM_GetQueueClassType(
        MR_QUEUE_T *queue,        // @parm The handle to a validly bound queue
        int *class_type   // @parm Will be filled in with the class type associated with a queue
        ) throw (KQM_Parameter);

// @func This function places a Media Object on the given queue void DLLEXPORT MR_KQM_PlaceObjectOnQueue(
        MR_QUEUE_T *queue,        // @parm The handle to a validly bound queue
        MR_OBJECT_T *object       // @parm The object to place on the queue
        ) throw (KQM_Queue, KQM_Memory);

// @func This function binds a given service with the output end of a queue void DLLEXPORT MR_KQM_BindToOutputQueue(
        const _TCHAR *service_name,    // @parm The name of the service
        const _TCHAR *queue_name,      // @parm The name of the queue
        MR_QUEUE_T *queue   // @parm This will be filled in with the handle to the queue
        ) throw (KQM_Name, KQM_Parameter, KQM_Queue);

// @func This function is used to register a semaphore object with the output end of a queue void DLLEXPORT MR_KQM_RegisterQueueSemaphore(
        MR_QUEUE_T *queue,        // @parm The handle to a validly bound queue
        const _TCHAR *semaphore_name     // @parm The name of the semaphore to register
        ) throw (KQM_Parameter, KQM_Queue);

// @func This function is used to retrieve an object from a queue
```

```
void DLLEXPORT MR_KQM_GetObjectFromQueue(
        MR_QUEUE_T *queue,      // @parm The handle to a validly bound queue
        // @parm The information about the retrieved object wll be placed here
        MR_OBJECT_T *object,
        BOOL remove   // @parm If TRUE, the object is removed from the queue
        ) throw (KQM_Parameter, KQM_Queue, KQM_None);

// @func This function is used to unbind a service from a queue
void DLLEXPORT MR_KQM_UnbindQueue(
        MR_QUEUE_T *queue       // @parm The handle to a validly bound queue
        ) throw (KQM_Parameter, KQM_Queue);

// Stream based queues (or buffers)

typedef int MR_STREAM_T;

class KQM_Stream {};

void DLLEXPORT MR_KQM_CreateStreamBuffer(
        const _TCHAR *name,       // @parm The name of the new stream buffer
        int max_size,   // @parm The maximum size of the buffer
        int n_channels        // @parm The number of channels associated with this buffer
        );

void DLLEXPORT MR_KQM_DestroyStreamBuffer(
        const _TCHAR *name
        );

void DLLEXPORT MR_KQM_BindToInputStream(
        const _TCHAR *service_name,
        const _TCHAR *stream_name,
        MR_STREAM_T *stream
        );

void DLLEXPORT MR_KQM_BindToOutputStream(
        const _TCHAR *service_name,
        const _TCHAR *stream_name,
        MR_STREAM_T *stream
        );

void DLLEXPORT MR_KQM_RegisterStreamEvent(
        MR_STREAM_T *stream,
        const _TCHAR *event_name,
        // @parm The channel number to register this event with (0==all)
        int channel_number
        );

void DLLEXPORT MR_KQM_AddDataToStream(
        MR_STREAM_T *stream,
```

```
        int channel,    // @parm The channel number (0 is not allowed)
        char *data,
        int n_data,
        int *n_written
5       );

void DLLEXPORT MR_KQM_GetDataFromStream(
        MR_STREAM_T *stream,
        int channel,    // @parm The channel number (0==all)
10      char *data,
        int max_size,
        int *n_read,
        int *n_left
        );
15
    #endif
```

```
/**************************************************************************

//@module KRSC_API (Definition): Definition of KRSC API

//Copyright © 1996 RedBox Holdings NV. All Rights Reserved

//This file implements the API interface into the Kernel Remote Service Call (KRSC) module.

//The Remote Service Call module provides a helper mechanism for services to call procedures
// in other services by means of passing a media object between the two services.

#ifndef KRSC_API_H
define KRSC_API_H include "headers\mr_gen.h"
include "headers\kqm_api.h"

// Handles used in calls
typedef int KRSC_CALL_HANDLE;
typedef int KRSC_REPLY_HANDLE;
typedef int KRSC_FUNCTION_HANDLE;

// Callback function definition used when receiving incoming RSC.CALL objects
typedef void (*PFN_KRSC_RECEIVECALLBACK)(
        const _TCHAR* service_name,
        KRSC_REPLY_HANDLE reply_handle,
        KRSC_FUNCTION_HANDLE handle,
        const _TCHAR *function_name,
        DWORD version
        );

// Status of an outgoing call
typedef enum
{
        // @emem Function has completed correctly
        KRSC_COMPLETEDOK = 0,
        // @emem Function was not located but the service was
        KRSC_COMPLETEDNOFUNC,
        // @emem A parameter passed to the function was missing or invalid
        KRSC_COMPLETEDBADPARAM,
        // @emem An exception was generated during the call
        KRSC_COMPLETEDEXCEPT,
        // @emem A version mismatch was detected
        KRSC_COMPLETEDWRONGVERSION,
        // @emem The target service could not be located
        KRSC_NOROUTE,
        // @emem A timeout occurred waiting for the reply to the call
        KRSC_TIMEOUT,
        KRSC_INPROGRESS,        // @emem The call is in progress
        KRSC_NOCALL,            // @emem No call has been made
```

```
        KRSC_INVALIDHANDLE    // @emem The call is invalid
} KRSC_STATUS;

// Reply status (written in object)
typedef enum
{
        KRSC_REPLY_OK = 0,
        KRSC_REPLY_NOFUNC,
        KRSC_REPLY_BADPARAM,
        KRSC_REPLY_EXCEPT,
        KRSC_REPLY_BADVERSION
} KRSC_REPLY_TYPE;

// Structure used in the client to invoke a remote function
typedef struct
{
        HANDLE hWait;
        KRSC_CALL_HANDLE handle;
        const _TCHAR *srv_address;
        int estimated_size;
        HANDLE hSignalEvent;
        DWORD timeout;
}KRSC_INVOKE_FUNCTION;

// Exceptions
// These are the exceptions that can be thrown by this module

// A start or shutdown has been called in the wrong order, or the wrong number of times
class KRSC_InvalidState {};
// The handle passed to a function was invalid or out of date
class KRSC_InvalidHandle {};

// A parameter was bad (given by member parameter number and reason)
class KRSC_BadParameter
{
public:
        int parameter_number;

typedef enum
        {
                CannotBeNull,        // Parameter cannot be NULL
                InvalidState,        // Parameter has invalid value
                NameAlreadyExists,   // A name style parameter has already been used
                NameNotFound         // A name style parameter refers to a non existent object
        } Reason;

Reason reason;

KRSC_BadParameter(int param, Reason bad_reason) {
```

```
                    parameter_number = param;
                    reason = bad_reason; };
            };

5       // An exception was generated by the KQM module
        class KRSC_KQMException {};

// @func Used by KCFG To start the module 10      void DLLEXPORT KRSC_Start(
                    MR_KLOG_ILOGQUEUE hlog,         // @parm Handle used for logging
                    const _TCHAR *resource_file     // @parm File used for resource messages
                    ) throw (KRSC_InvalidState);

15      // @func Used by KCFG to stop the module void DLLEXPORT KRSC_Shutdown() throw (KRSC_InvalidState);

// @func This function initialises the calling side information for a service
20
        void DLLEXPORT KRSC_CallSide_Start(
                    KRSC_CALL_HANDLE *handle,       // @parm Will be filled in with the handle
                    // @parm The queue handle used for sending media objects to the router
                    MR_QUEUE_T *send_queue_handle,
25                  // @parm The name of the service (used for generating references)
                    const _TCHAR *service_name,
                    // @parm The address of the service (for processing replies)
                    const _TCHAR *service_address
                    ) throw (
30                          KRSC_InvalidState,
                            KRSC_InvalidHandle,
                            KRSC_BadParameter);

// @func This function is used to potentially process a received RSC object at the calling side
35      // @rdesc If this function returns TRUE, KRSC has processed the Media Object and the service
        // should not.

BOOL DLLEXPORT KRSC_CallSide_ProcessObject(
                    // @parm The handle of the interface between the service and KRSC
40                  KRSC_CALL_HANDLE handle,
                    MR_OBJECT_T *object             // @parm The object to process
                    ) throw (
                            KRSC_InvalidState,
                            KRSC_InvalidHandle,
45                          KRSC_BadParameter,
                            KRSC_KQMException);

// @func This function is used to setup a new function call 50      void DLLEXPORT KRSC_InitializeCall(
                    KRSC_CALL_HANDLE handle,        // @parm The handle to this interface
```

```
        // @parm Will be filled in with the handle to this function call
        KRSC_FUNCTION_HANDLE *func_handle,
        const _TCHAR *remote_address,    // @parm The remote address of the service
        const _TCHAR *function_name,     // @parm The agreed name of the function
        DWORD version_info,              // @parm The version of the function
        int estimated_size,    // @parm The estimated size of the parameter section
        // @parm An event handle used to signal change of state of the call
        HANDLE hSignalEvent,
        // @parm The timeout after a call is made before the event is signalled
        DWORD timeout
        ) throw (
              KRSC_InvalidState,
              KRSC_InvalidHandle,
              KRSC_BadParameter);

// @func This function adds a parameter to the function void DLLEXPORT KRSC_AddParameter(
        KRSC_CALL_HANDLE handle,      // @parm The handle to this interface
        // @parm The function we are adding the parameter for
        KRSC_FUNCTION_HANDLE func_handle,
        // @parm An agreed parameter name of the interface
        const _TCHAR *parameter_name,
        int size,        // @parm The size of data in the parameter
        void *data       // @parm The data of the parameter (of size "size")
        ) throw (
              KRSC_InvalidState,
              KRSC_InvalidHandle,
              KRSC_BadParameter);

// @func This function makes the function call void DLLEXPORT KRSC_MakeCall(
        KRSC_CALL_HANDLE handle,      // @parm The handle to the interface
        // @parm The handle to the function to be called
        KRSC_FUNCTION_HANDLE func_handle
        ) throw (
              KRSC_InvalidState,
              KRSC_InvalidHandle,
              KRSC_KQMException);

// @func This function tests the state of the function call void DLLEXPORT KRSC_GetStatus(
        KRSC_CALL_HANDLE handle,      // @parm The handle to the interface
        // @parm The handle of the called function
        KRSC_FUNCTION_HANDLE func_handle,
        KRSC_STATUS *status           // @parm The status of the call
        ) throw (
              KRSC_InvalidState,
              KRSC_InvalidHandle,
```

```
                KRSC_BadParameter);

// @func This function can be used to wait for a longer time for completion void DLLEXPORT KRSC_WaitMore(
            KRSC_CALL_HANDLE handle,      // @parm The handle to the interface
            // @parm The handle of the called function
            KRSC_FUNCTION_HANDLE func_handle
            ) throw (
                KRSC_InvalidState,
                KRSC_InvalidHandle,
                KRSC_BadParameter);

// @func This function retrieves any description of an error state void DLLEXPORT KRSC_GetStatusDescription(
            KRSC_CALL_HANDLE handle,      // @parm The handle to the interface
            // @parm The handle of the called function
            KRSC_FUNCTION_HANDLE func_handle,
            _TCHAR *description,          // @parm Will be filled in with the description
            int max_size    // @parm Size description has been allocated to
            ) throw (
                KRSC_InvalidState,
                KRSC_InvalidHandle,
                KRSC_BadParameter);

// @func This function gets a return parameter from a returned function void DLLEXPORT KRSC_GetReturnValue(
            KRSC_CALL_HANDLE handle,      // @parm The handle to the interface
            // @parm The handle of the called function
            KRSC_FUNCTION_HANDLE func_handle,
            _TCHAR *parameter_name,       // @parm The name of the parameter
            int *size,                    // @parm The size of the data
            void **data                   // @parm The data
            ) throw (
                KRSC_InvalidState,
                KRSC_InvalidHandle,
                KRSC_BadParameter);

// @func This function destroys an outbound call void DLLEXPORT KRSC_CloseCall(
            KRSC_CALL_HANDLE handle,      // @parm The handle to the interface
            // @parm The handle of the called function
            KRSC_FUNCTION_HANDLE func_handle
            ) throw (
                KRSC_InvalidState,
                KRSC_InvalidHandle);
```

```
// Receive side API

// @func This function starts a session for responding to API calls void DLLEXPORT KRSC_ReceiveSide_Start(
        // @parm Will be filled in with a handle to a reply interface
        KRSC_REPLY_HANDLE *handle,
        // @parm The queue used to send the reply to a function call
        MR_QUEUE_T *reply_queue,
        const _TCHAR *service_name,
        const _TCHAR *service_address
        ) throw (
                KRSC_InvalidState,
                KRSC_InvalidHandle,
                KRSC_BadParameter);

// @func This function is called to potentially process an incoming media object
// @rdesc If this function returns TRUE, the service should not process the object BOOL DLLEXPORT KRSC_ReceiveSide_ProcessMediaObject(
        // so that appropriate simple service can be identified
        const _TCHAR* service_name,
        KRSC_REPLY_HANDLE handle,    // @parm The handle to the interface
        MR_OBJECT_T *object,         // @parm The media object to process
        // @parm The function called to perform the service call
        PFN_KRSC_RECEIVECALLBACK callback,
        // @parm Whether the callback is called from a newly created thread
        BOOL new_thread
        ) throw (
                KRSC_InvalidState,
                KRSC_InvalidHandle,
                KRSC_BadParameter,
                KRSC_KQMException);

void DLLEXPORT KRSC_GetParameter(
        KRSC_REPLY_HANDLE handle,    // @parm The handle to the interface
        // @parm The handle of the called function
        KRSC_FUNCTION_HANDLE func_handle,
        _TCHAR *parameter_name,  // @parm The name of the parameter
        int *size,       // @parm The size of the data
        void **data      // @parm The data
        ) throw (
                KRSC_InvalidState,
                KRSC_InvalidHandle,
                KRSC_BadParameter);

// This function is the same as above, except that exceptions are trapped and the size is set to
// zero and data to NULL automatically
void DLLEXPORT KRSC_GetSafeParameter(
```

```
            KRSC_REPLY_HANDLE handle,     // @parm The handle to the interface
            // @parm The handle of the called function
            KRSC_FUNCTION_HANDLE func_handle,
            _TCHAR *parameter_name,   // @parm The name of the parameter
 5          int *size,        // @parm The size of the data
            void **data    // @parm The data
            );

// @func This function is used to add a reply to the function call
10
    void DLLEXPORT KRSC_AddReply(
            KRSC_REPLY_HANDLE handle,     // @parm The handle to the interface
            // @parm The handle to the function call
            KRSC_FUNCTION_HANDLE func_handle,
15          const _TCHAR *reply_name,        // @parm The name of the reply value
            int size,                         // @parm The size of the data
            void *data                        // @parm The data
            ) throw (
                  KRSC_InvalidState,
20                KRSC_InvalidHandle,
                  KRSC_BadParameter);

// @func This function is used to reply to the function call 25  void DLLEXPORT KRSC_ReturnReply(
            KRSC_REPLY_HANDLE handle,     // @parm The handle to the interface
            // @parm The handle to the function call
            KRSC_FUNCTION_HANDLE func_handle,
            KRSC_REPLY_TYPE reply,    // @parm What type of reply to send
30          // @parm A description of the reply (where appropriate)
            const _TCHAR *description
            ) throw (
                  KRSC_InvalidState,
                  KRSC_InvalidHandle,
35                KRSC_BadParameter,
                  KRSC_KQMException);

void DLLEXPORT KRSC_CloseReply(
            KRSC_REPLY_HANDLE handle,
40          KRSC_FUNCTION_HANDLE func_handle
            );

#endif
```

```
/*************************************************************************

//@module KSTOR (Header)| Definition of KSTOR API

//Copyright © 1996-97 RedBox Holdings NV. All Rights Reserved

//This file describes the API for the KSTOR module. Calls in this section allow a calling
// application to determine the type of information that is stored and the information itself ifndef _KSTOR_API_H
define _KSTOR_API_H include <windows.h> include "headers\MR_GEN.h"
include "headers\klog_api.h"

//--------------------------------------------------- typedef int KSTOR_CONFIG_HANDLE;     // a handle to a valid KSTOR database

// there can be more than one handle to any one database typedef int KSTOR_SESSION_HANDLE;    // a handle to a valid KSTOR session // there can be many sessions associated with any one database handle

//-----------------------------------------------------------------------

// this is a shorthand representation of the local CPR address which can be used
// wherever an address parameter is required define LOCAL _T(".")

//-----------------------------------------------------------------------

// Initialises the KSTOR Module
void DLLEXPORT KSTOR_Startup(
        IN const MR_KLOG_ILOGQUEUE hQueue,
        IN const _TCHAR *resource_file,
        IN const _TCHAR *local_mr_address
        );

// Loads a file as a KSTOR database and returns a handle to that database.
// the handle will be null in the following circumstances:
//      if the file does not exist and alwaysOpen has not been set
//      if the file is not a valid KSTOR file
//      if an error occurs when loading the file
void DLLEXPORT KSTOR_LoadConfig(
        IN const _TCHAR *config_info,
```

```
                OUT KSTOR_CONFIG_HANDLE *cHandle,
                IN BOOL alwaysOpen = TRUE
                );

// Closes a KSTOR dbase (saving the data to the appropriate file)
        // status is returned to indicate the following states
        //      0 - Dbase closed successfully
        //      1 - Dbase still in use and force close flag not set
        //      2 - Security Error ( not a valid KSTOR_CONFIG_HANDLE )
        void DLLEXPORT KSTOR_CloseConfig(
                IN const KSTOR_CONFIG_HANDLE  cHandle,
                IN const BOOL  forceCloseFlag,
                OUT short *status
                );

// Shuts down all config databases
        // status is returned to indicate the following states
        //      0 - Dbases all closed successfully
        //      1 - At least one Dbase still in use and force close flag not set
        //      2 - Security Error ( not a valid KSTOR_CONFIG_HANDLE )
        void DLLEXPORT KSTOR_Shutdown(
                IN const BOOL  forceCloseFlag,
                OUT short *status
                );

//------------------------------------------------------------------------

// starts a session with a KSTOR database
        // KSTOR uses sessions when retrieving info to determine which info to return next. The
        // sessionHandle will be null if the cHandle is invalid
        void DLLEXPORT KSTOR_SetupSession(
                IN const KSTOR_CONFIG_HANDLE cHandle,
                OUT KSTOR_SESSION_HANDLE *sHandle
                );

//Cancels a session with a KSTOR database
        void DLLEXPORT KSTOR_EndSession(
                IN const KSTOR_CONFIG_HANDLE cHandle,
                IN const KSTOR_SESSION_HANDLE sHandle
                );

//------------------------------------------------------------------------

// Retrieves first unique address in KSTOR database. last will be set if there is only one
        // address in the database. If the dbase is empty or a handle is invalid, last will be set and the
        // contents of address will be null
        void DLLEXPORT KSTOR_GetFirstAddress(
                IN const KSTOR_CONFIG_HANDLE cHandle,
                IN const KSTOR_SESSION_HANDLE sHandle,
                OUT _TCHAR *address,
                OUT BOOL *last
```

```
        );

// Retrieves next unique address for any given session. last will be set if the last address in the
// database is returned if the dbase is empty or a handle is invalid, last will be set and
// the contents of address will be null
void DLLEXPORT KSTOR_GetNextAddress(
        IN const KSTOR_CONFIG_HANDLE cHandle,
        IN const KSTOR_SESSION_HANDLE sHandle,
        OUT _TCHAR *address,
        OUT BOOL *last
        );

// Retrieves the first type in a configuration for an address/type tuple. last will be set if the
// last type is returned. If the dbase is empty or a handle is invalid, last will be set and
// the contents of type will be null.
void DLLEXPORT KSTOR_GetFirstType(
        IN const KSTOR_CONFIG_HANDLE cHandle,
        IN const KSTOR_SESSION_HANDLE sHandle,
        IN const _TCHAR *address,
        OUT _TCHAR *type,
        OUT BOOL *last
        );

// Retrieves next type in a configuration for the given session. last will be set if the last type is
// returned. If the dbase is empty or a handle is invalid, last will be set and the contents of
// type will be null
void DLLEXPORT KSTOR_GetNextType(
        IN const KSTOR_CONFIG_HANDLE cHandle,
        IN const KSTOR_SESSION_HANDLE sHandle,
        OUT _TCHAR *type,
        OUT BOOL *last
        );

// Retrieves the first unique service given an address & type. last will be set if the last service
// is returned. If the dbase is empty or a handle is invalid, last will be set and the contents of
// service will be null
void DLLEXPORT KSTOR_GetFirstService(
        IN const KSTOR_CONFIG_HANDLE cHandle,
        IN const KSTOR_SESSION_HANDLE handle,
        IN const _TCHAR *address,
        IN const _TCHAR *type,
        OUT _TCHAR *service,
        OUT BOOL *last
        );

// Retrieves the next unique service for the given session. last will be set if the last service is
// returned. If the dbase is empty or a handle is invalid, last will be set and the contents of
// service will be null
void DLLEXPORT KSTOR_GetNextService(
        IN const KSTOR_CONFIG_HANDLE cHandle,
        IN const KSTOR_SESSION_HANDLE sHandle,
```

```
            OUT _TCHAR *service,
            OUT BOOL *last
            );

5   // Retrieves the first name in a configuration for an address/type/service threetuple. last will
     // be set if the last name is returned. If the dbase is empty or a handle is invalid, last will be
     // set and the contents of name will be null.
     void DLLEXPORT KSTOR_GetFirstName(
            IN const KSTOR_CONFIG_HANDLE cHandle,
10          IN const KSTOR_SESSION_HANDLE sHandle,
            IN const _TCHAR *address,
            IN const _TCHAR *type,
            IN const _TCHAR *service,
            OUT _TCHAR *name,
15          OUT BOOL *last
            );

// Retrieves next name for a session. last will be set if the last name is returned. If the dbase is
     // empty or a handle is invalid, last will be set and the contents of name will be null
20   void DLLEXPORT KSTOR_GetNextName(
            IN const KSTOR_CONFIG_HANDLE cHandle,
            IN const KSTOR_SESSION_HANDLE sHandle,
            OUT _TCHAR *name,
            OUT BOOL *last
25          );

//--------------------------------------------------------------------------------

// Retrieves info from the specified data point. Passing NULL as the data parameter will
30   // simply retrieve the size of the data. If the data point does not exist, the size will be NULL.
     void DLLEXPORT KSTOR_GetInformation(
            IN const KSTOR_CONFIG_HANDLE cHandle,
            IN const KSTOR_SESSION_HANDLE sHandle,
            IN const _TCHAR *address,
35          IN const _TCHAR *type,
            IN const _TCHAR *service,
            IN const _TCHAR *name,
            OUT _TCHAR *data,
            OUT DWORD *size,
40          OUT DWORD *lifetime
            );

// Adds the given data to the KSTOR database at the data point specified. If the data point is
     // new, it will be created and inserted. If the data point already exists, the stored data will
45   // only be overwritten if the overwrite flag is set to TRUE. The status variable is returned. It
     // can take the following values
     //     0 - ok
     //     1 - data point already exists and overwrite not set
     //     2 - invalid parameter
50   //     3 - Security violation ( not a valid KSTOR_CONFIG_HANDLE )
     void DLLEXPORT KSTOR_SaveInformation(
```

```
            IN const KSTOR_CONFIG_HANDLE cHandle,
            IN const _TCHAR *address,
            IN const _TCHAR *type,
            IN const _TCHAR *service,
  5         IN const _TCHAR *name,
            IN const _TCHAR *data,
            IN DWORD data_size,
            IN DWORD lifetime,
            IN BOOL overwrite,
 10         OUT int *status
            );

// Deletes the specified data point if it exists
   // The status variable is returned. It can take the following values
 15    //      0 - ok
       //      1 - data point not found
       //      2 - invalid parameter
       //      3 - Security violation ( not a valid KSTOR_CONFIG_HANDLE )
   void DLLEXPORT KSTOR_DeleteInformation(
 20         IN const KSTOR_CONFIG_HANDLE cHandle,
            IN const _TCHAR *address,
            IN const _TCHAR *type,
            IN const _TCHAR *service,
            IN const _TCHAR *name,
 25         OUT int *status
            );

#endif
```

```
/************************************************************************

//@module KTERMMAN_API (Definition): Definition of interface to KTERMMAN kernel
// component. The KTERMMAN Kernel component manages the interface between a link
// service and an underlying terminal component. A terminal component automates exchanging
// of authentication and encryption standards.

//Copyright © 1996 RedBox Holdings NV. All Rights Reserved ifndef KTERMMAN_API_H
define KTERMMAN_API_H include "headers\mr_gen.h"
include "headers\klog_api.h"
#include "headers\kstor_api.h"

// These functions are called by KBOOT

// @func Used by KBOOT To start the module void DLLEXPORT KTermMan_Start(
        MR_KLOG_ILOGQUEUE hlog,              // @parm Handle used for logging
        const _TCHAR *resource_file,         // @parm File used for resource messages
        const KSTOR_CONFIG_HANDLE cHandle    // @parm handle to configuration file
        );

// @func This function is called by KBOOT on shutdown void DLLEXPORT KTermMan_Stop();

// @func This function sets up all terminal services void DLLEXPORT KTermMan_Initialise();

// These functions are called by KCFG

// @func This function installs a terminal service DLL void DLLEXPORT KTermMan_AddTerminalService(
        // @parm The filename that supports the terminal service
        const _TCHAR *module_filename,
        // @parm The resource file for that service
        const _TCHAR *resource_file,
        // @parm Name of terminal protocol this service performs
        const _TCHAR *terminal_name,
        // @parm The log that the service should use for logging
        MR_KLOG_ILOGQUEUE hLog
        );

// These functions are called by transport (link) services
```

```
    typedef int KTERM_SESSION_HANDLE;

#define KTERM_MAX_TERMINAL_NAME  255
 5
    typedef struct
    {
            _TCHAR terminal_name[KTERM_MAX_TERMINAL_NAME];
            KTERM_SESSION_HANDLE session_handle;
10  } KTERM_HANDLE;

typedef enum
    {
            KTERM_SLAVE,       // The terminal should wait for communication
15          KTERM_MASTER       // The terminal should initiate the protocol
    } KTERM_TYPE;

typedef enum
    {
20          // The terminal is waiting for the other end
            KTERM_NOTIFY_WAITING,
            // The terminal has data it wishes to send over the channel
            KTERM_NOTIFY_HASDATA,
            // The terminal has authenticated the remote terminal
25          KTERM_NOTIFY_AUTHENTICATED,
            // The terminal has agreed an encryption standard for the channel
            // (all data should flow through the terminal)
            KTERM_NOTIFY_SECURE,
            // The terminal has agreed a compression standard for the channel
30          // (all data should flow through the terminal)
            KTERM_NOTIFY_COMPRESS,
            // The terminal could not authenticate the remote terminal
            KTERM_NOTIFY_NOTAUTHENTICATED,
            // The terminal has disconnected from the channel
35          KTERM_NOTIFY_DISCONNECT
    } KTERM_NOTIFICATION;

typedef void (*PFN_TERMMAN_CALLBACK)(
            KTERM_HANDLE *terminal_handle,
40          KTERM_NOTIFICATION notification_message,
            DWORD *notification_param,
            LPDWORD callback_data);

void DLLEXPORT KTermMan_StartTerminalSession(
45          const _TCHAR *terminal_name,     // @parm The name of the terminal service
            const _TCHAR *terminal_address,  // @parm Address of terminal
            // @parm Whether the terminal is to be the master or slave
            KTERM_TYPE terminal_type,
            // @parm Will be filled with the handle to this terminal session
50          KTERM_HANDLE *terminal_handle,
            // @parm The callback to be used for notification of important state changes
```

```
            PFN_TERMMAN_CALLBACK callback,
            LPDWORD    callback_data
            );

5   // @func This function is used to retrieve data that the terminal wishes to SEND to the remote
     // terminal (i.e. the transport should send the data retrieved over the transmission channel)
     void DLLEXPORT KTermMan_GetDataFromTerminal(
            KTERM_HANDLE *terminal_handle,
            char *data_buffer,
10          int buffer_size,
            int *bytes_read,
            HANDLE hWaitEvent,
            DWORD timeout
            );
15
     // @func This function is used to pass data retrieved from the transmission channel to the
     // terminal
     void DLLEXPORT KTermMan_GiveDataToTerminal(
            KTERM_HANDLE *terminal_handle,
20          char *data_buffer,
            int buffer_size
            );

// @func Use this function to let the terminal convert regular data (i.e. encryption) into a form
25   // to place on the channel
     void DLLEXPORT KTermMan_ConvertToChannelData(
            KTERM_HANDLE *terminal_handle,
            char *data_buffer,
            int buffer_size,
30          char *converted_data_buffer,
            int converted_buffer_size,
            int *actual_converted_size
            );

35   // @func Use this function to let the terminal convert channel data back to the real data buffer
     // originated at the source terminal (i.e. the data the source terminal originally called
     // ConvertToChannelData on)
     void DLLEXPORT KTermMan_ConvertFromChannelData(
            KTERM_HANDLE *terminal_handle,
40          char *data_buffer,
            int buffer_size,
            char *converted_data_buffer,
            int converted_buffer_size,
            int *actual_converted_size
45          );

void DLLEXPORT KTermMan_StopTerminalSession(
            KTERM_HANDLE *terminal_handle
            );
50
     #endif
```

74585.912                    -131-    EXPRESS LABEL #EM451286294US

```
/******************************************************************

//@module KCRYP_API (Definition)| Definition of interface to KCRYPT kernel component.
// The KCRYPT kernel component manages encryption and decryption of media objects
5
//Copyright © 1996 RedBox Holdings NV. All Rights Reserved ifndef KCRYP_API_H
10 #define KCRYP_API_H include "headers\mr_gen.h"
   #include "headers\kobj_api.h"
   #include "headers\klog_api.h"
15 #include "headers\kstor_api.h"

// Exceptions that can be generated by this interface class KCrypt_NotAvailable {};        // The encryption requested was not installed
20 class KCrypt_DecryptFailed {};       // Couldn't decrypt object
   class KCrypt_UnknownUser {};  // The key name supplied was not known by the crypto service
   // The signature enclosed in a media object was bad (object has been modified since signed)
   class KCrypt_BadSignature {};

25 // These functions are called by KBOOT

// @func Used by KBOOT To start the module
   void DLLEXPORT KCrypt_Start(
           MR_KLOG_ILOGQUEUE hlog,          // @parm Handle used for logging
30         const _TCHAR *resource_file,     // @parm File used for resource messages
           const KSTOR_CONFIG_HANDLE cHandle   // @parm Handle to config file
           );

// @func This function is called by KBOOT on shutdown
35 void DLLEXPORT KCrypt_Stop();

// @func This function sets up all Crypto Services found in the configuration file
   void DLLEXPORT KCrypt_Initialise();

40 // These functions are called by KCFG

// @func This function installs a crypto service DLL
   void DLLEXPORT KCrypt_AddCryptoService(
           // @parm The filename that supports the crypto service
45         const _TCHAR *module_filename,
           const _TCHAR *resource_file,     // @parm The resource file for that service
           // @parm Name of encryption/decryption this service performs
           const _TCHAR *encryption_name,
           // @parm The log that the service should use for logging
50         MR_KLOG_ILOGQUEUE hLog
           );
```

```
    // These functions can be called by any service

// @func Use this function to encrypt a media object
5   void DLLEXPORT KCrypt_EncryptObject(
            MRKOBJ *source_object,       // @parm The object to be encrypted
            MRKOBJ **encrypted_object,   // @parm The new encrypted object
            const _TCHAR *encryption_name,   // @parm The type of encryption requested
            const _TCHAR *user_keyname       // @parm The key name to use for the encryption
10          );

// @func Use this function to decrypt an encrypted media object (NB encryption type and user
    // key name are stored in the encrypted object)
    void DLLEXPORT KCrypt_DecryptObject(
15          MRKOBJ *source_object,       // @parm The object to be decrypted
            MRKOBJ **decrypted_object    // @parm The new decrypted object
            );

// @func Use this function to delete an object created by encrypt or decrypt above
20  void DLLEXPORT KCrypt_DeleteObject(
            MRKOBJ *object,
            const _TCHAR *encryption_name
            );

25  // @func Use this function to add a public key to the database supported by the encryption type
    void DLLEXPORT KCrypt_AddPublicKey(
            // @parm The name of the encryption service this key corresponds to
            const _TCHAR *encryption_name,
            const _TCHAR *user_keyname,     // @parm The key name
30          const char *key,         // @parm The public key
            int key_length           // @parm The length of the key
            );

// @func Use this function to revoke a key
35  void DLLEXPORT KCrypt_RevokeKey(
            const _TCHAR *encryption_name,   // @parm The name of the encryption service
            const _TCHAR *user_keyname
            );

40  #endif
```

```
/******************************************************************

//@module MR_GEN (Definition) | Implementation of MR_GEN API

//Copyright © 1996-97, RedBox Holdings NV.  All Rights Reserved

// General Kernel MR file
#ifndef MR_GEN_H
#define MR_GEN_H
#include <stdio.h>
#include <tchar.h>

// For defining exported fns/classes.
#define DLLEXPORT __declspec(dllexport)

// Disable warnings to do with C++ Exception specification (i.e. throw in func declarator)

#pragma warning( disable : 4290 )

// Disable warnings due to truncation of debug symbol (occurs a lot in STL)

#pragma warning( disable : 4786 )

class MR_GenAPI_Error
{
private:
        int return_from_getlasterror;
public:
        MR_GenAPI_Error(int error_code) : return_from_getlasterror(error_code) {};
        ~MR_GenAPI_Error() {};

int GetLastError() { return return_from_getlasterror; };
};

// This is the section dealing with throwing CPR Exceptions
// All true CPR exceptions should derive from this class below
// and use the macro to actually perform the throw // A forward declaration - this is in KLOG
void DLLEXPORT MR_KLog_ThrowErrorWithStack(
        LPVOID exception_to_throw,
        const _TCHAR *msg
        );

class KLOG_Gen_Exception
{
private:
        int Err_LineNo;
        const _TCHAR *Err_module_filename;
```

```
    protected:
            int error_number;

public:
5           KLOG_Gen_Exception(
                    int LineNo,
                    const _TCHAR *module_filename,
                    int p_error_number
                    ) : Err_LineNo(LineNo),
10                  Err_module_filename(module_filename),
                    error_number(p_error_number)
            {
            // We need to construct an error string that consists of
            // ERROR IN module_name (LineNo) - ErrorString
15          // The error string is returned by a derived function from this class _TCHAR *real_error_string = GetErrorString();
            _TCHAR *printed_error_string = new _TCHAR[_MAX_PATH];
            _stprintf(
20                  printed_error_string,
                    _T("ERROR IN %s(%d) - %s"),
                    Err_module_filename,
                    Err_LineNo,
                    real_error_string ? real_error_string : _T("Unknown"));
25          // For now
                    _tprintf(printed_error_string);
                    _tprintf(_T("\n"));
                    MR_KLog_ThrowErrorWithStack(
                            NULL,
30                          printed_error_string);
                    delete printed_error_string;
            }
            virtual ~KLOG_Gen_Exception() {};

35          virtual _TCHAR *GetErrorString() { return NULL; };
    };

// Use this macro if you haven't subclassed the above
    // e.g
40  // {
    //      KLOG_GENTHROW();
    // } define KLOG_GENTHROW() {
45          throw KLOG_Gen_Exception(__LINE__, _T(__FILE__), 0);
            };

// Use this macro if you have subclassed the above, e.g.
    // {
50  //      KLOG_SUBTHROW(KQM_Exception, IDS_KQM_MEMORYERROR);
    // }
```

```
#define KLOG_SUBTHROW(x, y) { throw x(__LINE__, _T(__FILE__), y); };

// Automatic new and delete

// Objects of this type are never deleted
#define OBJECT_EON                  1
// Objects of this type are assumed to have a lifetime of max 60 seconds
#define OBJECT_FREE_YOUNG      2
// Objects of this type are assumed to have a lifetime of max 600 seconds
#define OBJECT_FREE_OLD         3
// Objects of this type are members of other objects (OBJECT_YOUNG,
// OBJECT_OLD) and will be deleted as those objects are deleted
define OBJECT_MEMBER           4 ifdef _DEBUG
// Forward declarations of functions
LPVOID DLLEXPORT MR_KLog_DebugAllocAdd(
      LPVOID,
      const char *,
      int,
      const char *,
      int);
BOOL DLLEXPORT MR_KLog_DebugAllocRemove(
      LPVOID,
      const char *,
      int);

#define MRNEW(Y, Z, X) (Y) MR_KLog_DebugAllocAdd(new X, #Y, Z, __FILE__, __LINE__)

// Call the special debugging function before deleting memory
#define MRDELETE(X) {if(X && MR_KLog_DebugAllocRemove((LPVOID)(X), __FILE__, __LINE__)) \ delete X;}
#else
#define MRNEW(Y, Z, X) new X
#define MRDELETE(X) delete X
endif include "headers\mr_mut.h"
include "headers\mr_aut.h"

// This is for standard string class
#include "_tstring.h"
//#include "general\stl\bstring.h"
//#ifdef UNICODE
//#define _tstring wstring
//#else
//#define _tstring string
//#endif endif
```

74585.912

What is claimed is:

1. Computer system apparatus comprising:
a network comprising at least one node, each node having a plurality of services that transmit data and service requests amongst each other as media objects, said plurality of services comprising:
at least one kernel service comprising a kernel router service, wherein said kernel router service routes media objects between each service within said node;
at least one application service, each application service forming an interface between an external application and said node for the exchange of said data and service requests; and
at least one content service, each content service providing processing of said data internal to said node.

2. The apparatus of claim 1, wherein said node further comprises at least one routing service, each routing service specifying an application-specific service route for transmitting and processing said data in said network.

3. The apparatus of claim 1, wherein said at least one kernel service further comprises a kernel stream service for setting up stream buffers between services that support unbounded data.

4. The apparatus of claim 1, further comprising at least one link service, each link service capable of forming a communication link with a corresponding link service in another node.

5. The apparatus of claim 1, wherein said at least one kernel service further comprises a service locator service, said service locator service maintaining a database comprising:
information about the location, identity and capabilities of services in said network; and
a list of service calls supported by each service.

6. The apparatus of claim 1, wherein said at least one kernel service further comprises a service locator service, said service locator service maintaining a directory comprising:
information about the location, identity and capabilities of services in said network; and
a list of service calls supported by each service.

7. The apparatus of claim 1, wherein said at least one kernel service further comprises a service monitor that tracks the status of services running on said node.

8. The apparatus of claim 7, wherein said service monitor monitors services running on a remote node by performing updates via service requests to and from a service monitor running on said remote node.

9. The apparatus of claim 1, wherein said at least one kernel service comprises a capability-based service request service which resolves a service route for service requests based on attributes associated with said service requests and capabilities associated with said plurality of services.

10. The apparatus of claim 1, further comprising an application service forming an interface between a device and said node.

11. The apparatus of claim 1, wherein said at least one content service performs analysis of said data in transit through said network.

12. The apparatus of claim 1, wherein said at least one content service examines said data to determine attributes associated with the content of said data.

13. The apparatus of claim 1, wherein said at least one content service converts said data from a first format to a second format.

14. The apparatus of claim 1, wherein said at least one content service modifies said data in transit through said network.

15. The apparatus of claim 1, wherein said at least one content service combines a plurality of data input formats into a single output format.

16. The apparatus of claim 1, wherein said at least one content service replicates at least one data input format to provide a plurality of data output formats.

17. The apparatus of claim 1, wherein said at least one content service terminates data.

18. The apparatus of claim 1, wherein said at least one content service converts a plurality of data input formats into a plurality of data output formats different from said data input formats.

19. The apparatus of claim 1, wherein said at least one content service separates a data input format into multiple output formats derived from said data input format.

20. The apparatus of claim 1, further comprising a kernel having a plurality of management modules accessible to said plurality of services via function calls.

21. The apparatus of claim 20, wherein said plurality of management modules comprise a boot manager which loads and starts other management modules.

22. The apparatus of claim 20, wherein said plurality of management modules comprise a monitor manager which monitors execution threads created in the node.

23. The apparatus of claim 20, wherein said plurality of management modules comprise a logging manager which handles message logging.

24. The apparatus of claim 20, wherein said plurality of management modules comprise a storage manager which handles storage of configuration information.

25. The apparatus of claim 20, wherein said plurality of management modules comprise a queue and stream manager which manages object queues and stream buffers for the input and output of media objects and media streams, respectively, from each of said plurality of services.

26. The apparatus of claim 20, wherein said plurality of management modules comprise a remote service call manager which handles encapsulation of service requests into media objects for a sending service, and which handles unpackaging of said service requests from said media objects for a receiving service.

27. The apparatus of claim 20, wherein said plurality of management modules comprise a configuration manager which loads and starts said plurality of services.

28. The apparatus of claim 20, wherein said plurality of management modules comprise a link manager, said link manager comprising a compression module manager, an encryption module manager and an authentication manager.

29. The apparatus of claim 20, wherein said plurality of management modules comprise an object handler, said object handler used by said plurality of services to read, write and delete said data from said media objects.

30. A method for incorporating content processing and content routing intelligence into networks, comprising:
forming a network comprising a plurality of nodes;

within each node,
forming an interface between an external application and said node by providing an application service for the exchange of data and service requests;
within a content service, processing said data in transit through said network; and
routing said data and service requests between each service in said node via a kernel router service.

31. The method of claim 30, further comprising specifying in a routing service an application-specific service route for transmitting and processing said data in said network.

32. The method of claim 30, further comprising setting up, via a kernel stream service, stream buffers between services that support unbounded data.

33. The method of claim 30, wherein said kernel router service routes said data and said service requests in the form of media objects.

34. The method of claim 30, further comprising:
maintaining information about the location, identity and capabilities of services in said network; and
maintaining a list of service calls supported by each service.

35. The method of claim 34, further comprising resolving a service route for service requests based on attributes associated with said service requests and said capabilities associated with said plurality of services.

36. The method of claim 30, further comprising, within each node, monitoring the status of services running on said node.

37. The method of claim 36, further comprising, within each node, monitoring the status of services running on a remote node by performing updates via service requests to and from a monitoring service on said remote node.

38. The method of claim 30, further comprising forming an interface between a device and said node by providing another application service for the exchange of said data and said service requests.

39. The method of claim 30, wherein said step of processing said data in transit through said network comprises performing analysis on said data.

40. The method of claim 30, wherein said step of processing said data in transit through said network comprises examining said data to determine attributes associated with the content of said data.

41. The method of claim 30, wherein said step of processing said data in transit through said network comprises converting said data from a first format to a second format.

42. The method of claim 30, wherein said step of processing said data in transit through said network comprises separating said data into separate data elements.

43. The method of claim 30, wherein said step of processing said data in transit through said network comprises combining separate data elements into a single data element.

44. The method of claim 30, wherein said step of processing said data in transit through said network comprises replicating at least one data input format to provide a plurality of data output formats.

45. The method of claim 30, wherein said step of processing said data in transit through said network comprises terminating data.

46. The method of claim 30, wherein said step of processing said data in transit through said network comprises converting a plurality of data input formats into a plurality of data output formats different from said data input formats.

47. The method of claim 30, further comprising, within each node, providing a plurality of management modules accessible to services in said node via function calls.

48. The method of claim 47, further comprising loading and starting said plurality of management modules via a boot manager.

49. The method of claim 47, further comprising, within each node, monitoring execution threads created in said node via a monitor manager.

50. The method of claim 47, further comprising, within each node, logging messages via a logging manager.

51. The method of claim 47, further comprising, within each node, handling storage of configuration information via a storage manager.

52. The method of claim 47, further comprising, within each node, managing object queues and stream buffers for the input and output of media objects and media streams from each service via a queue and stream manager.

53. The method of claim 47, further comprising:
within each node, in a remote service call manager,
encapsulating service requests within media objects for a sending service; and
unpackaging said service requests from said media objects for a receiving service.

54. The method of claim 47, further comprising, within each node, loading and starting said services via a configuration manager.

55. The method of claim 47, further comprising, within each node, each service using an object handler to read data from, write data to and delete data from a media object.

56. The method of claim 47, further comprising, within each node, providing a compression module manager to load a compression module and to manage compression and decompression of data transmitted between nodes.

57. The method of claim 47, further comprising, within each node, providing an encryption module manager to load an encryption module and to manage encryption and decryption of data transmitted between nodes.

58. The method of claim 47, further comprising, within each node, providing an authentication manager to manage authentication of data transmitted between nodes.

59. The method of claim 30, further comprising, in said node, forming a communication link with another node via a link service.

60. A computer program product comprising:
a computer usable medium having computer readable program code embodied therein for incorporating content processing and content routing intelligence into a network having a plurality of nodes, within each node, said computer program product comprising:
computer readable program code configured to cause a computer to form an interface between an external application and said node by providing an application service for the exchange of data and service requests;
computer readable program code configured to cause a computer to process, within a content service, said data in transit through said network; and
computer readable program code configured to cause a computer to route said data and said service requests between each service in said node via a kernel router service.

61. The computer program product of claim 60, further comprising computer readable program code configured to cause a computer to specify in a routing service an application-specific service route for transmitting and processing said data in said network.

62. The computer program product of claim 60, further comprising computer readable program code configured to cause a computer to set up, via a kernel stream service, stream buffers between services that support unbounded data.

63. The computer program product of claim 60, wherein said kernel outer service routes said data and said service requests in the form of media objects.

64. The computer program product of claim 60, further comprising:
   computer readable program code configured to cause a computer to maintain information about the location, identity and capabilities of services in said network; and
   computer readable program code configured to cause a computer to maintain a list of service calls supported by each service.

65. The computer program product of claim 64, further comprising computer readable program code configured to cause a computer to resolve a service route for service requests based on attributes associated with said service requests and said capabilities associated with said plurality of services.

66. The computer program product of claim 60, further comprising computer readable program code configured to cause a computer to monitor the status of services running on said node.

67. The computer program product of claim 66, further comprising computer readable program code configured to cause a computer to monitor the status of services running on a remote node by performing updates via service requests to and from a monitoring service on said remote node.

68. The computer program product of claim 60, further comprising computer readable program code configured to cause a computer to form an interface between a device and said node by providing another application service for the exchange of said data and said service requests.

69. The computer program product of claim 60, wherein said computer readable program code configured to cause a computer to process said data in transit through said network comprises computer readable program code configured to cause a computer to perform analysis on said data.

70. The computer program product of claim 60, wherein said computer readable program code configured to cause a computer to process said data in transit through said network comprises computer readable program code configured to cause a computer to examine said data to determine attributes associated with the content of said data.

71. The computer program product of claim 60, wherein said computer readable program code configured to cause a computer to process said data in transit through said network comprises computer readable program code configured to cause a computer to convert said data from a first format to a second format.

72. The computer program product of claim 60, wherein said computer readable program code configured to cause a computer to process aid data in transit through said network comprises computer readable program code configured to cause a computer to separate said data into separate data elements.

73. The computer program product of claim 60, wherein said computer readable program code configured to cause a computer to process said data in transit through said network comprises computer readable program code configured to cause a computer to combine separate data elements into a single data element.

74. The computer program product of claim 60, wherein said computer readable program code configured to cause a computer to process said data in transit through said network comprises computer readable program code configured to cause a computer to replicate at least one data input format to provide a plurality of data output formats.

75. The computer program product of claim 60, wherein said computer readable program code configured to cause a computer to process said data in transit through said network comprises computer readable program code configured to cause a computer to terminate data.

76. The computer program product of claim 60, wherein said computer readable program code configured to cause a computer to process said data in transit through said network comprises computer readable program code configured to cause a computer to convert a plurality of data input formats into a plurality of data output formats different from said data input formats.

77. The computer program product of claim 60, further comprising computer readable program code configured to cause a computer to provide a plurality of management modules accessible to services in said node via function calls.

78. The computer program product of claim 77, further comprising computer readable program code configured to cause a computer to load and start said plurality of management modules via a boot manager.

79. The computer program product of claim 77, further comprising computer readable program code configured to cause a computer to monitor execution threads created in said node via a monitor manager.

80. The computer program product of claim 77, further comprising computer readable program code configured to cause a computer to log messages via a logging manager.

81. The computer program product of claim 77, further comprising computer readable program code configured to cause a computer to handle storage of configuration information via a storage manager.

82. The computer program product of claim 77, further comprising computer readable program code configured to cause a computer to manage object queues and stream buffers for the input and output of media objects and media streams from each service via a queue and stream manager.

83. The computer program product of claim 77, further comprising:
   computer readable program code configured to cause a computer to, in a remote service call manager,
      encapsulate service requests within media objects for a sending service; and
      unpackage said service requests from said media objects for a receiving service.

84. The computer program product of claim 77, further comprising computer readable program code configured to cause a computer to load and start said services via a configuration manager.

85. The computer program product of claim 77, further comprising computer readable program code configured to cause a computer to read data from, write data to and delete data from a media object via an object handler.

86. The computer program product of claim 77, further comprising computer readable program code configured to cause a computer to provide a compression module manager to load a compression module and to manage compression and decompression of data transmitted between nodes.

87. The computer program product of claim 77, further comprising computer readable program code configured to cause a computer to provide an encryption module manager to load an encryption module and to manage encryption and decryption of data transmitted between nodes.

88. The computer program product of claim 77, further comprising computer readable program code configured to cause a computer to provide an authentication manager to manage authentication of data transmitted between nodes.

89. The computer program product of claim 60, further comprising computer readable program code configured to cause a computer to form a communication link with another node via a link service.

\* \* \* \* \*